(12) United States Patent
Kato et al.

(10) Patent No.: US 11,161,101 B2
(45) Date of Patent: Nov. 2, 2021

(54) CATALYST STRUCTURE AND METHOD FOR PRODUCING THE CATALYST STRUCTURE

(71) Applicant: Furukawa Electric Co., Ltd., Tokyo (JP)

(72) Inventors: Sadahiro Kato, Tokyo (JP); Masayuki Fukushima, Tokyo (JP); Hiroko Takahashi, Tokyo (JP); Yuichiro Banba, Tokyo (JP); Kaori Sekine, Tokyo (JP); Takao Masuda, Tokyo (JP); Yuta Nakasaka, Tokyo (JP); Takuya Yoshikawa, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 15/994,098

(22) Filed: May 31, 2018

(65) Prior Publication Data
US 2019/0039056 A1    Feb. 7, 2019

(30) Foreign Application Priority Data

May 31, 2017   (JP) ................................. 2017-108609
May 31, 2017   (JP) ................................. 2017-108640

(51) Int. Cl.
*B01J 29/89*      (2006.01)
*B01J 23/46*      (2006.01)
(Continued)

(52) U.S. Cl.
CPC ............... *B01J 29/89* (2013.01); *B01J 23/42* (2013.01); *B01J 23/44* (2013.01); *B01J 23/462* (2013.01); *B01J 23/464* (2013.01); *B01J 23/468* (2013.01); *B01J 23/745* (2013.01); *B01J 23/75* (2013.01); *B01J 23/755* (2013.01); *B01J 29/12* (2013.01);
(Continued)

(58) Field of Classification Search
None
See application file for complete search history.

(56) References Cited

U.S. PATENT DOCUMENTS 3,898,180 A    8/1975   Crooks et al.
4,552,855 A   11/1985   Ozin et al.
(Continued)

FOREIGN PATENT DOCUMENTS

CN    102247887 A    11/2011
CN    106362787 A     2/2017
(Continued)

OTHER PUBLICATIONS

Yokoi, "Characterization of zeolites by advanced SEM/STEM techniques," Scientific Instrument News, Sep. 2016, vol. 7, pp. 17-23 (Year: 2016).*
(Continued)

*Primary Examiner* — Colin W. Slifka
(74) *Attorney, Agent, or Firm* — Oblon, McClelland, Maier & Neustadt, L.L.P.

(57) ABSTRACT

A catalyst structure includes a carrier having a porous structure composed of a zeolite type compound and at least one catalytic material existing in the carrier. The carrier has channels communicating with each other, and the catalytic material is a metal fine particle and exists at least in the channel of the carrier.

16 Claims, 4 Drawing Sheets

(51) Int. Cl.
*B01J 23/44* (2006.01)
*B01J 23/42* (2006.01)
*B01J 23/745* (2006.01)
*B01J 23/75* (2006.01)
*B01J 23/755* (2006.01)
*B01J 35/00* (2006.01)
*B01J 35/10* (2006.01)
*B01J 37/02* (2006.01)
*B01J 37/10* (2006.01)
*B01J 37/00* (2006.01)
*B01J 29/12* (2006.01)
*B01J 29/14* (2006.01)
*C01B 3/40* (2006.01)

(52) U.S. Cl.
CPC ............ *B01J 29/14* (2013.01); *B01J 35/0013* (2013.01); *B01J 35/0066* (2013.01); *B01J 35/1057* (2013.01); *B01J 35/1061* (2013.01); *B01J 37/0009* (2013.01); *B01J 37/0201* (2013.01); *B01J 37/10* (2013.01); *B01J 2229/186* (2013.01); *C01B 3/40* (2013.01); *C01B 2203/0233* (2013.01); *C01B 2203/0238* (2013.01); *C01B 2203/066* (2013.01); *C01B 2203/107* (2013.01); *C01B 2203/1052* (2013.01); *C01B 2203/1058* (2013.01); *C01B 2203/1064* (2013.01); *C01B 2203/1082* (2013.01); *C01B 2203/1235* (2013.01); *C01B 2203/1241* (2013.01)

(56) References Cited

U.S. PATENT DOCUMENTS

| | | | |
|---|---|---|---|
| 5,236,575 A | 8/1993 | Bennett et al. | |
| 5,275,720 A * | 1/1994 | Ward | B01J 29/084 208/108 |
| 5,849,652 A | 12/1998 | Davies et al. | |
| 6,040,259 A | 3/2000 | Mohr et al. | |
| 6,831,203 B1 | 12/2004 | Mohr et al. | |
| 7,592,291 B2 | 9/2009 | Rollins et al. | |
| 7,893,311 B2 | 2/2011 | Takamatsu et al. | |
| 2003/0109383 A1 | 6/2003 | Koike et al. | |
| 2003/0188991 A1 | 10/2003 | Shan et al. | |
| 2004/0192947 A1 | 9/2004 | Chane-Ching et al. | |
| 2007/0167551 A1 | 7/2007 | Goodwin et al. | |
| 2008/0045400 A1 | 2/2008 | Rollins et al. | |
| 2008/0045403 A1 | 2/2008 | Rollins et al. | |
| 2008/0072705 A1 | 3/2008 | Chaumonnot et al. | |
| 2008/0280754 A1 | 11/2008 | Toledo Antonio et al. | |
| 2008/0293990 A1 | 11/2008 | Stevenson et al. | |
| 2009/0286677 A1 | 11/2009 | Takeshima et al. | |
| 2010/0004118 A1 | 1/2010 | Liu et al. | |
| 2011/0085944 A1 | 4/2011 | Rolllins et al. | |
| 2011/0092356 A1 | 4/2011 | Rollins et al. | |
| 2011/0293941 A1 | 12/2011 | Chaumonnot et al. | |
| 2012/0231948 A1 | 9/2012 | Saito | |
| 2013/0090445 A1 | 4/2013 | Hattori et al. | |
| 2014/0021096 A1 | 1/2014 | Chaumonnot et al. | |
| 2014/0128246 A1 | 5/2014 | Garcia-Martinez | |
| 2014/0147362 A1 | 5/2014 | Sasaki et al. | |
| 2014/0284524 A1 | 9/2014 | Lee et al. | |
| 2014/0303266 A1 | 10/2014 | Hyman | |
| 2015/0290635 A1 | 10/2015 | Inokawa et al. | |
| 2015/0367332 A1 | 12/2015 | Kuvettu et al. | |
| 2016/0023913 A1 | 1/2016 | Goel et al. | |
| 2016/0030934 A1 | 2/2016 | Zhan et al. | |
| 2016/0032202 A1 | 2/2016 | Yonemura et al. | |
| 2016/0137516 A1 | 5/2016 | Kegnaes et al. | |
| 2017/0036197 A1 | 2/2017 | Kegnzes et al. | |
| 2018/0194700 A1 | 7/2018 | Pan et al. | |
| 2020/0254432 A1 | 8/2020 | Shirman et al. | |

FOREIGN PATENT DOCUMENTS

| | | |
|---|---|---|
| EP | 0 485 180 A1 | 5/1992 |
| EP | 1 709 125 A1 | 10/2006 |
| EP | 2 692 439 A1 | 2/2014 |
| JP | 57-46925 A | 3/1982 |
| JP | 05-049943 A | 3/1993 |
| JP | 5-49943 A | 3/1993 |
| JP | 6-142456 A | 5/1994 |
| JP | 7-96195 A | 4/1995 |
| JP | 8-155303 A | 6/1996 |
| JP | 11-33412 A | 2/1999 |
| JP | 11-151440 A | 6/1999 |
| JP | 2000-197822 A | 7/2000 |
| JP | 2000-511107 A | 8/2000 |
| JP | 2000-323164 A | 11/2000 |
| JP | 2002-255537 A | 9/2002 |
| JP | 2002-336704 A | 11/2002 |
| JP | 2004-528158 A | 9/2004 |
| JP | 2005-189586 A | 7/2005 |
| JP | 2005-270734 A | 10/2005 |
| JP | 2005-314208 A | 11/2005 |
| JP | 2006-21994 A | 1/2006 |
| JP | 2007-519799 A | 7/2007 |
| JP | 2008-12382 A | 1/2008 |
| JP | 2008-542177 A | 11/2008 |
| JP | 2009-505830 A | 2/2009 |
| JP | 2009-255014 A | 11/2009 |
| JP | 2010-501496 A | 1/2010 |
| JP | 2010-99638 A | 5/2010 |
| JP | 2010-527769 A | 8/2010 |
| JP | 2011-517439 A | 6/2011 |
| JP | 4879574 B2 | 2/2012 |
| JP | 2012-153654 A | 8/2012 |
| JP | 2012-170951 A | 9/2012 |
| JP | 2012-210557 A | 11/2012 |
| JP | 2013-255911 A | 12/2013 |
| JP | 2014-104428 A | 6/2014 |
| JP | 2014-534902 A | 12/2014 |
| JP | 5700376 B2 | 2/2015 |
| JP | 2015-165138 A | 9/2015 |
| JP | 2015-189586 A | 11/2015 |
| JP | 2016-2527 A | 1/2016 |
| JP | 2016-064407 A | 4/2016 |
| JP | 2016-69318 A | 5/2016 |
| JP | 2016-87522 A | 5/2016 |
| JP | 2016-529190 A | 9/2016 |
| JP | 2017-39218 A | 2/2017 |
| JP | 2017-64647 A | 4/2017 |
| JP | 2017-128480 A | 7/2017 |
| WO | WO 97/45197 A1 | 12/1997 |
| WO | WO 2005/083014 A1 | 9/2005 |
| WO | WO 2007/023558 A1 | 3/2007 |
| WO | WO 2009/096548 A1 | 8/2009 |
| WO | WO 2010/097108 A1 | 9/2010 |
| WO | WO 2010/097224 A2 | 9/2010 |
| WO | WO 2011/065194 A1 | 6/2011 |
| WO | WO 2012/105581 A1 | 8/2012 |
| WO | WO 2012/170421 A1 | 12/2012 |
| WO | WO 2013/057319 A2 | 4/2013 |
| WO | 2013/115213 A1 | 8/2013 |
| WO | WO 2014/083772 A1 | 6/2014 |
| WO | WO 2014/132367 A1 | 9/2014 |
| WO | WO 2015/001123 A1 | 1/2015 |
| WO | WO 2015/155216 A1 | 10/2015 |
| WO | WO 2016/014691 A1 | 1/2016 |
| WO | WO 2016/181622 A1 | 11/2016 |
| WO | WO 2017/000427 A1 | 1/2017 |
| WO | WO 2017/072698 A1 | 5/2017 |

OTHER PUBLICATIONS

Ichikawa, M. et al., "Advanced Technology of Methane Chemical Conversion", CMC, High Technology Information, 2008, 11 pages (with English translation).

Examination Report No. 1 for Standard Patent Application dated May 8, 2020 in corresponding Australian Patent Application No. 2018277966, 4 pages.

(56) References Cited

OTHER PUBLICATIONS

Examination Report No. 1 for Standard Patent Application dated May 8, 2020 in corresponding Australian Patent Application No. 2018276617, 4 pages.
Examination Report No. 1 for Standard Patent Application dated May 8, 2020 in corresponding Australian Patent Application No. 2018276618, 4 pages.
Examination Report No. 1 for Standard Patent Application dated May 8, 2020 in corresponding Australian Patent Application No. 2018277967, 4 pages.
Ismagilov, Z.R., et al., "Structural Changes of Mo/ZSM-5 Catalysts During the Methane Dehydroaromatization", Eurasian ChemTech Journal, vol. 12, 2010, pp. 9-16.
Catalyst Round-table conference news, No. 96, Nov. 1, 2016, 10 pages (with unedited computer generated English translation).
Fujikawa, T., "Current status and future prospects of petroleum refining catalysts", The Nikkan Kogyo Shimbun, Ltd., Jan. 1, 2017, vol. 65, No. 1, p. 22 (with English abstract and cover page).
Haruta, M., "Low-temperature Combustion Catalysts—Mainly for Co Oxidation-". Journal of the Japan Petroleum Institute, vol. 37, No. 5, 1994, pp. 480-491 (with English abstract).
Wu, Z., et al., "Hydrothermal synthesis of LTA-encapsulated metal clusters and consequences for catalyst stability, reactivity, and selectivity", Journal of Catalysis, vol. 311, Jan. 31, 2014, pp. 458-468.
"Reverse Water Gas Shift Catalysts", Industrial Catalyst News, No. 107, Aug. 1, 2017, 2 pages.
Sasaki, M., et al., "Templating fabrication of platinum nanoparticles and nanowires using the confined mesoporous channels of FSM-16—their structural characterization and catalytic performances in water gas shift reaction", Journal of Molecular Catalysis A: Chemical, vol. 141, No. 1/3, May 6, 1999, pp. 223-240.
Fumoto. E., et al., "Catalytic Cracking of Heavy Oil with Iron Oxide-based Catalysts Using Hydrogen and Oxygen Species form Steam", Journal of the Japan Petroleum Institute, vol. 58 No. 5, 2015, pp. 329-335_ Searched on May 17, 2017, URL: https://www.jstage.jst.go.jp/article/jpi/58/5/58_329/_pdf.
Ichikawa, M., et al., "Advanced Technology of Methane Chemical Conversion", CMC Publishing Co., Ltd., 2008, 11 pages (with English translation).
Laprune, D., et al., "Highly Dispersed Nickel Particies Encapsuiated in Multi-hollow Silicalite-1 Single Crystal Nanoboxes: Effects of Siliceous Deposits and Phosphorous Species on the Catalytic Performances", ChemCatChem, vol. 9, No. 12, Feb. 18, 2017, pp. 2297-2307 with cover page.
Office Action dated Jun. 17, 2019 in co-pending U.S. Appl. No. 15/994,098.
International Search Report and Written Opinion dated Aug. 21, 2018 in PCT/JP2018/021082 (with English translation), 25 pages.
International Preliminary Report on Patentability dated Dec. 3, 2019 in PCT/JP2018/021082 (with English translation), 22 pages.
International Search Report and Written Opinion dated Aug. 21, 2018 in PCT/JP2018/021078 (with English translation), 24 pages.
International Preliminary Report on Patentability dated Dec. 3, 2019 in PCT/JP2018/021078 (with English translation), 21 pages.
International Search Report and Written Opinion dated Aug. 21, 2018 in PCT/JP2018/021079 (with English translation), 23 pages.
International Preliminary Report on Patentability dated Dec. 3, 2019 in PCT/JP2018/021079 (with English translation), 20 pages.
International Search Report and Written Opinion dated Jul. 31, 2018 in PCT/JP2018/021084 (with English translation), 19 pages.
International Preliminary Report on Patentability dated Dec. 3, 2019 in PCT/JP2018/021084 (with English translation), 16 pages.
International Search Report and Written Opinion dated Aug. 21, 2018 in PCT/JP2018/021080 (with English translation), 25 pages.
International Preliminary Report on Patentability dated Dec. 3, 2019 in PCT/JP2018/021080 (with English translation), 22 pages.
International Search Report and Written Opinion dated Sep. 4, 2018 in PCT/JP2018/021081 (with English translation), 22 pages.
International Preliminary Report on Patentability dated Dec. 3, 2019 in PCT/JP2018/021081 (with English translation), 19 pages.
International Search Report and Written Opinion dated Aug. 21, 2018 in PCT/JP2018/021086 (with English translation), 23 pages.
International Preliminary Report on Patentability dated Dec. 3, 2019 in PCT/JP2018/021086 (with English translation), 20 pages.
International Search Report and Written Opinion dated Aug. 14, 2018 in PCT/JP2018/021090 (with English translation), 26 pages.
International Preliminary Report on Patentability dated Dec. 3, 2019 in PCT/JP2018/021090 (with English translation), 23 pages.
International Search Report and Written Opinion dated Aug. 21, 2018 in PCT/JP2018/021091 (with English translation), 23 pages.
International Preliminary Report on Patentability dated Dec. 3, 2019 in PCT/JP2018/021091 (with English translation), 20 pages.
International Search Report and Written Opinion dated Aug. 14, 2018 in PCT/JP2018/021092 (with English translation), 26 pages.
International Preliminary Report on Patentability dated Dec. 3, 2019 in PCT/JP2018/021092 (with English translation), 22 pages.
International Search Report and Written Opinion dated Aug. 21, 2018 in PCT/JP2018/021094 (with English translation), 20 pages.
International Preliminary Report on Patentability dated Dec. 3, 2019 in PCT/JP2018/021094 (with English translation), 17 pages.
International Search Report and Written Opinion dated Aug. 21, 2018 in PCT/JP2018/021095 (with English translation), 22 pages.
International Preliminary Report on Patentability dated Dec. 3, 2019 in PCT/JP2018/021095 (with English translation), 19 pages.
U.S. Appl. No. 16/698,468, filed Nov. 27, 2019, Takao Masuda.
U.S. Appl. No. 16/698,496, filed Nov. 27, 2019, Takao Masuda.
U.S. Appl. No. 16/698,527, filed Nov. 27, 2019, Takao Masuda.
U.S. Appl. No. 16/698,545, filed Nov. 27, 2019, Takao Masuda.
U.S. Appl. No. 16/698,558, filed Nov. 27, 2019, Takao Masuda.
U.S. Appl. No. 16/698,567, filed Nov. 27, 2019, Takao Masuda.
U.S. Appl. No. 16/698,579, filed Nov. 27, 2019, Takao Masuda.
U.S. Appl. No. 16/698,602, filed Nov. 27, 2019, Takao Masuda.
U.S. Appl. No. 16/698,636, filed Nov. 27, 2019, Takao Masuda.
U.S. Appl. No. 16/698,650, filed Nov. 27, 2019, Takao Masuda.
U.S. Appl. No. 16/698,670, filed Nov. 27, 2019, Takao Masuda.
U.S. Appl. No. 16/698,679, filed Nov. 27, 2019, Takao Masuda.
Office Action dated Aug. 14, 2020 in Australian Patent Application No. 2018276617. Cited references therein have been filed and considered.
Yue et al., "Directly transforming as-synthesized MCM-41 to mesoporous MFI zeolite", Journal of Materials Chemistry, 2008, 18, pp. 2044-2050.
Makshina et al., "Methanol oxidation on LaCo mixed oxide supported onto MCM-41 molecular sieve", Catalysis Today, vol. 131, 2008, pp. 427-430.
Wang et al., "Research into eliminating particulate from diesel engine exhaust over zeolite covered with catalysts of perovskite-type oxides", IEEE Computer Society, 2009, pp. 493-495.
Dai et al., "Hollow zeolite encapsulated Ni-Pt bimetals for sintering and coking resistant dry reforming of methane", Journal of Materials Chemistry A, 2015, vol. 3, No. 32, p. 1 6461-1 6468.
Liu et al., "Drying of Ni/Alumina Catalysts: Control of the Metal Distribution Using Surfactants and the Melt Infiltration Method", Industrial & Engineering Chemistry Research, vol. 53, No. 14, 2014, pp. 5792-5800.
Mishra et al., "α-$Fe_2O_3$ as a photocatalytic material: A review", Applied Catalysis A: General, vol. 498, 28, 2015, pp. 126-141.
Extended European Search Report dated Jan. 11, 2021 in European Patent Application No. 18808738.1.
Rule 164 (1) dated Jan. 11, 2021 in European Patent Application No. 18810518.3.
Extended European Search Report dated Dec. 7, 2021 in European Patent Application No. 18809577.2.
Extended European Search Report dated Nov. 13, 2020 in European Patent Application No. 18810103.4.
Extended European Search Report dated Dec. 7, 2020 in European Patent Application No. 18808807.4.
Extended European Search Report dated Dec. 7, 2020 in European Patent Application No. 18809883.4.
Extended European Search Report dated Jan. 11, 2021 in European Patent Application No. 18809956.8.

(56) References Cited

OTHER PUBLICATIONS

Extended European Search Report dated Jan. 28, 2021 in European Patent Application No. 18810418.6.
Extended European Search Report dated Jan. 28, 2021 in European Patent Application No. 18810207.3.
Extended European Search Report dated Jan. 28, 2021 in European Patent Application No. 1 8810208.1.
Extended Eurropean Search Report dated Jan. 29, 2021 in European Patent Application No. 18809886.7.
Extended European Search Report dated Feb. 8, 2021 in European Patent Application No. 18809413.0.
Extended European Search Report dated Feb. 12, 2021 in European Patent Application No. 18810519.1.
Dai et al., "Hollow zeolite encapsulated Fe-Cu bimetallic catalysts for phenol degradation", Catalysis Today, 2017, vol. 297, pp. 335-343.
Extended European Search Report dated Mar. 23, 2021 in European Patent Application No. 18810518.3, 21 pages.
Li, S., et al., "Diffusion-Driven Selectivity in Oxidation of CO in the Presence of Propylene Using Zeolite Nano Shell as Membrane", ACS Catalysis, vol. 4, No. 12, Nov. 5, 2014, pp. 4299-4303, XP055785093, US ISSN:2155-5435, DOI:10.1021/cs501349b.
Shiwen Li, et al., "Diffusion Driven Selectivity in Oxidation of CO in the Presence of Propylene Using Zeolite Nano Shell as Membrane", ACS Catalysis, vol. 4, No. 12, Dec. 5, 2014, pp. 4299-4303, XP055676549, US ISSN:2155-5435, DOI:10.1021/cs501349b.
Office Action dated Jul. 22, 2021 issued in the U.S. Appl. No. 16/698,670, 52 pages.
Office Action dated May 12, 2021 issued in the U.S. Appl. No. 16/698,496, 23 pages.
Office Action dated Jun. 24, 2021 in the relevant U.S. Appl. No. 16/698,545, 28 pages.
Office Action dated Jun. 18, 2021 in the relevant U.S. Appl. No. 16/698,679, 50 pages.
Wang et al., "Study on methane aromatization over $MoO_3$/HMCM-49 catalyst", Catalysis Today, 93-95, pp. 75-80, 2004.
College of Engineering, UC Santa Barbara [retrieved on Apr. 26, 2021] Retrieved from the Internet :< URL: https://sites.engineering.ucsb.edu/-jbraw/chemreacfun/ch7/slides-masswrxn-2up.pdf>, 2020, p. 81.
Office Action dated Apr. 30, 2021 in the relevant U.S. Appl. No. 16/698,558, 45 pages.
Examination Report dated May 7, 2021 in the Australian Patent Application No. 2018277966, 3 pages.
Office Action dated Mar. 19, 2021 in the Australian Patent Application No. 2018277966, 4 pages.
Office Action dated Aug. 4, 2021 issued in U.S. Appl. No. 16/698,650, 54 pages.
Office Action dated Aug. 3, 2021 issued in U.S. Appl. No. 16/698,636, 51 pages.
Office Action dated Jul. 28, 2021 issued in U.S. Appl. No. 16/698,527, 47 pages.
Cho et al., "Zeolite-Encapsulated Pt Nanoparticles for Tandem Catalysis", J. Am. Chem. Soc., 2018, 140, pp. 13514-13520.
Li et al., "Ultrastable Perovskite-Zeolite Composite Enabled by Encapsulation and In Situ Passivation", Angew, Chem. Sep. 2020, 132, pp. 23300-23306.
Wang, et al. "In Situ Encapsulated Pt Nanoparticles Dispersed in Low Temperature Oxygen for Partial Oxidation of Methane to Syngas", Catalysts, 2019, 9, pp. 720-734.

* cited by examiner

CATALYST STRUCTURE AND METHOD FOR PRODUCING THE CATALYST STRUCTURE

BACKGROUND

Technical Field

The present disclosure relates to a catalyst structure and a method for producing the catalyst structure.

Background

In recent years, as a measure against global warming, there is a focus on a technology of bringing carbon dioxide and methane, which are causative substance of global warming into contact with one another, and converting them into a synthesis gas containing carbon monoxide and hydrogen (dry reforming).

As for a catalyst to be used when producing such a synthesis gas, Patent Document 1, for example, discloses a catalyst that utilizes an oxygen-deficient perovskite-type composite oxide containing Mn, a predetermined alkaline earth metal and the like as a carrier, and utilizes nickel as a carried metal.

However, the reaction of bringing carbon dioxide into contact with methane and converting them into a synthesis gas containing carbon monoxide and hydrogen needs to be performed at a high temperature of 800° C. or higher. In the catalyst disclosed in Japanese Patent Application Laid Open No. 2013-255911 (Patent Document 1), since a metal is carried on a surface of a carrier, the catalyst particles aggregate with each other at a high temperature and the catalytic activity tends to decrease, and also the catalytic activity is not necessarily sufficient.

As for a method of inhibiting the adhesion among catalyst particles and increasing the specific surface area of the catalyst particles, Japanese Patent Application Laid Open No. 2016-2527, for example, discloses a method of fixing catalyst particles on a substrate surface, and performing oxidation treatment and reduction treatment under predetermined conditions.

However, even with the catalyst structure disclosed in Japanese Patent Application Laid Open No. 2016-2527 in which the catalyst particles are fixed on the surface of the base material, the catalytic activity decreases when the catalyst structure is placed in a reaction field of a high temperature. For this reason, in order to regenerate the catalyst function, the oxidation treatment and the reduction treatment need to be performed again and the operation becomes complicated.

In addition, hydrogen is expected as a raw material of new energy and used for production in a hydrogen producing apparatus for a hydrogen station and in a fixed fuel cell system expected to be widely spread to homes and small and medium-sized businesses, and the like, and an on-site production is under consideration.

For example, steam reforming of natural gas also referred to as steam methane reforming (SMR) is a major method of producing a large quantity of hydrogen for commercial use, in addition to hydrogen used in an industrial ammonia synthesis. In addition, the method is the most inexpensive method. When a metal catalyst exists at a high temperature (700 to 1100° C.), steam reacts with methane, and carbon monoxide and hydrogen are obtained.

Recently, in addition to a fuel reforming apparatus utilizing the above described steam reforming reaction, a reforming apparatus of a type using partial oxidation reaction in combination with steam reforming reaction has been developed (Japanese Patent Application Laid Open No. 2000-323164) mainly targeting on fuel cell power generation apparatuses for electric vehicles and of a portable type that require to be compact and to start up in a short time period.

Here, the steam reforming reaction (reaction formula (2) indicated below) is an endothermic reaction in which heat must be given from outside. On the other hand, the partial oxidation reaction (reaction formula (1) indicated below) is an exothermic reaction. $CH_4 + \frac{1}{2}O_2 \rightarrow 2H_2 + CO$ ... (1), and $CH_4 + H_2O\ 3H_2 + CO$ ... (2)

Accordingly, in the reforming apparatus as described above, by concomitantly using the partial oxidation reaction in the same reaction vessel, it is possible to supply heat required for the steam reforming reaction and perform the reaction, and thereby an external heating device becomes unnecessary. Accordingly, the apparatus becomes compact, and the start-up period of the reformer can be shortened.

However, in the reforming apparatus as described above, since a combustion reaction occurs due to the partial oxidation reaction, even under the presence of a very small amount of oxygen, an aggregation of the catalyst may be caused depending on a temperature history at high temperature, and a catalytic performance may be lost in a short time period. For this reason, according to a conventional apparatus and an operation method thereof, the performance of the reformer deteriorates along with the deterioration of the catalyst, with the lapse of time.

In addition, thermodynamically, the steam reforming reaction is more advantageous at a higher temperature, and a reaction temperature of 700° C. or higher is necessary depending on the type of hydrocarbon. Accordingly, a catalyst for steam reforming of hydrocarbons is required to have excellent heat resistance, high temperature stability and a fixed high temperature strength, as well as high activity. Conventionally, transition metal carried on a carrier is generally used as a catalyst for steam reforming of hydrocarbons. The order of activities of metal catalysts in the steam reforming of methane ($CH_4$) is determined to be Rh, Ru>Ir>Ni, Pt, Pd (Masaru Ichikawa, et al., "Advanced Technology of Methane Chemical Conversion", CMC Publishing Co., Ltd., in 2008). Among the metals, the precious metals Rh and Ru have the highest activity, but the cost is high. In addition, Ni is relatively inexpensive and is widely used industrially, but the activity and heat resistance are not sufficient if fine particles of Ni are merely used as a catalyst having a conventional morphology.

The present disclosure is related to providing a catalyst structure with a reduced decrease in a catalytic activity and capable of efficiently producing a synthesis gas containing carbon monoxide and hydrogen, and to providing a method for producing the catalyst structure.

The present disclosure is also related to providing a catalyst structure capable of adequately keeping the catalytic activity by inhibiting the aggregation of catalyst particles and efficiently producing a reformed gas containing hydrogen from a reforming feedstock including hydrocarbons, and to providing a method for producing the catalyst structure.

SUMMARY

A first aspect of the present disclosure is a catalyst structure including:

a carrier of a porous structure composed of a zeolite type compound; and at least one catalytic material existing in the carrier, the carrier having channels communicating with each other, the catalytic material being a metal fine particle and existing at least in the channel of the carrier.

A second aspect of the present disclosure is a method for producing a catalyst structure including:

baking a precursor material (B) having a precursor material (A) for obtaining a carrier of a porous structure composed of a zeolite type compound impregnated with a metal-containing solution;

hydrothermally treating a precursor material (C) obtained by baking the precursor material (B); and subjecting the hydrothermally treated precursor material (C) to reduction treatment.

According to the present disclosure, the decrease of the catalytic activity is inhibited, and it becomes possible to efficiently produce a synthesis gas containing carbon monoxide and hydrogen.

In addition, according to the present disclosure, it becomes possible to adequately keep the catalytic activity by inhibiting the aggregation of catalyst particles, and efficiently produce a reformed gas containing hydrogen from a reforming feedstock containing a hydrocarbon.

DETAILED DESCRIPTION

Embodiments

Hereinafter, embodiments of the present disclosure will be described in detail with reference to the accompanying drawings.

[Configuration of Catalyst Structure]

Figure 1A:
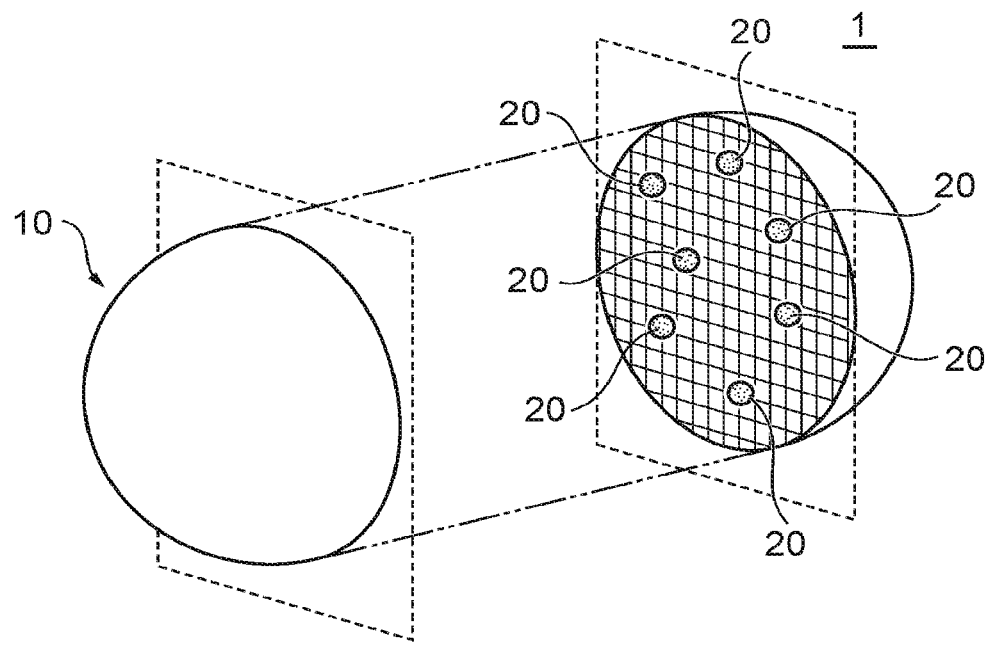
FIG. 1A is a perspective view schematically showing a catalyst structure for producing a synthesis gas according to an embodiment of the present disclosure so that the internal structure can be understood (partly shown in a cross section)
Figure 1B:
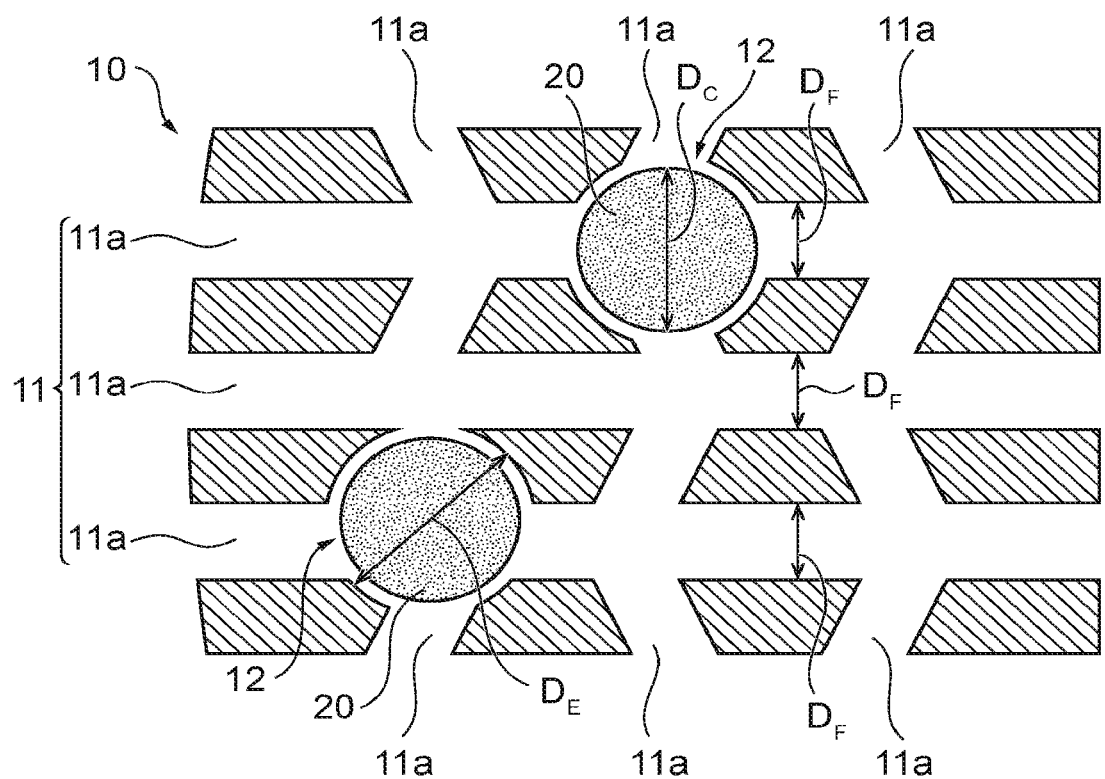
FIG. 1B is a partially enlarged cross-sectional view of the catalyst structure.

FIG. 1A is a perspective view schematically showing a configuration of a catalyst structure according to an embodiment of the present disclosure (partly shown in a cross section), and FIG. 1B is a partially enlarged cross-sectional view. The catalyst structure in FIG. 1 shows an example of the catalyst structures, and a shape, a dimension and the like of each configuration according to the present disclosure are not limited to the shape and the dimension in FIGS. 1A and 1B.

As is shown in FIG. 1A, the catalyst structure 1 includes a carrier 10 having a porous structure composed of a zeolite type compound, and at least one catalytic material 20 existing in the carrier 10.

In the catalyst structure 1, a plurality of the catalytic materials 20, 20 and so on are included inside the porous structure of the carrier 10. The catalytic material 20 may be a substance having a catalytic ability (catalytic activity), and is specifically a metal fine particle. The metal fine particle will be described in detail later.

The carrier 10 has a porous structure, and, preferably, as shown in FIG. 1B, with a plurality of pores 11a, 11a and so on being formed, has channels 11 communicating with each other. The catalytic material 20 exists at least in the channel 11 of the carrier 10, and is preferably held at least in the channel 11 of the carrier 10.

Due to such a configuration, the movement of the catalytic material 20 in the carrier 10 is restricted, and the catalytic materials 20 and 20 are effectively prevented from aggregating with each other. As a result, a decrease in an effective surface area of the catalytic material 20 can be effectively inhibited, and the catalytic activity of the catalytic material 20 continues over a long period of time. Specifically, with the catalyst structure 1, it is possible to inhibit the decrease in the catalytic activity due to aggregation of the catalytic materials 20, and achieve the extension of the life of the catalyst structure 1. In addition, due to the extension of the life of the catalyst structure 1, it becomes possible to reduce the frequency of replacement of the catalyst structure 1, greatly reduce the amount of waste of the used catalyst structure 1, and achieve resource saving.

Usually, when using the catalyst structure in a fluid, there is a possibility that the catalyst structure receives an external force from the fluid. In this case, if the catalytic material is only attached to an outer surface of the carrier 10, the catalytic material may easily detach from the outer surface of the carrier 10 due to an influence of the external force applied by the fluid. On the other hand, with the catalyst structure 1, the catalytic material 20 is held at least in the channel 11 of the carrier 10, and accordingly, even if subjected to the external force from the fluid, the catalytic material 20 is less likely to detach from the carrier 10. Specifically, when the catalyst structure 1 is in the fluid, the fluid flows into the channel 11 from the pore 11a of the carrier 10, and accordingly, it is considered that a speed of the fluid flowing in the channel 11 becomes slower than the speed of the fluid flowing on the outer surface of the carrier 10, due to flow path resistance (frictional force). Due to an influence of such flow path resistance, the pressure from the fluid applied to the catalytic material 20 held in the channel 11 becomes lower than the pressure from the fluid applied to the catalytic material outside the carrier 10. Because of this, the catalytic material 20 existing in the carrier 11 can be effectively inhibited from being detached, and it becomes possible to stably keep the catalytic activity of the catalytic material 20 for a long period of time. It is considered that the above described flow path resistance becomes greater as the channel 11 of the carrier 10 has a plurality of bends and branches, and the inside of the carrier 10 is more complicated and has a three-dimensional structure.

In addition, it is preferable that the channel 11 has any one of a one-dimensional pore, a two-dimensional pore and a three-dimensional pore defined by a framework structure of a zeolite type compound, and an enlarged diameter portion 12 different from any one of the above described one-dimensional pore, the above described two-dimensional pore and the above described three-dimensional pore. It is preferable that the catalytic material 20 exists at least at the enlarged diameter portion 12, and it is more preferable that the catalytic material 20 is included at least in the enlarged diameter portion 12. Due to the above configuration, the movement of the catalytic material 20 in the carrier 10 is further restricted, and it is possible to more effectively prevent the catalytic material 20 from detaching and/or the catalytic materials 20 and 20 from aggregating with each other. The inclusion refers to such a state that the catalytic material 20 is included in the carrier 10. The catalytic material 20 and the carrier 10 do not necessarily come in direct contact with each other, but the catalytic material 20 may be indirectly held by the carrier 10 in such a state that another substance (for example, surface active agent or the like) interposes between the catalytic material 20 and the carrier 10. Herein, the term "one-dimensional pore" refers to a tunnel-type or cage-type pore forming a one-dimensional channel, or a plurality of tunnel-type or cage-type pores (a plurality of one-dimensional channels) forming a plurality of one-dimensional channels. The two-dimensional pore refers to a two-dimensional channel formed of a plurality of one-dimensional channels that are two-dimensionally connected, and the three-dimensional pore refers to a three-dimensional channel formed of a plurality of one-dimensional channels that are three-dimensionally connected.

FIG. 1B shows a case in which the catalytic material 20 is included in the enlarged diameter portion 12, but the present disclosure is not limited to this configuration, and the catalytic material 20 may exist in the channel 11 in such a state that a part of the catalytic material 20 extends outside the enlarged diameter portion 12. In addition, the catalytic material 20 may be partially embedded in a part of the channel 11 (for example, inner wall part of channel 11) other than the enlarged diameter portion 12, or may be held by fixation or the like.

In addition, it is preferable that the enlarged diameter portion 12 makes a plurality of pores 11a and 11a forming any one of the above described one-dimensional pore, the above described two-dimensional pore and the above described three-dimensional pore communicate with each other. By the above configuration, a separate channel different from the one-dimensional pore, the two-dimensional pore or the three-dimensional pore is provided inside the carrier 10, and accordingly, it is possible to exhibit the function of the catalytic material 20 more.

In addition, it is preferable that the channel 11 is three-dimensionally formed in the inside of the carrier 10 so as to include a branched portion or a merging portion, and the enlarged diameter portion 12 is provided in the above described branched portion or the merging portion of the channels 11.

The average inner diameter $D_F$ of the channel 11 formed in the carrier 10 is calculated from the average value of the minor axis and the major axis of the pore 11a forming any one of the above described one-dimensional pore, the above described two-dimensional pore and the above described three-dimensional pore, is 0.1 nm to 1.5 nm, for example, and preferably is 0.5 nm to 0.8 nm. In addition, the inner diameter $D_E$ of the enlarged diameter portion 12 is, for example, 0.5 to 50 nm, preferably is 1.1 to 40 nm, and more preferably is 1.1 nm to 3.3 nm. The inner diameter $D_E$ of the enlarged diameter portion 12 depends on, for example, a pore diameter of a precursor material (A) to be described later, and on an average particle diameter $D_C$ of the included catalytic material 20. The inner diameter $D_E$ of the enlarged diameter portion 12 has a size capable of including the catalytic material 20.

The carrier 10 is composed of a zeolite type compound. Examples of the zeolite type compound include silicate compounds such as zeolite (aluminosilicate), cation exchange zeolite and silicalite, zeolite analogous compounds such as aluminoborate, aluminoarsenate and germanate, and a phosphate-based zeolite analogues such as molybdenum phosphate. Among the compounds, the zeolite type compound is preferably a silicate compound.

The framework structure of the zeolite type compound is selected from FAU type (Y type or X type), MTW type, MFI type (ZSM-5), FER type (ferrierite), LTA type (A type), MWW type (MCM-22), MOR type (mordenite), LTL type (L type), BEA type (beta type) and the like, is preferably the MFI type, and is more preferably the ZSM-5. In the zeolite type compound, a plurality of pores having pore diameters corresponding to each of the framework structures are formed. For example, the maximum pore diameter of the MFI type is 0.636 nm (6.36 Å), and the average pore diameter is 0.560 nm (5.60 Å).

Hereinafter, the catalytic material 20 will be described in detail.

The catalytic material 20 is a metal fine particle. There is a case where the metal fine particle is held in the channel 11 in a state of a primary particle, and a case where the metal fine particle is held in the channel 11 in a state of a secondary particle formed by the aggregation of the primary particles. In any case, the average particle diameter $D_C$ of the metal fine particles is preferably greater than the average inner diameter $D_F$ of the channels 11, and is equal to or smaller than the inner diameter $D_E$ of the enlarged diameter portion 12 ($D_F<D_C \leq D_E$). Such a catalytic material 20 is preferably included in the enlarged diameter portion 12 in the channel 11, and the movement of the catalytic material 20 in the carrier 10 is restricted. Therefore, even when the catalytic material 20 has received an external force from the fluid, the movement of the catalytic material 20 in the carrier 10 is inhibited, and the catalyst structure can effectively prevent the catalytic materials 20, 20 and so on respectively included in the enlarged diameter portions 12, 12 and so on dispersed and arranged in the channel 11 of the carrier 10, from coming in contact with each other.

In addition, the average particle diameter $D_C$ of the metal fine particles is, in both cases of the primary particles and the secondary particles, preferably 0.08 nm to 30 nm, is more preferably 0.08 nm or more and less than 25 nm, is further preferably 0.4 nm to 11.0 nm, is particularly preferably 0.8 nm to 2.7 nm, and is most preferably 1.2 nm to 2.6 nm. In addition, a ratio ($D_C/D_F$) of the average particle diameter $D_C$ of the metal fine particles to the average inner diameter $D_F$ of the channels 11 is preferably 0.05 to 300, is more preferably 0.1 to 30, is further preferably 1.1 to 30, and is particularly preferably 1.4 to 3.6.

In addition, when the catalytic material 20 is the metal fine particle, it is preferable that the metal element (M) of the metal fine particle is contained in an amount of 0.5 to 2.5 mass % with respect to the catalyst structure 1, and it is more preferable that the metal element (M) of the metal fine particle is contained in an amount of 0.5 to 1.5 mass % with respect to the catalyst structure 1. For example, when the metal element (M) is Ni, the content (mass %) of the Ni element is expressed by {(mass of Ni element)/(mass of all elements in catalyst structure 1)}×100.

The metal fine particle may be composed of an unoxidized metal, and for example, may be composed of a single metal or a mixture of two or more metals. In the present specification, "metal" (of a material) forming the metal fine particle is a single metal containing one type of metal element (M) and a metal alloy containing two or more types of metal elements (M), and is a generic term of metal containing one or more metal elements.

Examples of such metals include rhodium (Rh), ruthenium (Ru), iridium (Ir), palladium (Pd), platinum (Pt), molybdenum (Mo), tungsten (W), iron (Fe), cobalt (Co), chromium (Cr), cerium (Ce), copper (Cu), magnesium (Mg), aluminum (Al) and nickel (Ni), and it is preferable that the metal fine particle contains any one or more of the above described metals as a main component. In particular, it is preferable that the metal fine particle is a fine particle composed of at least one metal selected from the group consisting of rhodium (Rh), ruthenium (Ru), iridium (Ir), palladium (Pd), platinum (Pt), iron (Fe), cobalt (Co) and nickel (Ni), from the viewpoint of catalytic activity, is more preferable that the metal fine particle is at least one metal selected from the group consisting of the rhodium (Rh), the ruthenium (Ru), the iridium (Ir) and the nickel (Ni), from the viewpoint of catalytic activity, and is particularly preferable that the metal fine particle is the nickel (Ni) among the above metals, from the viewpoint of balance between the price and the performance.

In addition, a ratio of silicon (Si) forming the carrier 10 to the metal element (M) forming the metal fine particle (atomic ratio Si/M) is preferably 10 to 1000, and is more preferably 50 to 200. When the above described ratio is greater than 1000, the activity is low and there is a possibility that an action of a catalytic material cannot be sufficiently obtained. On the other hand, if the above described ratio is less than 10, the ratio of the metal fine particle becomes too large, and the strength of the carrier 10 tends to decrease. Note that the metal fine particle 20 referred herein means a fine particle existing or carried in the inside of the carrier 10, and does not include a metal fine particle attached to the outer surface of the carrier 10.

[Function of Catalyst Structure]

As described above, the catalyst structure 1 includes a carrier 10 having a porous structure, and at least one catalytic material 20 existing in the carrier. As the catalytic material 20 existing in the carrier 10 comes in contact with a fluid, the catalyst structure 1 exhibits a catalytic ability corresponding to the function of the catalytic material 20. Specifically, the fluid that have contacted an outer surface 10a of the catalyst structure 1 flows into the inside of the carrier 10 through a pore 11a formed in the outer surface 10a and is guided into the channel 11, moves through the channel 11, and exits to the outside of the catalyst structure 1 through another pore 11a. A catalytic reaction corresponding to the catalytic material 20 occurs as the fluid contacts the catalytic material 20 held in the channel 11, in a path in which the fluid moves through the channel 11. In addition, the catalyst structure 1 has a molecular sieving ability since the carrier has a porous structure.

Firstly, the molecular sieving ability of the catalyst structure 1 will be described, by taking a case where a fluid is a methane-containing gas and carbon dioxide as an example. The methane-containing gas refers to a mixed gas containing methane and a gas other than methane. In addition, the methane-containing gas and the carbon dioxide may be sequentially brought into contact with the catalyst structure 1, or may be brought into contact at the same time.

Figure 2A:
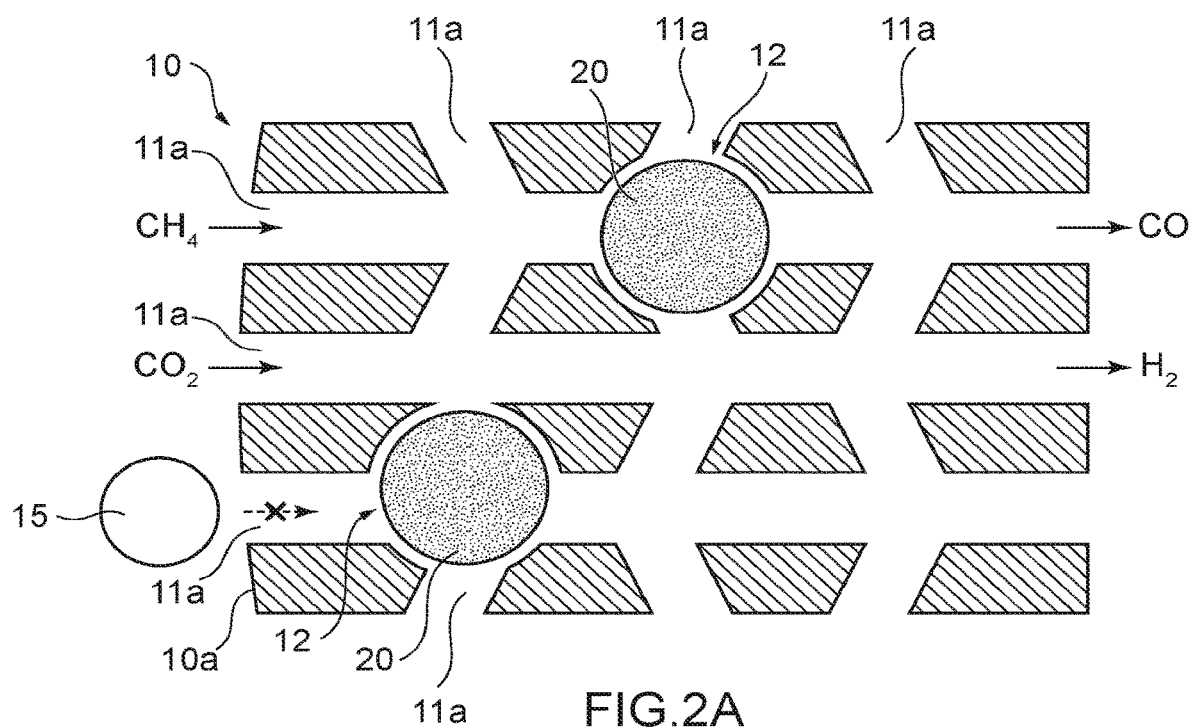
FIG. 2A is a partially enlarged cross-sectional view for describing a sieve function which is an example of functions of the catalyst structure for producing the synthesis gas in FIG. 1A.

As is shown in FIG. 2A, a compound composed of a molecule having a size equal to or smaller than the pore diameter of the pore 11a, in other words, having a size equal to or smaller than the inner diameter of the channel 11 (for example, methane and carbon dioxide) is capable of flow into the carrier 10. On the other hand, a component 15 composed of a molecule having a size exceeding the pore diameter of the pore 11a is not capable of flow into the carrier 10. Thus, when the fluid contains a plurality of types of compounds, a reaction of a compound incapable of flowing into the carrier 10 is restricted, and it is possible for a compound capable of flowing into the carrier 10 to cause a reaction. In the present embodiment, a reaction between methane and carbon dioxide proceeds.

Among compounds produced by the reaction in the carrier 10, only a compound composed of a molecule having a size equal to or less than the pore diameter of the pore 11a is capable of exiting to the outside of the carrier 10 through the pore 11a, and is obtained as a reaction product. On the other hand, a compound incapable of exiting through the pore 11a to the outside of the carrier 10 can be exited to the outside of the carrier 10 after being converted into a compound composed of a molecule having a size capable of exiting to the outside of the carrier 10. Thus, by using the catalyst structure 1, a specific reaction product can be selectively obtained. In the present embodiment, specifically, methane reacts with carbon dioxide, and a synthesis gas containing carbon monoxide and hydrogen is obtained as a reaction product.

In addition, as another example, when a fluid is a reforming feedstock containing methane as hydrocarbon, a compound (for example, methane and water) composed of a molecule having a size equal to or smaller than the inner diameter of the channel 11 can flow into the carrier 10 due to the above described molecular sieving ability, and a steam reforming reaction between methane and water proceeds. Note that the reforming feedstock is not limited to materials containing methane, but may be materials including hydrocarbons other than methane, and may be, for example, a mixed gas such as natural gas, or a mixed solution such as petroleum. Examples of the components contained in the reforming feedstock include straight-chain or branched type saturated aliphatic hydrocarbons having approximately 1 to 16 carbon atoms such as methane, ethane, propane, butane, pentane, hexane, heptane, octane, nonane and decane, alicyclic saturated hydrocarbons such as cyclohexane, methylcyclohexane and cyclooctane, monocyclic and polycyclic aromatic hydrocarbons, and various hydrocarbons such as city gas, alcohols such as methanol, LPG, naphtha and kerosene.

In this case, methane reacts with water, and a reformed gas containing carbon monoxide and hydrogen is obtained as a reaction product.

Figure 2B:
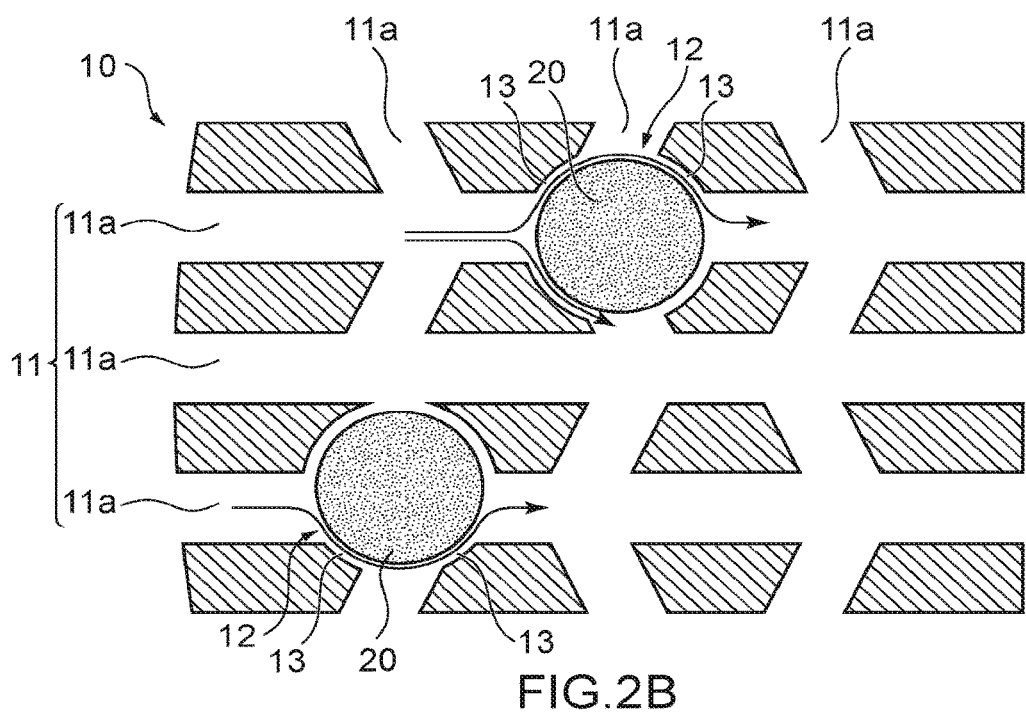
FIG. 2B is a partially enlarged cross-sectional view for describing a catalytic ability.

In the catalyst structure 1, as is shown in FIG. 2B, the catalytic material 20 is included in the enlarged diameter portion 12 of the channel 11. When the average particle diameter $D_C$ of the catalytic materials 20 (metal fine particles) is greater than the average inner diameter $D_F$ of the channels 11 and smaller than the inner diameter $D_E$ of the enlarged diameter portion 12 ($D_F < D_C < D_E$), a small channel 13 is formed between the catalytic material 20 and the enlarged diameter portion 12. Then, as is shown by an arrow in FIG. 2B, a fluid that have flowed into the small channel 13 comes in contact with the catalytic material 20. The catalytic materials 20 are each included in the enlarged diameter portion 12, and thus the movement in the carrier 10 is limited. For this reason, the catalytic materials 20 in the carrier 10 is prevented from being aggregated with each other. As a result, it becomes possible to stably keep a large contact area between the catalytic material 20 and the fluid.

In the present embodiment, by using the catalyst structure 1, it is possible to produce a synthesis gas containing carbon monoxide and hydrogen while using a methane-containing gas and carbon dioxide as feedstocks. This catalytic reaction is performed at a high temperature, for example, of 800° C. or higher, and since the catalytic material 20 exists in the carrier 10, it is less susceptible to heating. As a result, the decrease in the catalytic activity is inhibited, and the extension of the life of the catalyst structure 1 can be achieved.

In addition, by using the catalyst structure 1, it is possible to produce a reformed gas containing carbon monoxide and hydrogen by causing a reforming feedstock containing a hydrocarbon to react with water. This catalytic reaction is performed at a high temperature, for example, of 800° C. or higher, but since the catalytic material 20 exists in the carrier 10, it is less susceptible to heating. As a result, the decrease in the catalytic activity is inhibited, and the extension of the life of the catalyst structure 1 can be achieved.

In addition, the catalyst structure 1 can be preferably used in the case where a reformed gas containing carbon dioxide and hydrogen is produced by both the partial oxidation reaction and the steam reforming reaction that use a reforming feedstock, for example, containing methanol. In this reaction system, a combustion reaction occurs due to the partial oxidation reaction, and thus, there has been conventionally a problem that the catalytic material tends to easily aggregate depending on a temperature history of high temperature, even under the presence of trace oxygen. However, with to the catalyst structure 1, since the catalytic material 20 is included in the carrier 10, it is less susceptible to heating and/or oxidation. Because of the above reason, using the catalyst structure 1, it is possible to inhibit a decrease in the catalytic activity, and to prevent a decrease in the performance of a reformer that use the partial oxidation reaction and the steam reforming reaction together.

[Method for Producing Catalyst Structure]

Figure 3:
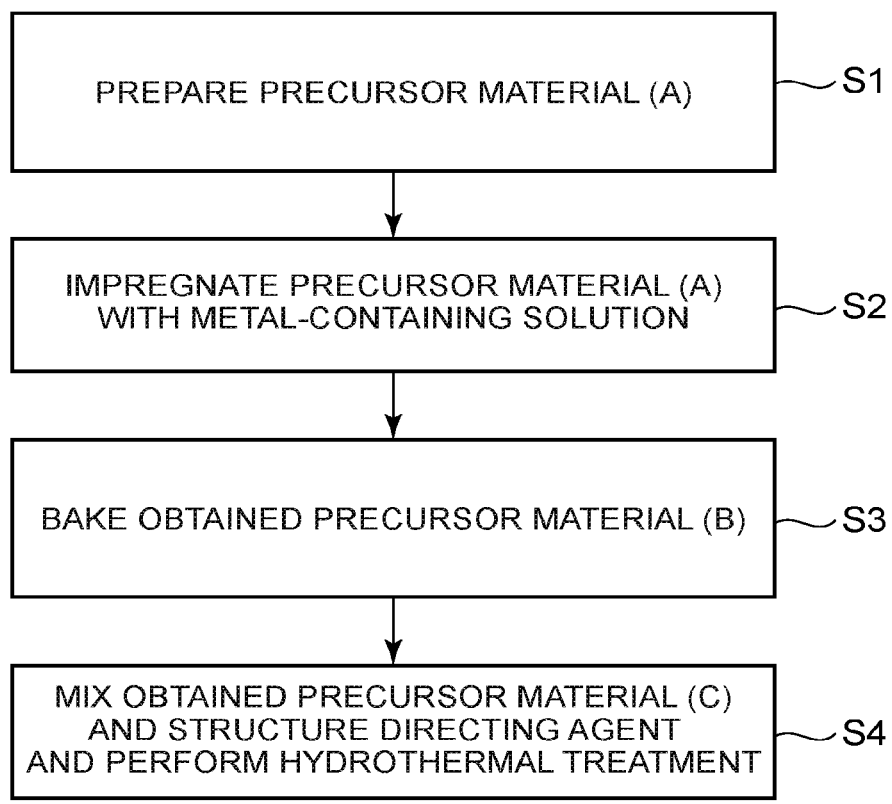
FIG. 3 is a flow chart showing an example of a method for producing the catalyst structure for producing the synthesis gas in FIG. 1A.

FIG. 3 is a flow chart showing a method for producing the catalyst structure 1 of FIG. 1A. Hereinafter, one example of methods for producing the catalyst structure will be described by taking a case where the catalytic material 20 existing in the carrier is a metal fine particle, as an example.

(Step S1: Preparation Step)

As is shown in FIG. 3, first, a precursor material (A) for obtaining a carrier of a porous structure composed of a zeolite type compound is prepared. The precursor material (A) is preferably a regular mesoporous substance, and can be appropriately selected depending on the type (composition) of the zeolite type compound forming the carrier of the catalyst structure.

Here, when the zeolite type compound forming the carrier of the catalyst structure is a silicate compound, it is preferable that the regular mesoporous substance is a compound formed of an Si—O framework. In the Si—O framework, pores having a pore diameter of 1 nm to 50 nm are regularly developed into one-dimensionally, two-dimensionally or three-dimensionally uniform sizes. Such a regular mesoporous substance can be obtained as various synthesized products depending on the synthesis conditions, and specific examples of the synthesized products include SBA-1, SBA-15, SBA-16, KIT-6, FSM-16 and MCM-41, and among the examples, the MCM-41 is preferable. The pore diameter of the SBA-1 is 10 nm to 30 nm, the pore diameter of the SBA-15 is 6 nm to 10 nm, the pore diameter of the SBA-16 is 6 nm, the pore diameter of the KIT-6 is 9 nm, the pore diameter of the FSM-16 is 3 nm to 5 nm, and the pore diameter of the MCM-41 is 1 nm to 10 nm. In addition, examples of such regular mesoporous substances include mesoporous silica, mesoporous aluminosilicate and mesoporous metallosilicate.

The precursor material (A) may be any one of a commercial product and a synthetic product. When the precursor material (A) is synthesized, a known method for synthesizing the regular mesoporous substance may be employed. For example, a mixed solution containing a feedstock containing constituent elements of the precursor material (A) and a molding agent for specifying a structure of the precursor material (A) are prepared, the pH is adjusted as needed, and hydrothermal treatment (hydrothermal synthesis) is performed. After the hydrothermal treatment, a precipitate (product) obtained by the hydrothermal treatment is collected (for example, filtrated), is washed and dried as needed, and is further baked to provide a precursor material (A) of a powdery regular mesoporous substance. Here, water, an organic solvent such as alcohol, a mixed solvent of water and the organic solvent, and the like, for example, can be used as a solvent of the mixed solution. In addition, the feedstock is selected depending on the type of the carrier, and includes, for example, a silica agent such as tetraethoxysilane (TEOS), fumed silica and quartz sand. In addition, various surface active agents, block copolymers and the like can be used as the molding agent, and it is preferable to select the molding agent depending on the type of the synthesized product of the regular mesoporous substance. For example, when producing the MCM-41, a surface active agent such as hexadecyltrimethylammonium bromide is preferable. The hydrothermal treatment can be performed under treatment conditions, for example, of 80 to 800° C., 5 to 240 hours and 0 to 2000 kPa, in a closed container. The baking treatment can be performed under treatment conditions, for example, of 350 to 850° C. in the air, and 2 to 30 hours.

(Step S2: Impregnation Step)

Thereafter, the prepared precursor material (A) is impregnated with a metal-containing solution, and a precursor material (B) is obtained.

The metal-containing solution may be a solution containing a metal component (for example, metal ion) corresponding to a metal element (M) forming the metal fine particle, and can be prepared, for example, by dissolving a metal salt containing the metal element (M) in a solvent. Examples of such metal salts include chloride, hydroxide, oxide, sulfate and nitrate, and among the salts, the nitrate is preferable. As for the solvent, for example, water, an organic solvent such as alcohol, a mixed solvent of water and the organic solvent, or the like can be used.

A method for impregnating the precursor material (A) with the metal-containing solution is not limited in particular, but it is preferable, for example, to add the metal-containing solution little by little for a plurality of times while stirring the powdery precursor material (A) before a baking step. The baking step will be described later. In addition, from the viewpoint that the metal-containing solution more easily infiltrates into the insides of the pores of the precursor material (A), it is preferable that a surface active agent is previously added as an additive to the precursor material (A) before the metal-containing solution is added. It is considered that such an additive has a function of covering the outer surface of the precursor material (A) to inhibit the attachment of the metal-containing solution subsequently added to the outer surface of the precursor material (A), and that the metal-containing solution tends to easily infiltrate into the insides of the pores of the precursor material (A).

Examples of such additives include nonionic surface active agents such as polyoxyethylene alkyl ethers like polyoxyethylene oleyl ether, and polyoxyethylene alkyl phenyl ethers. It is considered that, since these surface active agents are large in a molecular size and cannot infiltrate into the pores of the precursor material (A), they do not attach to the interior of the pores, and do not prevent the metal-containing solution from infiltrating into the pores. As for a method for adding the nonionic surface active agent, it is preferable, for example, to add a nonionic surface active agent in an amount of 50 to 500 mass % with respect to the precursor material (A) before the baking step described below. When an amount of the nonionic surface active agent to be added with respect to the precursor material (A) is less than 50 mass %, the above described inhibiting effect is less likely to be exhibited, and when the nonionic surface active agent is added in an amount more than 500 mass % with respect to the precursor material (A), the viscosity excessively increases. Accordingly, both of the above cases are not preferable. Therefore, the amount of the nonionic surface active agent to be added with respect to the precursor material (A) is determined to be a value within the above described range.

In addition, it is preferable that the addition amount of the metal-containing solution to be added to the precursor material (A) is appropriately adjusted in consideration of the amount of the metal element (M) to be contained in the metal-containing solution with which the precursor material (A) is to be impregnated (in other words, amount of metal element (M) to be made to exist in precursor material (B)). For example, before the baking step described below, it is preferable to adjust the addition amount of the metal-containing solution to be added to the precursor material (A) so as to become 10 to 1000 in terms of a ratio (atomic ratio Si/M) of silicon (Si) forming the precursor material (A) with respect to the metal element (M) to be contained in the metal-containing solution to be added to the precursor material (A), and it is more preferable to adjust the addition amount to 50 to 200. For example, when a surface active agent is added to the precursor material (A) as an additive before the metal-containing solution is added to the precursor material (A), the addition amount of the metal-containing solution to be added to the precursor material (A) is set at 50 to 200 in terms of the atomic ratio Si/M, and due to the setting, the metal element (M) of the metal fine particle can be contained in an amount of 0.5 to 2.5 mass % with respect to the catalyst structure 1. In a state of the precursor material (B), the amount of the metal element (M) existing in the inside of the pores is approximately proportional to the addition amount of the metal-containing solution to be added to the precursor material (A), as long as various conditions are the same, such as a metal concentration in the metal-containing solution, the presence or absence of the above described additives, and in addition, the temperature and pressure. In addition, the amount of the metal element (M) existing in the precursor material (B) is in proportional relation with the amount of the metal element forming the metal fine particle existing in the carrier of the catalyst structure. Accordingly, by controlling the addition amount of the metal-containing solution to be added to the precursor material (A) within the above described range, it is possible to sufficiently impregnate the inside of the pores of the precursor material (A) with the metal-containing solution, and consequently to adjust the amount of metal fine particles to be made to exist in the carrier of the catalyst structure.

After the precursor material (A) has been impregnated with the metal-containing solution, cleaning treatment may be performed, as needed. As for a cleaning solution, water, an organic solvent such as alcohol, a mixed solvent of water and the organic solvent, or the like can be used. In addition, after having impregnated the precursor material (A) with the metal-containing solution, and performing cleaning treatment as needed, it is preferable to subject the resultant precursor material (A) further to drying treatment. Examples of the drying treatment include natural drying for approximately one night, and high-temperature drying at 150° C. or lower. When the baking treatment described below is performed in such a state that a water content contained in the metal-containing solution and a water content of the cleaning solution remain much in the precursor material (A), the framework structure formed as the regular mesoporous substance of the precursor material (A) may be destroyed, and accordingly it is preferable to sufficiently dry the precursor material (A).

(Step S3: Baking Step)

Thereafter, the precursor material (A) for obtaining a carrier having a porous structure composed of a zeolite type compound is impregnated with the metal-containing solution to obtain the precursor material (B), and the precursor material (B) is baked to obtain the precursor material (C).

It is preferable to perform the baking treatment under treatment conditions, for example, of 350 to 850° C. in the air and 2 to 30 hours. By such baking treatment, the metal component impregnated in the pores of the regular mesoporous substance causes crystal growth, and a metal fine particle is formed in the pore.

(Step S4: Hydrothermal Treatment Step)

Thereafter, a mixed solution is prepared by mixing the precursor material (C) and a structure directing agent, and the precursor material (C) obtained by baking the above described precursor material (B) is subjected to hydrothermal treatment to provide a catalyst structure.

The structure directing agent is a molding agent for specifying the framework structure of the carrier of the catalyst structure, and a surface active agent, for example, can be used. It is preferable to select the structure directing agent depending on the framework structure of the carrier of the catalyst structure, and, for example, a surface active agent such as tetramethyl ammonium bromide (TMABr), tetraethyl ammonium bromide (TEABr) and tetrapropyl ammonium bromide (TPABr) is preferable.

Mixing of the precursor material (C) and the structure directing agent may be carried out during the present hydrothermal treatment step, or before the hydrothermal treatment step. In addition, a method for preparing the above described mixed solution is not limited in particular. The precursor material (C), the structure directing agent and the solvent may be mixed at the same time, or the precursor material (C) and the structure directing agent may be dispersed in solvents to form individual solutions, respectively, and then the respective dispersion solutions may be mixed with each other. As for the solvent, for example, water, an organic solvent such as alcohol, a mixed solvent of water and the organic solvent, or the like can be used. In addition, it is preferable to adjust the pH of the mixed solution by using an acid or a base before performing the hydrothermal treatment.

The hydrothermal treatment may be performed by a known method, and it is preferable to perform the treatment under treatment conditions, for example, of 80 to 800° C., 5 to 240 hours and 0 to 2000 kPa in a closed container. In addition, it is preferable that the hydrothermal treatment is performed in a basic atmosphere.

The reaction mechanism here is not necessarily clear. However, by performing the hydrothermal treatment using the precursor material (C) as a feedstock, the framework structure formed as the regular mesoporous substance of the precursor material (C) gradually collapses, but a new framework structure (porous structure) as the carrier of the catalyst structure is formed by an action of the structure directing agent, while the position of the metal fine particle inside the pore of the precursor material (C) is almost kept. The catalyst structure obtained in this manner has a carrier having a porous structure, and a metal fine particle existing in the carrier. Furthermore, due to the porous structure, the carrier has a channel allowing a plurality of pores to communicate with each other, and at least a part of the metal fine particle exists in the channel of the carrier.

In addition, in the present embodiment, in the above described hydrothermal treatment step, the mixed solution is prepared by mixing the precursor material (C) and the structure directing agent, and the precursor material (C) is subjected to the hydrothermal treatment. However, it is not limited thereto, and the precursor material (C) may be subjected to the hydrothermal treatment without mixing the precursor material (C) with the structure directing agent.

After the precipitate (catalyst structure) obtained after the hydrothermal treatment has been collected (for example, filtrated), it is preferable that the collected precipitate is subjected to cleaning treatment, drying treatment and baking treatment as needed. As for the cleaning solution, water, an organic solvent such as alcohol, a mixed solvent of water and the organic solvent, or the like can be used. Examples of the drying treatment include natural drying for approximately one night, and high-temperature drying at 150° C. or lower. If the baking treatment is performed with much water remaining in the precipitate, the framework structure as the carrier of the catalyst structure may break, and thus, it is preferable to sufficiently dry the precipitate. In addition, the baking treatment can be performed under treatment conditions of, for example, 350 to 850° C. in the air, and 2 to 30 hours. By such baking treatment, the structure directing agent having attached to the catalyst structure is burned off. In addition, depending on the purpose of use, the catalyst structure can be used as it is, without subjecting the precipitate after collection to the baking treatment. For example, when the environment for the catalyst structure to be used is a high-temperature environment of an oxidizing atmosphere, the structure directing agent is burned off by being exposed to the use environment for a certain period of time. In this case, a catalyst structure similar to the case where the precipitate has been subjected to the baking treatment can be obtained, and accordingly it is not necessary to perform the baking treatment.

The above described production method is one example in the case where the metal element (M) contained in the metal-containing solution with which the precursor material (A) is to be impregnated is a metal species resistant to oxidation (for example, noble metal).

In a case where the metal element (M) contained in the metal-containing solution with which the precursor material (A) is to be impregnated is a metal species that tends to be easily oxidized (for example, Fe, Co, Ni or the like), it is preferable to subject the hydrothermally treated precursor material (C), after the above described hydrothermal treatment step, to reduction treatment (step S5: reduction treatment step). In a case where the metal element (M) contained in the metal-containing solution is a metal species that that tends to be easily oxidized, the metal component is oxidized by the heat treatments in the steps (steps S3 to S4) after the impregnation treatment (step S2). Because of the above reason, the carrier formed in the hydrothermal treatment step (step S4) has a metal oxide fine particle existing therein. Because of the above reason, in order to obtain a catalyst structure having a metal fine particle existing in the carrier, after the hydrothermal treatment, it is desirable to subject the collected precipitate to the baking treatment, and further to subject the resultant precipitate to reduction treatment under an atmosphere of a reducing gas such as a hydrogen gas. By being subjected to the reduction treatment, the metal oxide fine particle existing in the carrier is reduced, and the metal fine particle corresponding to the metal element (M) forming the metal oxide fine particle is formed. As a result, a catalyst structure having the metal fine particle existing in the carrier is obtained. Such reduction treatment may be performed as needed. For example, when an environment where the catalyst structure is used is a reductive atmosphere, the metal oxide fine particle is reduced by being exposed to a use environment for a certain period of time. In this case, a catalyst structure similar to the case where the carrier has been subjected to the reduction treatment can be obtained, and thus, it is not necessary to perform the reduction treatment.

[Modified Example of Catalyst Structure 1]

Figure 4:
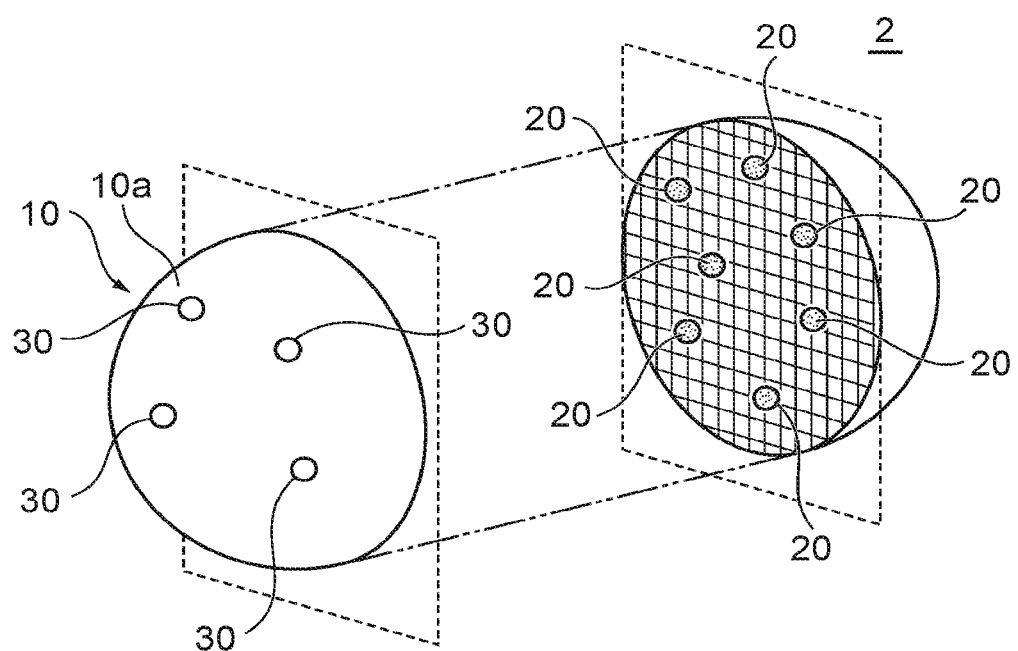
FIG. 4 is a schematic diagram showing a modified example of the catalyst structure for producing the synthesis gas in FIG. 1A.

FIG. 4 is a schematic view showing a modified example of the catalyst structure 1 of FIG. 1A.

The catalyst structure 1 of FIG. 1A has the carrier 10 and the catalytic material 20 existing in the carrier 10, but it is not limited to this configuration. For example, as is shown in FIG. 4, the catalyst structure 2 may further have at least one other catalytic material 30 held at an outer surface 10a of the carrier 10.

The catalytic material 30 is a substance exhibiting one or a plurality of catalytic abilities. The catalytic ability of the other catalytic material 30 may be the same as or different from the catalytic ability of the catalytic material 20. In addition, when both of the catalytic materials 20 and 30 are substances having the same catalytic ability, a material of the other catalytic material 30 may be the same as or different from a material of the catalytic material 20. According to the present configuration, it is possible to increase the content of the catalytic material held by the catalyst structure 2, and to further promote the catalytic activity of the catalytic material.

In this case, it is preferable that the content of the catalytic material 20 existing in the carrier 10 is greater than the content of the other catalytic material 30 held at the outer surface 10a of the carrier 10. Due to the above configuration, the catalytic ability of the catalytic material 20 held in the inside of the carrier 10 becomes dominant, and the catalytic ability of the catalytic material is stably exhibited.

In the above description, the catalyst structure according to the embodiment of the present disclosure has been described, but the present disclosure is not limited to the above embodiment, and can be modified and changed in various ways on the basis of the technological idea of the present disclosure.

For example, a synthesis gas producing apparatus equipped with the above described catalyst structure may be provided. Examples of a producing apparatus include a $CO_2$ reforming plant by dry reforming. The catalyst structure can be used for a catalytic reaction using such a synthesis gas producing apparatus.

Specifically, it is possible to synthesize the synthesis gas containing carbon monoxide and hydrogen by supplying carbon dioxide and methane to the above described catalyst structure, and it is possible to show an effect similar to the above description, for example, by using the above described catalyst structure in the synthesis gas producing apparatus, and subjecting carbon dioxide and methane to synthesis treatment in the above described synthesis gas producing apparatus.

In addition, a reforming apparatus equipped with the above described catalyst structure may be provided. Specifically, examples of the reforming apparatus include a fuel reforming apparatus using a steam reforming reaction, a reforming apparatus of a type targeting electric vehicles and portable fuel cell power generators and using the partial oxidation reaction and the steam reforming reaction together, and a stationary fuel cell such as a solid oxide fuel cell (SOFC). The above described catalyst structure can be used for a catalytic reaction using such apparatuses.

Specifically, it is possible to synthesize a reformed gas containing hydrogen by supplying a hydrocarbon (for example, reforming feedstock containing hydrocarbon) and steam to the above described catalyst structure, and is possible to show an effect similar to the above description, for example, by using the above described catalyst structure in the above described reforming apparatus, and subjecting the reforming feedstock containing the hydrocarbon to reforming treatment in the above described reforming apparatus.

EXAMPLES

Examples 1 to 384

[Synthesis of Precursor Material (A)]

A mixed aqueous solution was prepared by mixing a silica agent (tetraethoxysilane (TEOS), made by Wako Pure Chemical Industries, Ltd.) and a surface active agent functioning as a molding agent, appropriately adjusting the pH, and subjecting the resultant solution to hydrothermal treatment at 80 to 350° C. for 100 hours in a closed container. After the hydrothermal treatment, the produced precipitate was filtered off, was cleaned with water and ethanol, and was further baked at 600° C. for 24 hours in the air, and precursor materials (A) having the types and the pore diameters shown in Tables 1-1 to 8-2 were obtained. The following surface active agents were used depending on the type of the precursor material (A) ("type of precursor material (A): surface active agent").

MCM-41: hexadecyltrimethylammonium bromide (CTAB) (made by Wako Pure Chemical Industries, Ltd.)

SBA-1: Pluronic P123 (made by BASF SE)

[Preparation of Precursor Materials (B) and (C)]

Thereafter, depending on the metal element (M) forming the metal fine particle of the type shown in Tables 1-1 to 8-2, a metal salt containing the metal element (M) was dissolved in water to prepare a metal-containing aqueous solution. The following metal salts were used depending on the type of the metal fine particle ("metal fine particle: metal salt").

Co: cobalt nitrate (II) hexahydrate (made by Wako Pure Chemical Industries, Ltd.)

Ni: nickel nitrate (II) hexahydrate (made by Wako Pure Chemical Industries, Ltd.)

Fe: iron (III) nitrate nonahydrate (made by Wako Pure Chemical Industries, Ltd.)

Pt: chloroplatinic acid hexahydrate (made by Wako Pure Chemical Industries, Ltd.)

Thereafter, the precursor material (B) was obtained by adding a metal-containing aqueous solution to the powdery precursor material (A) little by little for a plurality of times, and drying the resultant precursor material at room temperature (20° C.±10° C.) for 12 hours or longer.

In the case where the conditions for the presence or absence of additives shown in Tables 1-1 to 8-2 were "present", the precursor material (A) before the metal-containing aqueous solution was added was subjected to a pretreatment of adding an aqueous solution of polyoxyethylene (15) oleyl ether (NIKKOL BO-15V, made by Nikko Chemicals Co., Ltd.) as an additive, and then the metal-containing aqueous solution was added to the precursor material (A) as described above. When the condition of the presence or absence of the additive was "absent", the pretreatment by the above described additive was not performed.

In addition, the addition amount of the metal-containing aqueous solution to be added to the precursor material (A) was adjusted so that a numeric value in terms of a ratio (atomic ratio Si/M) of silicon (Si) forming the precursor material (A) to the metal element (M) contained in the metal-containing aqueous solution became each value in Tables 1-1 to 8-2.

Thereafter, a precursor material (C) was obtained by baking the precursor material (B) impregnated with the metal-containing aqueous solution obtained as described above, at 600° C. for 24 hours in the air.

A mixed aqueous solution was prepared by mixing the precursor material (C) obtained as described above and the structure directing agent shown in Tables 1-1 to 8-2, and was subjected to hydrothermal treatment in a closed container on conditions of 80 to 350° C., and a pH and a time period shown in Tables 1-1 to 8-2. After the hydrothermal treatment, the produced precipitate was filtered off, washed, dried at 100° C. for 12 hours or longer, and further baked at 600° C. for 24 hours in the air. In Examples 1 to 384, after the baking treatment, the baked product was collected and subjected to reduction treatment at 500° C. for 60 minutes under a flow of hydrogen gas, and consequently, catalyst structures having carriers and the metal fine particles shown in Tables 1-1 to 8-2 were obtained.

Comparative Example 1

In Comparative Example 1, a catalyst structure having cobalt fine particles attached on the outer surface of silicalite functioning as the carrier, as the catalytic material, by mixing a cobalt oxide powder (II and III) (made by Sigma-Aldrich Japan) having an average particle diameter of 50 nm or less in MFI type silicalite, and subjecting the mixture to hydrogen reduction treatment in a similar way to those in the Examples. The MFI type silicalite was synthesized according to a method similar to those in Examples 52 to 57, except for the step of adding metal.

Comparative Example 2

In Comparative Example 2, an MFI type silicalite was synthesized in a similar method to that in Comparative Example 1, except that the step of attaching the cobalt fine particles was omitted.

Comparative Example 3

In Comparative Example 3, nickel fine particles were carried on $Al_2O_3$ by an impregnation method.

Specifically, $Ni/Al_2O_3$ was obtained by dissolving 0.2477 g of $Ni(NO_3)/6H_2O$ (made by Wako Pure Chemical Industries, Ltd.) in 5 g of distilled water, mixing the solution with 5 g of $Al_2O_3$ (made by Wako), heating the mixture at 800° C. for 2 hours, and subjecting the resultant mixture to hydrogen reduction treatment in a similar way to that in the Example.

[Evaluation]

Concerning the catalyst structures of Examples 1 to 384 and the silicalite of Comparative Examples 1 and 2, various characteristics were evaluated under the following conditions.

[A-1] Cross Section Observation

Concerning the catalyst structures of Examples 1 to 384 and the silicalite of Comparative Examples 1 and 2, observation samples were prepared with a pulverization method, and the respective cross sections were observed using a transmission electron microscope (TEM) (TITAN G2, made by FEI).

As a result, it was confirmed that in the catalyst structures of the above described Examples, the catalytic material exists in the inside of the carrier composed of silicalite or zeolite, and was held by the carrier. On the other hand, as for the silicalite of Comparative Example 1, the metal fine particles attached only to the outer surface of the carrier, and did not exist in the inside of the carrier.

In addition, concerning the catalyst structure where metal is iron fine particle (Fe), in the above described Examples, the cross section was cut out by FIB (focused ion beam) processing, and elements on a cross section were analyzed using SEM (SU8020, made by Hitachi High-Technologies Corporation), and EDX (X-Max, made by Horiba, Ltd.). As a result, Fe element was detected from the inside of the carrier.

From the results of the cross section observation by TEM and SEM/EDX, it was confirmed that the iron fine particle exists in the inside of the carrier.

[B-1] Average Inner Diameter of Channel in Carrier and Average Particle Diameter of Catalytic Material In the TEM image photographed in the cross section observation performed in the above described evaluation [A-1], 500 channels in the carrier were arbitrarily selected, and respective major and minor axes were measured. From average values thereof, respective inner diameters were calculated (N=500), and further, an average value of the inner diameters was determined and taken as an average inner diameter $D_F$ of the channels in the carrier. In addition, also for the catalytic material, similarly, 500 catalytic materials were arbitrarily selected in the above described TEM image, the respective particle diameters were measured (N=500), and an average value was determined and taken as an average particle diameter $D_C$ of the catalytic materials. The results are shown in Tables 1-1 to 8-2.

In addition, in order to check the average particle diameter and dispersed state of the catalytic material, an analysis was performed using SAXS (small angle X-ray scattering). Measurement by SAXS was performed using beam line BL19B2 of Spring-8. The obtained SAXS data was subjected to fitting with a spherical model by the Guinier approximation method, and the particle diameter was calculated. The particle diameter was measured for a catalyst structure where the metal is an iron fine particle. In addition, as a comparison object, iron fine particles (made by Wako) of a commercial product were observed and measured with SEM.

As a result, in the commercial product, iron fine particles having various sizes exist at random in a range of particle diameters of approximately 50 nm to 400 nm, but on the other hand, in the catalyst structure of each of the Examples having an average particle diameter of 1.2 nm to 2.0 nm determined from the TEM images, a scattering peak was detected for the particle diameters of 10 nm or less also in the SAXS measurement result. From the measurement results of SAXS and the measurement results of the cross sections by SEM/EDX, it was found that the catalytic materials having particle diameters of 10 nm or less exist in a uniform and very highly dispersed state in the inside of the carrier.

[C-1] Relationship Between Addition Amount of Metal-Containing Solution and Amount of Metal Included in Inside of Carrier Catalyst structures including the metal fine particles in the insides of the carriers were prepared with the addition amount of atomic ratios being Si/M=50, 100, 200 and 1000 (M=Co, Ni, Fe and Pt), and then amounts (mass %) of the metals included in the insides of the carriers of the catalyst structures prepared in the above described addition amounts were measured. In the present measurement, the catalyst structures having atomic ratios Si/M=100, 200 and 1000 were prepared by adjusting the addition amount of the metal-containing solution in a similar method to that of the catalyst structures having atomic ratios Si/M=100, 200 and 1000 in Examples 1 to 384, respectively, and the catalyst structure having an atomic ratio Si/M=50 was prepared in a similar method to that of the catalyst structures having atomic ratios Si/M=100, 200 and 1000, except that the addition amount of the metal-containing solution was made to be different.

The amount of metal was quantified by ICP (High Frequency Inductively Coupled Plasma) alone or by a combination of ICP and XRF (fluorescent X-ray analysis). The XRF (Energy Dispersive X-ray Fluorescence Analyzer "SEA 1200 VX", made by Hitachi High-Tech Science Corporation) was performed in a vacuum atmosphere on such a condition that an accelerating voltage was 15 kV (using Cr filter) or an accelerating voltage was 50 kV (using Pb filter).

The XRF is a method of calculating the abundance of metal by fluorescence intensity, and it is not possible to calculate a quantitative value (in terms of mass %) by the XRF alone. Then, the amount of metal in the catalyst structure whereto metal is added at a ratio of Si/M=100 was quantified by ICP analysis, and the amount of metal in the catalyst structure whereto metal is added at a ratio of Si/M=50 and less than 100 was determined on the basis of the XRF measurement result and the ICP measurement result.

As a result, it was confirmed that the amount of the metal included in the catalyst structure has increased along with an increase of the addition amount of the metal-containing solution, at least within such a range that the atomic ratio Si/M is 50 to 1000.

[D-1] Performance Evaluation

Concerning the catalyst structures of Examples 1 to 384 and the silicalite of Comparative Examples 1 and 2, the catalytic ability of the catalytic material was evaluated. The results are shown in Tables 1-1 to 8-2.

(1-1) Catalytic Activity

The catalytic activity was evaluated under the following conditions.

Firstly, 0.2 g of the catalyst structure was filled in a normal pressure flow type reaction apparatus, and using nitrogen gas ($N_2$) as a carrier gas (5 ml/min), a decomposition reaction of butylbenzene (model substance of heavy oil) was performed at 400° C. for 2 hours.

After the reaction has finished, the collected produced gas and produced liquid were subjected to a component analysis by gas chromatography-mass spectrometry (GC/MS). TRACE 1310 GC (made by Thermo Fisher Scientific K.K., detector: thermal conductivity detector) was used as an analysis apparatus for the produced gas, and TRACE DSQ (made by Thermo Fisher Scientific Co., Ltd., detector: mass detector, and ionization method: EI (ion source temperature of 250° C., MS transfer line temperature of 320° C., and detector: thermal conductivity detector)) was used as the analysis apparatus for the produced liquid.

Furthermore, on the basis of the result of the above described component analysis, yields (mol %) of compounds having molecular weights less than that of butylbenzene (specifically, benzene, toluene, ethylbenzene, styrene, cumene, methane, ethane, ethylene, propane, propylene, butane, butene and the like) were determined. The yields of the above described compounds were calculated as a percentage (mol %) of the total amount (mol) of substance quantities of the compounds having molecular weights less than that of butylbenzene contained in the produced liquid, with respect to the substance quantity (mol) of butylbenzene before the start of the reaction.

In the present example, the Example was determined to be excellent in the catalytic activity (resolution) when the yield of the compounds having molecular weights less than that of the butylbenzene contained in the produced liquid was 40 mol % or more, and expressed as "Excellent", the Example was determined to have good catalytic activity when the yield was 25 mol % or more and less than 40 mol %, and expressed as "Good", the Example was determined not to have good catalytic activity but to have the catalytic activity in a passing level (acceptable) when the yield was 10 mol % or more and less than 25 mol %, and expressed by "Fair", and the Example was determined to be inferior (unacceptable) in the catalytic activity when the yield was less than 10 mol %, and expressed as "Poor".

(2-1) Durability (Life)

Durability was evaluated under the following conditions.

Firstly, the catalyst structure used in the evaluation (1-1) was collected, and was heated at 650° C. for 12 hours, and a catalyst structure after heating was prepared. Thereafter, using the obtained catalyst structure after heating, a decomposition reaction of butylbenzene (model substance of heavy oil) was performed according to a method similar to that in the evaluation (1-1), and component analyses of a produced gas and a produced liquid were performed according to methods similar to those in the above described evaluation (1-1).

Yields (mol %) of compounds having molecular weights less than that of butylbenzene were determined according to a method similar to that in the evaluation (1), on the basis of the obtained analysis results. Furthermore, it was compared how much the yield of the above described compounds by the catalyst structure after heating was kept as compared to the yield (yield determined in the evaluation (1)) of the above described compounds by the catalyst structure before heating. Specifically, a percentage (%) of the yield (yield determined in evaluation (2-1)) of the above described compounds by the above described catalyst structure after heating, with respect to the yield (yield determined in evaluation (1-1)) of the above described compounds by the catalyst structure before heating was calculated.

In the present example, the Example was determined to be excellent in the durability (heat resistance) when the yield of the above described compounds by the catalyst structure after heating (yield determined in evaluation (2-1)) was kept at 80% or more as compared to the yield of the above described compounds by the catalyst structure before heating (yield determined in evaluation (1-1)), and expressed as "Excellent", the Example was determined to have good durability (heat resistance) when the yield was kept at 60% or more and less than 80%, and expressed as "Good", the Example was determined not to have good durability (heat resistance) but to have durability in a passing level (acceptable) when the yield was kept at 40% or more and less than 60%, and expressed as "Fair", and the Example was determined to be inferior (unacceptable) in the durability (heat resistance) when the yield decreased to less than 40%, and expressed as "Poor".

For Comparative Examples 1 and 2, performance evaluations similar to those in the above described evaluations (1-1) and (2-1) were also performed. Comparative Example 2 is a carrier itself, and does not have a catalytic material. Because of the above reason, in the above described performance evaluation, only the carrier of Comparative Example 2 was filled instead of the catalyst structure. The result is shown in Tables 8-1 and 8-2.

TABLE 1-1

| | Production conditions of catalyst structure | | | | | | |
|---|---|---|---|---|---|---|---|
| | Precursor material (A) | | Addition to precursor material (A) | Hydrothermal treatment condition using precursor material (C) | | | |
| | | | | Conversion ratio of | | | |
| No. | Type | Pore diameter (nm) | Presence or absence of additive | amount of added metal-containing solution (atomic ratio) Si/M | Type of structure directing agent | pH | Time period (h) |
| Example 1 | MCM-41 | 1.3 | Present | 1000 | TEABr | 12 | 120 |
| Example 2 | | | | 500 | | | |
| Example 3 | | | | 200 | | | |
| Example 4 | | | | 100 | | | |
| Example 5 | | 2.0 | | | | | |
| Example 6 | | 2.4 | | | | | |
| Example 7 | | 2.6 | | | | | |
| Example 8 | | 3.3 | | | | | |
| Example 9 | | 6.6 | | | | | |
| Example 10 | SBA-1 | 13.2 | | | | | |
| Example 11 | | 19.8 | | | | | |
| Example 12 | | 26.4 | | | | | |
| Example 13 | MCM-41 | 1.3 | Absent | 1000 | | | |
| Example 14 | | | | 500 | | | |
| Example 15 | | | | 200 | | | |
| Example 16 | | | | 100 | | | |
| Example 17 | | 2.0 | | | | | |
| Example 18 | | 2.4 | | | | | |

TABLE 1-1-continued

| | | |
|---|---|---|
| Example 19 | | 2.6 |
| Example 20 | | 3.3 |
| Example 21 | | 6.6 |
| Example 22 | SBA-1 | 13.2 |
| Example 23 | | 19.8 |
| Example 24 | | 26.4 |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 1 | FAU | 0.74 | Co | 0.11 | 0.1 | Fair | Fair |
| Example 2 | | | | 0.32 | 0.4 | Fair | Fair |
| Example 3 | | | | 0.53 | 0.7 | Good | Fair |
| Example 4 | | | | 1.06 | 1.4 | Excellent | Good |
| Example 5 | | | | 1.59 | 2.1 | Excellent | Good |
| Example 6 | | | | 1.90 | 2.6 | Excellent | Excellent |
| Example 7 | | | | 2.11 | 2.9 | Excellent | Excellent |
| Example 8 | | | | 2.64 | 3.6 | Excellent | Excellent |
| Example 9 | | | | 5.29 | 7.1 | Good | Excellent |
| Example 10 | | | | 10.57 | 14.3 | Good | Excellent |
| Example 11 | | | | 15.86 | 21.4 | Fair | Excellent |
| Example 12 | | | | 21.14 | 28.6 | Fair | Excellent |
| Example 13 | | | | 0.11 | 0.1 | Fair | Fair |
| Example 14 | | | | 0.32 | 0.4 | Fair | Fair |
| Example 15 | | | | 0.53 | 0.7 | Good | Fair |
| Example 16 | | | | 1.06 | 1.4 | Excellent | Good |
| Example 17 | | | | 1.59 | 2.1 | Excellent | Good |
| Example 18 | | | | 1.90 | 2.6 | Good | Excellent |
| Example 19 | | | | 2.11 | 2.9 | Good | Excellent |
| Example 20 | | | | 2.64 | 3.6 | Good | Excellent |
| Example 21 | | | | 5.29 | 7.1 | Fair | Excellent |
| Example 22 | | | | 10.57 | 14.3 | Fair | Excellent |
| Example 23 | | | | 15.86 | 21.4 | Fair | Excellent |
| Example 24 | | | | 21.14 | 28.6 | Fair | Excellent |

TABLE 1-2

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 25 | MCM-41 | 1.1 | Present | 1000 | TEABr | 11 | 72 |
| Example 26 | | | | 500 | | | |
| Example 27 | | | | 200 | | | |
| Example 28 | | | | 100 | | | |
| Example 29 | | 1.6 | | | | | |
| Example 30 | | 2.0 | | | | | |
| Example 31 | | 2.2 | | | | | |
| Example 32 | | 2.7 | | | | | |
| Example 33 | | 5.4 | | | | | |
| Example 34 | SBA-1 | 10.9 | | | | | |
| Example 35 | | 16.3 | | | | | |
| Example 36 | | 21.8 | | | | | |
| Example 37 | MCM-41 | 1.1 | Absent | 1000 | | | |
| Example 38 | | | | 500 | | | |
| Example 39 | | | | 200 | | | |
| Example 40 | | | | 100 | | | |
| Example 41 | | 1.6 | | | | | |
| Example 42 | | 2.0 | | | | | |
| Example 43 | | 2.2 | | | | | |
| Example 44 | | 2.7 | | | | | |

TABLE 1-2-continued

| | | |
|---|---|---|
| Example 45 | | 5.4 |
| Example 46 | SBA-1 | 10.9 |
| Example 47 | | 16.3 |
| Example 48 | | 21.8 |

| | Catalyst structure | | | | | | |
|---|---|---|---|---|---|---|---|
| | Carrier Zeolite type compound | | Catalytic material Metal fine particle | | | | |
| | | Average inner diameter | | Average particle | | Performance evaluation | |
| No. | Framework Structure | of channel $D_F$ (nm) | Type | diameter $D_C$ (nm) | $D_C/D_F$ | Catalytic activity | Durability |
| Example 25 | MTW | 0.61 | Co | 0.09 | 0.1 | Fair | Fair |
| Example 26 | | | | 0.26 | 0.4 | Fair | Fair |
| Example 27 | | | | 0.44 | 0.7 | Good | Fair |
| Example 28 | | | | 0.87 | 1.4 | Excellent | Good |
| Example 29 | | | | 1.31 | 2.1 | Excellent | Good |
| Example 30 | | | | 1.57 | 2.6 | Excellent | Good |
| Example 31 | | | | 1.74 | 2.9 | Excellent | Excellent |
| Example 32 | | | | 2.18 | 3.6 | Excellent | Excellent |
| Example 33 | | | | 4.36 | 7.1 | Good | Excellent |
| Example 34 | | | | 8.71 | 14.3 | Good | Excellent |
| Example 35 | | | | 13.07 | 21.4 | Fair | Excellent |
| Example 36 | | | | 17.43 | 28.6 | Fair | Excellent |
| Example 37 | | | | 0.09 | 0.1 | Fair | Fair |
| Example 38 | | | | 0.26 | 0.4 | Fair | Fair |
| Example 39 | | | | 0.44 | 0.7 | Good | Fair |
| Example 40 | | | | 0.87 | 1.4 | Excellent | Good |
| Example 41 | | | | 1.31 | 2.1 | Excellent | Good |
| Example 42 | | | | 1.57 | 2.6 | Excellent | Good |
| Example 43 | | | | 1.74 | 2.9 | Good | Excellent |
| Example 44 | | | | 2.18 | 3.6 | Good | Excellent |
| Example 45 | | | | 4.36 | 7.1 | Fair | Excellent |
| Example 46 | | | | 8.71 | 14.3 | Fair | Excellent |
| Example 47 | | | | 13.07 | 21.4 | Fair | Excellent |
| Example 48 | | | | 17.43 | 28.6 | Fair | Excellent |

TABLE 2-1

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| | | | | Conversion ratio of | | | |
| No. | Type | Pore diameter (nm) | Presence or absence of additive | amount of added metal-containing solution (atomic ratio) Si/M | Type of structure directing agent | pH | Time period (h) |
| Example 49 | MCM-41 | 1.0 | Present | 1000 | TPABr | 12 | 72 |
| Example 50 | | | | 500 | | | |
| Example 51 | | | | 200 | | | |
| Example 52 | | | | 100 | | | |
| Example 53 | | 1.5 | | | | | |
| Example 54 | | 1.8 | | | | | |
| Example 55 | | 2.0 | | | | | |
| Example 56 | | 2.5 | | | | | |
| Example 57 | | 5.0 | | | | | |
| Example 58 | SBA-1 | 10.0 | | | | | |
| Example 59 | | 15.0 | | | | | |
| Example 60 | | 20.0 | | | | | |
| Example 61 | MCM-41 | 1.0 | Absent | 1000 | | | |
| Example 62 | | | | 500 | | | |
| Example 63 | | | | 200 | | | |
| Example 64 | | | | 100 | | | |
| Example 65 | | 1.5 | | | | | |
| Example 66 | | 1.8 | | | | | |
| Example 67 | | 2.0 | | | | | |
| Example 68 | | 2.5 | | | | | |
| Example 69 | | 5.0 | | | | | |
| Example 70 | SBA-1 | 10.0 | | | | | |

TABLE 2-1-continued

| | | | | | | | |
|---|---|---|---|---|---|---|---|
| Example 71 | | 15.0 | | | | | |
| Example 72 | | 20.0 | | | | | |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 49 | MFI | 0.56 | Co | 0.08 | 0.1 | Fair | Fair |
| Example 50 | | 0.56 | | 0.24 | 0.4 | Fair | Fair |
| Example 51 | | 0.56 | | 0.40 | 0.7 | Good | Fair |
| Example 52 | | 0.56 | | 0.80 | 1.4 | Excellent | Good |
| Example 53 | | 0.56 | | 1.20 | 2.1 | Excellent | Good |
| Example 54 | | 0.56 | | 1.44 | 2.6 | Excellent | Excellent |
| Example 55 | | 0.56 | | 1.60 | 2.9 | Excellent | Excellent |
| Example 56 | | 0.56 | | 2.00 | 3.6 | Excellent | Excellent |
| Example 57 | | 0.56 | | 4.00 | 7.1 | Good | Excellent |
| Example 58 | | 0.56 | | 8.00 | 14.3 | Good | Excellent |
| Example 59 | | 0.56 | | 12.00 | 21.4 | Fair | Excellent |
| Example 60 | | 0.56 | | 16.00 | 28.6 | Fair | Excellent |
| Example 61 | | 0.56 | | 0.08 | 0.1 | Fair | Fair |
| Example 62 | | 0.56 | | 0.24 | 0.4 | Fair | Fair |
| Example 63 | | 0.56 | | 0.40 | 0.7 | Good | Fair |
| Example 64 | | 0.56 | | 0.80 | 1.4 | Excellent | Good |
| Example 65 | | 0.56 | | 1.20 | 2.1 | Excellent | Good |
| Example 66 | | 0.56 | | 1.44 | 2.6 | Good | Excellent |
| Example 67 | | 0.56 | | 1.60 | 2.9 | Good | Excellent |
| Example 68 | | 0.56 | | 2.00 | 3.6 | Good | Excellent |
| Example 69 | | 0.56 | | 4.00 | 7.1 | Fair | Excellent |
| Example 70 | | 0.56 | | 8.00 | 14.3 | Fair | Excellent |
| Example 71 | | 0.56 | | 12.00 | 21.4 | Fair | Excellent |
| Example 72 | | 0.56 | | 16.00 | 28.6 | Fair | Excellent |

TABLE 2-2

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 73 | MCM-41 | 1.0 | Present | 1000 | TMABr | 12 | 120 |
| Example 74 | | | | 500 | | | |
| Example 75 | | | | 200 | | | |
| Example 76 | | | | 100 | | | |
| Example 77 | | 1.5 | | | | | |
| Example 78 | | 1.8 | | | | | |
| Example 79 | | 2.0 | | | | | |
| Example 80 | | 2.5 | | | | | |
| Example 81 | | 5.1 | | | | | |
| Example 82 | SBA-1 | 10.2 | | | | | |
| Example 83 | | 15.3 | | | | | |
| Example 84 | | 20.4 | | | | | |
| Example 85 | MCM-41 | 1.0 | Absent | 1000 | | | |
| Example 86 | | | | 500 | | | |
| Example 87 | | | | 200 | | | |
| Example 88 | | | | 100 | | | |
| Example 89 | | 1.5 | | | | | |
| Example 90 | | 1.8 | | | | | |
| Example 91 | | 2.0 | | | | | |
| Example 92 | | 2.5 | | | | | |

TABLE 2-2-continued

| | | |
|---|---|---|
| Example 93 | | 5.1 |
| Example 94 | SBA-1 | 10.2 |
| Example 95 | | 15.3 |
| Example 96 | | 20.4 |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 73 | FER | 0.57 | Co | 0.08 | 0.1 | Fair | Fair |
| Example 74 | | 0.57 | | 0.24 | 0.4 | Fair | Fair |
| Example 75 | | 0.57 | | 0.41 | 0.7 | Good | Fair |
| Example 76 | | 0.57 | | 0.81 | 1.4 | Excellent | Good |
| Example 77 | | 0.57 | | 1.22 | 2.1 | Excellent | Good |
| Example 78 | | 0.57 | | 1.47 | 2.6 | Excellent | Good |
| Example 79 | | 0.57 | | 1.63 | 2.9 | Excellent | Excellent |
| Example 80 | | 0.57 | | 2.04 | 3.6 | Excellent | Excellent |
| Example 81 | | 0.57 | | 4.07 | 7.1 | Good | Excellent |
| Example 82 | | 0.57 | | 8.14 | 14.3 | Good | Excellent |
| Example 83 | | 0.57 | | 12.21 | 21.4 | Fair | Excellent |
| Example 84 | | 0.57 | | 16.29 | 28.6 | Fair | Excellent |
| Example 85 | | 0.57 | | 0.08 | 0.1 | Fair | Fair |
| Example 86 | | 0.57 | | 0.24 | 0.4 | Fair | Fair |
| Example 87 | | 0.57 | | 0.41 | 0.7 | Good | Fair |
| Example 88 | | 0.57 | | 0.81 | 1.4 | Excellent | Good |
| Example 89 | | 0.57 | | 1.22 | 2.1 | Excellent | Good |
| Example 90 | | 0.57 | | 1.47 | 2.6 | Excellent | Good |
| Example 91 | | 0.57 | | 1.63 | 2.9 | Good | Excellent |
| Example 92 | | 0.57 | | 2.04 | 3.6 | Good | Excellent |
| Example 93 | | 0.57 | | 4.07 | 7.1 | Fair | Excellent |
| Example 94 | | 0.57 | | 8.14 | 14.3 | Fair | Excellent |
| Example 95 | | 0.57 | | 12.21 | 21.4 | Fair | Excellent |
| Example 96 | | 0.57 | | 16.29 | 28.6 | Fair | Excellent |

TABLE 3-1

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 97 | MCM-41 | 1.3 | Present | 1000 | TEABr | 12 | 120 |
| Example 98 | | | | 500 | | | |
| Example 99 | | | | 200 | | | |
| Example 100 | | | | 100 | | | |
| Example 101 | | 2.0 | | | | | |
| Example 102 | | 2.4 | | | | | |
| Example 103 | | 2.6 | | | | | |
| Example 104 | | 3.3 | | | | | |
| Example 105 | | 6.6 | | | | | |
| Example 106 | SBA-1 | 13.2 | | | | | |
| Example 107 | | 19.8 | | | | | |
| Example 108 | | 26.4 | | | | | |
| Example 109 | MCM-41 | 1.3 | Absent | 1000 | | | |
| Example 110 | | | | 500 | | | |
| Example 111 | | | | 200 | | | |
| Example 112 | | | | 100 | | | |
| Example 113 | | 2.0 | | | | | |
| Example 114 | | 2.4 | | | | | |
| Example 115 | | 2.6 | | | | | |
| Example 116 | | 3.3 | | | | | |
| Example 117 | | 6.6 | | | | | |
| Example 118 | SBA-1 | 13.2 | | | | | |

TABLE 3-1-continued

| | |
|---|---|
| Example 119 | 19.8 |
| Example 120 | 26.4 |

| | Catalyst structure | | | | | |
|---|---|---|---|---|---|---|
| | Carrier Zeolite type compound | | Catalytic material Metal fine particle | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 97 | FAU | 0.74 | Ni | 0.11 | 0.1 | Fair | Fair |
| Example 98 | | | | 0.32 | 0.4 | Fair | Fair |
| Example 99 | | | | 0.53 | 0.7 | Good | Fair |
| Example 100 | | | | 1.06 | 1.4 | Excellent | Good |
| Example 101 | | | | 1.59 | 2.1 | Excellent | Good |
| Example 102 | | | | 1.90 | 2.6 | Excellent | Excellent |
| Example 103 | | | | 2.11 | 2.9 | Excellent | Excellent |
| Example 104 | | | | 2.64 | 3.6 | Excellent | Excellent |
| Example 105 | | | | 5.29 | 7.1 | Good | Excellent |
| Example 106 | | | | 10.57 | 14.3 | Good | Excellent |
| Example 107 | | | | 15.86 | 21.4 | Fair | Excellent |
| Example 108 | | | | 21.14 | 28.6 | Fair | Excellent |
| Example 109 | | | | 0.11 | 0.1 | Fair | Fair |
| Example 110 | | | | 0.32 | 0.4 | Fair | Fair |
| Example 111 | | | | 0.53 | 0.7 | Good | Fair |
| Example 112 | | | | 1.06 | 1.4 | Excellent | Good |
| Example 113 | | | | 1.59 | 2.1 | Excellent | Good |
| Example 114 | | | | 1.90 | 2.6 | Good | Excellent |
| Example 115 | | | | 2.11 | 2.9 | Good | Excellent |
| Example 116 | | | | 2.64 | 3.6 | Good | Excellent |
| Example 117 | | | | 5.29 | 7.1 | Fair | Excellent |
| Example 118 | | | | 10.57 | 14.3 | Fair | Excellent |
| Example 119 | | | | 15.86 | 21.4 | Fair | Excellent |
| Example 120 | | | | 21.14 | 28.6 | Fair | Excellent |

TABLE 3-2

| | Production conditions of catalyst structure | | | | | | |
|---|---|---|---|---|---|---|---|
| | Precursor material (A) | | Addition to precursor material (A) | Conversion ratio of amount of added metal-containing solution (atomic ratio) Si/M | Hydrothermal treatment condition using precursor material (C) | | |
| No. | Type | Pore diameter (nm) | Presence or absence of additive | | Type of structure directing agent | pH | Time period (h) |
| Example 121 | MCM-41 | 1.1 | Present | 1000 | TEABr | 11 | 72 |
| Example 122 | | | | 500 | | | |
| Example 123 | | | | 200 | | | |
| Example 124 | | | | 100 | | | |
| Example 125 | | 1.6 | | | | | |
| Example 126 | | 2.0 | | | | | |
| Example 127 | | 2.2 | | | | | |
| Example 128 | | 2.7 | | | | | |
| Example 129 | | 5.4 | | | | | |
| Example 130 | SBA-1 | 10.9 | | | | | |
| Example 131 | | 16.3 | | | | | |
| Example 132 | | 21.8 | | | | | |
| Example 133 | MCM-41 | 1.1 | Absent | 1000 | | | |
| Example 134 | | | | 500 | | | |
| Example 135 | | | | 200 | | | |
| Example 136 | | | | 100 | | | |
| Example 137 | | 1.6 | | | | | |
| Example 138 | | 2.0 | | | | | |
| Example 139 | | 2.2 | | | | | |
| Example 140 | | 2.7 | | | | | |
| Example 141 | | 5.4 | | | | | |

TABLE 3-2-continued

| | | |
|---|---|---|
| Example 142 | SBA-1 | 10.9 |
| Example 143 | | 16.3 |
| Example 144 | | 21.8 |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 121 | MTW | 0.61 | Ni | 0.09 | 0.1 | Fair | Fair |
| Example 122 | | | | 0.26 | 0.4 | Fair | Fair |
| Example 123 | | | | 0.44 | 0.7 | Good | Fair |
| Example 124 | | | | 0.87 | 1.4 | Excellent | Good |
| Example 125 | | | | 1.31 | 2.1 | Excellent | Good |
| Example 126 | | | | 1.57 | 2.6 | Excellent | Good |
| Example 127 | | | | 1.74 | 2.9 | Excellent | Excellent |
| Example 128 | | | | 2.18 | 3.6 | Excellent | Excellent |
| Example 129 | | | | 4.36 | 7.1 | Good | Excellent |
| Example 130 | | | | 8.71 | 14.3 | Good | Excellent |
| Example 131 | | | | 13.07 | 21.4 | Fair | Excellent |
| Example 132 | | | | 17.43 | 28.6 | Fair | Excellent |
| Example 133 | | | | 0.09 | 0.1 | Fair | Fair |
| Example 134 | | | | 0.26 | 0.4 | Fair | Fair |
| Example 135 | | | | 0.44 | 0.7 | Good | Fair |
| Example 136 | | | | 0.87 | 1.4 | Excellent | Good |
| Example 137 | | | | 1.31 | 2.1 | Excellent | Good |
| Example 138 | | | | 1.57 | 2.6 | Excellent | Good |
| Example 139 | | | | 1.74 | 2.9 | Good | Excellent |
| Example 140 | | | | 2.18 | 3.6 | Good | Excellent |
| Example 141 | | | | 4.36 | 7.1 | Fair | Excellent |
| Example 142 | | | | 8.71 | 14.3 | Fair | Excellent |
| Example 143 | | | | 13.07 | 21.4 | Fair | Excellent |
| Example 144 | | | | 17.43 | 28.6 | Fair | Excellent |

TABLE 4-1

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 145 | MCM-41 | 1.0 | Present | 1000 | TPABr | 12 | 72 |
| Example 146 | | 1.0 | | 500 | | | |
| Example 147 | | 1.0 | | 200 | | | |
| Example 148 | | 1.0 | | 100 | | | |
| Example 149 | | 1.5 | | | | | |
| Example 150 | | 1.8 | | | | | |
| Example 151 | | 2.0 | | | | | |
| Example 152 | | 2.5 | | | | | |
| Example 153 | | 5.0 | | | | | |
| Example 154 | SBA-1 | 10.0 | | | | | |
| Example 155 | | 15.0 | | | | | |
| Example 156 | | 20.0 | | | | | |
| Example 157 | MCM-41 | 1.0 | Absent | 1000 | | | |
| Example 158 | | 1.0 | | 500 | | | |
| Example 159 | | 1.0 | | 200 | | | |
| Example 160 | | 1.0 | | 100 | | | |
| Example 161 | | 1.5 | | | | | |
| Example 162 | | 1.8 | | | | | |
| Example 163 | | 2.0 | | | | | |

TABLE 4-1-continued

| | | |
|---|---|---|
| Example 164 | | 2.5 |
| Example 165 | | 5.0 |
| Example 166 | SBA-1 | 10.0 |
| Example 167 | | 15.0 |
| Example 168 | | 20.0 |

| | Catalyst structure | | | | | Performance evaluation | |
|---|---|---|---|---|---|---|---|
| | Carrier Zeolite type compound | | Catalytic material Metal fine particle | | | | |
| No. | Framework Structure | Average inner diameter of channel $D_F$ (nm) | Type | Average particle diameter $D_C$ (nm) | $D_C/D_F$ | Catalytic activity | Durability |
| Example 145 | MFI | 0.56 | Ni | 0.08 | 0.1 | Fair | Fair |
| Example 146 | | | | 0.24 | 0.4 | Fair | Fair |
| Example 147 | | | | 0.40 | 0.7 | Good | Fair |
| Example 148 | | | | 0.80 | 1.4 | Excellent | Good |
| Example 149 | | | | 1.20 | 2.1 | Excellent | Good |
| Example 150 | | | | 1.44 | 2.6 | Excellent | Excellent |
| Example 151 | | | | 1.60 | 2.9 | Excellent | Excellent |
| Example 152 | | | | 2.00 | 3.6 | Excellent | Excellent |
| Example 153 | | | | 4.00 | 7.1 | Good | Excellent |
| Example 154 | | | | 8.00 | 14.3 | Good | Excellent |
| Example 155 | | | | 12.00 | 21.4 | Fair | Excellent |
| Example 156 | | | | 16.00 | 28.6 | Fair | Excellent |
| Example 157 | | | | 0.08 | 0.1 | Fair | Fair |
| Example 158 | | | | 0.24 | 0.4 | Fair | Fair |
| Example 159 | | | | 0.40 | 0.7 | Good | Fair |
| Example 160 | | | | 0.80 | 1.4 | Excellent | Good |
| Example 161 | | | | 1.20 | 2.1 | Excellent | Good |
| Example 162 | | | | 1.44 | 2.6 | Good | Excellent |
| Example 163 | | | | 1.60 | 2.9 | Good | Excellent |
| Example 164 | | | | 2.00 | 3.6 | Good | Excellent |
| Example 165 | | | | 4.00 | 7.1 | Fair | Excellent |
| Example 166 | | | | 8.00 | 14.3 | Fair | Excellent |
| Example 167 | | | | 12.00 | 21.4 | Fair | Excellent |
| Example 168 | | | | 16.00 | 28.6 | Fair | Excellent |

TABLE 4-2

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 169 | MCM-41 | 1.0 | Present | 1000 | TMABr | 12 | 120 |
| Example 170 | | 1.0 | | 500 | | | |
| Example 171 | | 1.0 | | 200 | | | |
| Example 172 | | 1.0 | | 100 | | | |
| Example 173 | | 1.5 | | | | | |
| Example 174 | | 1.8 | | | | | |
| Example 175 | | 2.0 | | | | | |
| Example 176 | | 2.5 | | | | | |
| Example 177 | | 5.1 | | | | | |
| Example 178 | SBA-1 | 10.2 | | | | | |
| Example 179 | | 15.3 | | | | | |
| Example 180 | | 20.4 | | | | | |
| Example 181 | MCM-41 | 1.0 | Absent | 1000 | | | |
| Example 182 | | 1.0 | | 500 | | | |
| Example 183 | | 1.0 | | 200 | | | |
| Example 184 | | 1.0 | | 100 | | | |
| Example 185 | | 1.5 | | | | | |
| Example 186 | | 1.8 | | | | | |
| Example 187 | | 2.0 | | | | | |
| Example 188 | | 2.5 | | | | | |
| Example 189 | | 5.1 | | | | | |

TABLE 4-2-continued

| | | |
|---|---|---|
| Example 190 | SBA-1 | 10.2 |
| Example 191 | | 15.3 |
| Example 192 | | 20.4 |

| | Catalyst structure | | | | | |
|---|---|---|---|---|---|---|
| | Carrier Zeolite type compound | | Catalytic material Metal fine particle | | | |
| | | Average inner diameter | | Average particle | | Performance evaluation |
| No. | Framework Structure | of channel $D_F$ (nm) | Type | diameter $D_C$ (nm) | $D_C/D_F$ | Catalytic activity | Durability |

| No. | Framework Structure | $D_F$ (nm) | Type | $D_C$ (nm) | $D_C/D_F$ | Catalytic activity | Durability |
|---|---|---|---|---|---|---|---|
| Example 169 | FER | 0.57 | Ni | 0.08 | 0.1 | Fair | Fair |
| Example 170 | | | | 0.24 | 0.4 | Fair | Fair |
| Example 171 | | | | 0.41 | 0.7 | Good | Fair |
| Example 172 | | | | 0.81 | 1.4 | Excellent | Good |
| Example 173 | | | | 1.22 | 2.1 | Excellent | Good |
| Example 174 | | | | 1.47 | 2.6 | Excellent | Good |
| Example 175 | | | | 1.63 | 2.9 | Excellent | Excellent |
| Example 176 | | | | 2.04 | 3.6 | Excellent | Excellent |
| Example 177 | | | | 4.07 | 7.1 | Good | Excellent |
| Example 178 | | | | 8.14 | 14.3 | Good | Excellent |
| Example 179 | | | | 12.21 | 21.4 | Fair | Excellent |
| Example 180 | | | | 16.29 | 28.6 | Fair | Excellent |
| Example 181 | | | | 0.08 | 0.1 | Fair | Fair |
| Example 182 | | | | 0.24 | 0.4 | Fair | Fair |
| Example 183 | | | | 0.41 | 0.7 | Good | Fair |
| Example 184 | | | | 0.81 | 1.4 | Excellent | Good |
| Example 185 | | | | 1.22 | 2.1 | Excellent | Good |
| Example 186 | | | | 1.47 | 2.6 | Excellent | Good |
| Example 187 | | | | 1.63 | 2.9 | Good | Excellent |
| Example 188 | | | | 2.04 | 3.6 | Good | Excellent |
| Example 189 | | | | 4.07 | 7.1 | Fair | Excellent |
| Example 190 | | | | 8.14 | 14.3 | Fair | Excellent |
| Example 191 | | | | 12.21 | 21.4 | Fair | Excellent |
| Example 192 | | | | 16.29 | 28.6 | Fair | Excellent |

TABLE 5-1

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| | | | | Conversion ratio of | | | |
| No. | Type | Pore diameter (nm) | Presence or absence of additive | amount of added metal-containing solution (atomic ratio) Si/M | Type of structure directing agent | pH | Time period (h) |
| Example 193 | MCM-41 | 1.3 | Present | 1000 | TEABr | 12 | 120 |
| Example 194 | | | | 500 | | | |
| Example 195 | | | | 200 | | | |
| Example 196 | | | | 100 | | | |
| Example 197 | | 2.0 | | | | | |
| Example 198 | | 2.4 | | | | | |
| Example 199 | | 2.6 | | | | | |
| Example 200 | | 3.3 | | | | | |
| Example 201 | | 6.6 | | | | | |
| Example 202 | SBA-1 | 13.2 | | | | | |
| Example 203 | | 19.8 | | | | | |
| Example 204 | | 26.4 | | | | | |
| Example 205 | MCM-41 | 1.3 | Absent | 1000 | | | |
| Example 206 | | | | 500 | | | |
| Example 207 | | | | 200 | | | |
| Example 208 | | | | 100 | | | |
| Example 209 | | 2.0 | | | | | |
| Example 210 | | 2.4 | | | | | |
| Example 211 | | 2.6 | | | | | |
| Example 212 | | 3.3 | | | | | |

TABLE 5-1-continued

| | | |
|---|---|---|
| Example 213 | | 6.6 |
| Example 214 | SBA-1 | 13.2 |
| Example 215 | | 19.8 |
| Example 216 | | 26.4 |

| | Catalyst structure | | | | | | |
|---|---|---|---|---|---|---|---|
| | Carrier Zeolite type compound | | Catalytic material Metal fine particle | | | | |
| | | Average inner diameter | | Average particle | | Performance evaluation | |
| No. | Framework Structure | of channel $D_F$ (nm) | Type | diameter $D_C$ (nm) | $D_C/D_F$ | Catalytic activity | Durability |
| Example 193 | FAU | 0.74 | Fe | 0.11 | 0.1 | Fair | Fair |
| Example 194 | | | | 0.32 | 0.4 | Fair | Fair |
| Example 195 | | | | 0.53 | 0.7 | Good | Fair |
| Example 196 | | | | 1.06 | 1.4 | Excellent | Good |
| Example 197 | | | | 1.59 | 2.1 | Excellent | Good |
| Example 198 | | | | 1.90 | 2.6 | Excellent | Excellent |
| Example 199 | | | | 2.11 | 2.9 | Excellent | Excellent |
| Example 200 | | | | 2.64 | 3.6 | Excellent | Excellent |
| Example 201 | | | | 5.29 | 7.1 | Good | Excellent |
| Example 202 | | | | 10.57 | 14.3 | Good | Excellent |
| Example 203 | | | | 15.86 | 21.4 | Fair | Excellent |
| Example 204 | | | | 21.14 | 28.6 | Fair | Excellent |
| Example 205 | | | | 0.11 | 0.1 | Fair | Fair |
| Example 206 | | | | 0.32 | 0.4 | Fair | Fair |
| Example 207 | | | | 0.53 | 0.7 | Good | Fair |
| Example 208 | | | | 1.06 | 1.4 | Excellent | Good |
| Example 209 | | | | 1.59 | 2.1 | Excellent | Good |
| Example 210 | | | | 1.90 | 2.6 | Good | Excellent |
| Example 211 | | | | 2.11 | 2.9 | Good | Excellent |
| Example 212 | | | | 2.64 | 3.6 | Good | Excellent |
| Example 213 | | | | 5.29 | 7.1 | Fair | Excellent |
| Example 214 | | | | 10.57 | 14.3 | Fair | Excellent |
| Example 215 | | | | 15.86 | 21.4 | Fair | Excellent |
| Example 216 | | | | 21.14 | 28.6 | Fair | Excellent |

TABLE 5-2

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| | | | | Conversion ratio of | | | |
| No. | Type | Pore diameter (nm) | Presence or absence of additive | amount of added metal-containing solution (atomic ratio) Si/M | Type of structure directing agent | pH | Time period (h) |
| Example 217 | MCM-41 | 1.1 | Present | 1000 | TEABr | 11 | 72 |
| Example 218 | | | | 500 | | | |
| Example 219 | | | | 200 | | | |
| Example 220 | | | | 100 | | | |
| Example 221 | | 1.6 | | | | | |
| Example 222 | | 2.0 | | | | | |
| Example 223 | | 2.2 | | | | | |
| Example 224 | | 2.7 | | | | | |
| Example 225 | | 5.4 | | | | | |
| Example 226 | SBA-1 | 10.9 | | | | | |
| Example 227 | | 16.3 | | | | | |
| Example 228 | | 21.8 | | | | | |
| Example 229 | MCM-41 | 1.1 | Absent | 1000 | | | |
| Example 230 | | | | 500 | | | |
| Example 231 | | | | 200 | | | |
| Example 232 | | | | 100 | | | |
| Example 233 | | 1.6 | | | | | |
| Example 234 | | 2.0 | | | | | |
| Example 235 | | 2.2 | | | | | |
| Example 236 | | 2.7 | | | | | |
| Example 237 | | 5.4 | | | | | |
| Example 238 | SBA-1 | 10.9 | | | | | |

TABLE 5-2-continued

| | |
|---|---|
| Example 239 | 16.3 |
| Example 240 | 21.8 |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 217 | MTW | 0.61 | Fe | 0.09 | 0.1 | Fair | Fair |
| Example 218 | | | | 0.26 | 0.4 | Fair | Fair |
| Example 219 | | | | 0.44 | 0.7 | Good | Fair |
| Example 220 | | | | 0.87 | 1.4 | Excellent | Good |
| Example 221 | | | | 1.31 | 2.1 | Excellent | Good |
| Example 222 | | | | 1.57 | 2.6 | Excellent | Good |
| Example 223 | | | | 1.74 | 2.9 | Excellent | Excellent |
| Example 224 | | | | 2.18 | 3.6 | Excellent | Excellent |
| Example 225 | | | | 4.36 | 7.1 | Good | Excellent |
| Example 226 | | | | 8.71 | 14.3 | Good | Excellent |
| Example 227 | | | | 13.07 | 21.4 | Fair | Excellent |
| Example 228 | | | | 17.43 | 28.6 | Fair | Excellent |
| Example 229 | | | | 0.09 | 0.1 | Fair | Fair |
| Example 230 | | | | 0.26 | 0.4 | Fair | Fair |
| Example 231 | | | | 0.44 | 0.7 | Good | Fair |
| Example 232 | | | | 0.87 | 1.4 | Excellent | Good |
| Example 233 | | | | 1.31 | 2.1 | Excellent | Good |
| Example 234 | | | | 1.57 | 2.6 | Excellent | Good |
| Example 235 | | | | 1.74 | 2.9 | Good | Excellent |
| Example 236 | | | | 2.18 | 3.6 | Good | Excellent |
| Example 237 | | | | 4.36 | 7.1 | Fair | Excellent |
| Example 238 | | | | 8.71 | 14.3 | Fair | Excellent |
| Example 239 | | | | 13.07 | 21.4 | Fair | Excellent |
| Example 240 | | | | 17.43 | 28.6 | Fair | Excellent |

TABLE 6-1

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 241 | MCM-41 | 1.0 | Present | 1000 | TPABr | 12 | 72 |
| Example 242 | | | | 500 | | | |
| Example 243 | | | | 200 | | | |
| Example 244 | | | | 100 | | | |
| Example 245 | | 1.5 | | | | | |
| Example 246 | | 1.8 | | | | | |
| Example 247 | | 2.0 | | | | | |
| Example 248 | | 2.5 | | | | | |
| Example 249 | | 5.0 | | | | | |
| Example 250 | SBA-1 | 10.0 | | | | | |
| Example 251 | | 15.0 | | | | | |
| Example 252 | | 20.0 | | | | | |
| Example 253 | MCM-41 | 1.0 | Absent | 1000 | | | |
| Example 254 | | | | 500 | | | |
| Example 255 | | | | 200 | | | |
| Example 256 | | | | 100 | | | |
| Example 257 | | 1.5 | | | | | |
| Example 258 | | 1.8 | | | | | |
| Example 259 | | 2.0 | | | | | |
| Example 260 | | 2.5 | | | | | |

TABLE 6-1-continued

| | | |
|---|---|---|
| Example 261 | | 5.0 |
| Example 262 | SBA-1 | 10.0 |
| Example 263 | | 15.0 |
| Example 264 | | 20.0 |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 241 | MFI | 0.56 | Fe | 0.08 | 0.1 | Fair | Fair |
| Example 242 | | | | 0.24 | 0.4 | Fair | Fair |
| Example 243 | | | | 0.40 | 0.7 | Good | Fair |
| Example 244 | | | | 0.80 | 1.4 | Excellent | Good |
| Example 245 | | | | 1.20 | 2.1 | Excellent | Good |
| Example 246 | | | | 1.44 | 2.6 | Excellent | Excellent |
| Example 247 | | | | 1.60 | 2.9 | Excellent | Excellent |
| Example 248 | | | | 2.00 | 3.6 | Excellent | Excellent |
| Example 249 | | | | 4.00 | 7.1 | Good | Excellent |
| Example 250 | | | | 8.00 | 14.3 | Good | Excellent |
| Example 251 | | | | 12.00 | 21.4 | Fair | Excellent |
| Example 252 | | | | 16.00 | 28.6 | Fair | Excellent |
| Example 253 | | | | 0.08 | 0.1 | Fair | Fair |
| Example 254 | | | | 0.24 | 0.4 | Fair | Fair |
| Example 255 | | | | 0.40 | 0.7 | Good | Fair |
| Example 256 | | | | 0.80 | 1.4 | Excellent | Good |
| Example 257 | | | | 1.20 | 2.1 | Excellent | Good |
| Example 258 | | | | 1.44 | 2.6 | Good | Excellent |
| Example 259 | | | | 1.60 | 2.9 | Good | Excellent |
| Example 260 | | | | 2.00 | 3.6 | Good | Excellent |
| Example 261 | | | | 4.00 | 7.1 | Fair | Excellent |
| Example 262 | | | | 8.00 | 14.3 | Fair | Excellent |
| Example 263 | | | | 12.00 | 21.4 | Fair | Excellent |
| Example 264 | | | | 16.00 | 28.6 | Fair | Excellent |

TABLE 6-2

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or Absence of additive | Conversion ratio of amount of added metal-containing solution (atomic ratio) Si/M | Type of structure directing agent | pH | Time period (h) |
| Example 265 | MCM-41 | 1.0 | Present | 1000 | TMABr | 12 | 120 |
| Example 266 | | | | 500 | | | |
| Example 267 | | | | 200 | | | |
| Example 268 | | | | 100 | | | |
| Example 269 | | 1.5 | | | | | |
| Example 270 | | 1.8 | | | | | |
| Example 271 | | 2.0 | | | | | |
| Example 272 | | 2.5 | | | | | |
| Example 273 | | 5.1 | | | | | |
| Example 274 | SBA-1 | 10.2 | | | | | |
| Example 275 | | 15.3 | | | | | |
| Example 276 | | 20.4 | | | | | |
| Example 277 | MCM-41 | 1.0 | Absent | 1000 | | | |
| Example 278 | | | | 500 | | | |
| Example 279 | | | | 200 | | | |
| Example 280 | | | | 100 | | | |
| Example 281 | | 1.5 | | | | | |
| Example 282 | | 1.8 | | | | | |
| Example 283 | | 2.0 | | | | | |
| Example 284 | | 2.5 | | | | | |
| Example 285 | | 5.1 | | | | | |
| Example 286 | SBA-1 | 10.2 | | | | | |

TABLE 6-2-continued

| | |
|---|---|
| Example 287 | 15.3 |
| Example 288 | 20.4 |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 265 | FER | 0.57 | Fe | 0.08 | 0.1 | Fair | Fair |
| Example 266 | | | | 0.24 | 0.4 | Fair | Fair |
| Example 267 | | | | 0.41 | 0.7 | Good | Fair |
| Example 268 | | | | 0.81 | 1.4 | Excellent | Good |
| Example 269 | | | | 1.22 | 2.1 | Excellent | Good |
| Example 270 | | | | 1.47 | 2.6 | Excellent | Good |
| Example 271 | | | | 1.63 | 2.9 | Excellent | Excellent |
| Example 272 | | | | 2.04 | 3.6 | Excellent | Excellent |
| Example 273 | | | | 4.07 | 7.1 | Good | Excellent |
| Example 274 | | | | 8.14 | 14.3 | Good | Excellent |
| Example 275 | | | | 12.21 | 21.4 | Fair | Excellent |
| Example 276 | | | | 16.29 | 28.6 | Fair | Excellent |
| Example 277 | | | | 0.08 | 0.1 | Fair | Fair |
| Example 278 | | | | 0.24 | 0.4 | Fair | Fair |
| Example 279 | | | | 0.41 | 0.7 | Good | Fair |
| Example 280 | | | | 0.81 | 1.4 | Excellent | Good |
| Example 281 | | | | 1.22 | 2.1 | Excellent | Good |
| Example 282 | | | | 1.47 | 2.6 | Excellent | Good |
| Example 283 | | | | 1.63 | 2.9 | Good | Excellent |
| Example 284 | | | | 2.04 | 3.6 | Good | Excellent |
| Example 285 | | | | 4.07 | 7.1 | Fair | Excellent |
| Example 286 | | | | 8.14 | 14.3 | Fair | Excellent |
| Example 287 | | | | 12.21 | 21.4 | Fair | Excellent |
| Example 288 | | | | 16.29 | 28.6 | Fair | Excellent |

TABLE 7-1

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 289 | MCM-41 | 1.3 | Present | 1000 | TEABr | 12 | 120 |
| Example 290 | | | | 500 | | | |
| Example 291 | | | | 200 | | | |
| Example 292 | | | | 100 | | | |
| Example 293 | | 2.0 | | | | | |
| Example 294 | | 2.4 | | | | | |
| Example 295 | | 2.6 | | | | | |
| Example 296 | | 3.3 | | | | | |
| Example 297 | | 6.6 | | | | | |
| Example 298 | SBA-1 | 13.2 | | | | | |
| Example 299 | | 19.8 | | | | | |
| Example 300 | | 26.4 | | | | | |
| Example 301 | MCM-41 | 1.3 | Absent | 1000 | | | |
| Example 302 | | | | 500 | | | |
| Example 303 | | | | 200 | | | |
| Example 304 | | | | 100 | | | |
| Example 305 | | 2.0 | | | | | |
| Example 306 | | 2.4 | | | | | |
| Example 307 | | 2.6 | | | | | |
| Example 308 | | 3.3 | | | | | |

TABLE 7-1-continued

| | | |
|---|---|---|
| Example 309 | | 6.6 |
| Example 310 | SBA-1 | 13.2 |
| Example 311 | | 19.8 |
| Example 312 | | 26.4 |

| | Catalyst structure | | | | | | |
|---|---|---|---|---|---|---|---|
| | Carrier Zeolite type compound | | Catalytic material Metal fine particl | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 289 | FAU | 0.74 | Pt | 0.11 | 0.1 | Fair | Fair |
| Example 290 | | | | 0.32 | 0.4 | Fair | Fair |
| Example 291 | | | | 0.53 | 0.7 | Good | Fair |
| Example 292 | | | | 1.06 | 1.4 | Excellent | Good |
| Example 293 | | | | 1.59 | 2.1 | Excellent | Good |
| Example 294 | | | | 1.90 | 2.6 | Excellent | Excellent |
| Example 295 | | | | 2.11 | 2.9 | Excellent | Excellent |
| Example 296 | | | | 2.64 | 3.6 | Excellent | Excellent |
| Example 297 | | | | 5.29 | 7.1 | Good | Excellent |
| Example 298 | | | | 10.57 | 14.3 | Good | Excellent |
| Example 299 | | | | 15.86 | 21.4 | Fair | Excellent |
| Example 300 | | | | 21.14 | 28.6 | Fair | Excellent |
| Example 301 | | | | 0.11 | 0.1 | Fair | Fair |
| Example 302 | | | | 0.32 | 0.4 | Fair | Fair |
| Example 303 | | | | 0.53 | 0.7 | Good | Fair |
| Example 304 | | | | 1.06 | 1.4 | Excellent | Good |
| Example 305 | | | | 1.59 | 2.1 | Excellent | Good |
| Example 306 | | | | 1.90 | 2.6 | Good | Excellent |
| Example 307 | | | | 2.11 | 2.9 | Good | Excellent |
| Example 308 | | | | 2.64 | 3.6 | Good | Excellent |
| Example 309 | | | | 5.29 | 7.1 | Fair | Excellent |
| Example 310 | | | | 10.57 | 14.3 | Fair | Excellent |
| Example 311 | | | | 15.86 | 21.4 | Fair | Excellent |
| Example 312 | | | | 21.14 | 28.6 | Fair | Excellent |

TABLE 7-2

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 313 | MCM-41 | 1.1 | Present | 1000 | TEABr | 11 | 72 |
| Example 314 | | | | 500 | | | |
| Example 315 | | | | 200 | | | |
| Example 316 | | | | 100 | | | |
| Example 317 | | 1.6 | | | | | |
| Example 318 | | 2.0 | | | | | |
| Example 319 | | 2.2 | | | | | |
| Example 320 | | 2.7 | | | | | |
| Example 321 | | 5.4 | | | | | |
| Example 322 | SBA-1 | 10.9 | | | | | |
| Example 323 | | 16.3 | | | | | |
| Example 324 | | 21.8 | | | | | |
| Example 325 | MCM-41 | 1.1 | Absent | 1000 | | | |
| Example 326 | | | | 500 | | | |
| Example 327 | | | | 200 | | | |
| Example 328 | | | | 100 | | | |
| Example 329 | | 1.6 | | | | | |
| Example 330 | | 2.0 | | | | | |
| Example 331 | | 2.2 | | | | | |
| Example 332 | | 2.7 | | | | | |
| Example 333 | | 5.4 | | | | | |
| Example 334 | SBA-1 | 10.9 | | | | | |

TABLE 7-2-continued

| | |
|---|---|
| Example 335 | 16.3 |
| Example 336 | 21.8 |

| | Catalyst structure | | | | | |
|---|---|---|---|---|---|---|
| | Carrier Zeolite type compound | | Catalytic material Metal fine particle | | | |
| | | Average inner diameter | | Average particle | | Performance evaluation |
| No. | Framework Structure | of channel $D_F$ (nm) | Type | diameter $D_C$ (nm) | $D_C/D_F$ | Catalytic activity | Durability |
| Example 313 | MTW | 0.61 | Pt | 0.09 | 0.1 | Fair | Fair |
| Example 314 | | | | 0.26 | 0.4 | Fair | Fair |
| Example 315 | | | | 0.44 | 0.7 | Good | Fair |
| Example 316 | | | | 0.87 | 1.4 | Excellent | Good |
| Example 317 | | | | 1.31 | 2.1 | Excellent | Good |
| Example 318 | | | | 1.57 | 2.6 | Excellent | Good |
| Example 319 | | | | 1.74 | 2.9 | Excellent | Excellent |
| Example 320 | | | | 2.18 | 3.6 | Excellent | Excellent |
| Example 321 | | | | 4.36 | 7.1 | Good | Excellent |
| Example 322 | | | | 8.71 | 14.3 | Good | Excellent |
| Example 323 | | | | 13.07 | 21.4 | Fair | Excellent |
| Example 324 | | | | 17.43 | 28.6 | Fair | Excellent |
| Example 325 | | | | 0.09 | 0.1 | Fair | Fair |
| Example 326 | | | | 0.26 | 0.4 | Fair | Fair |
| Example 327 | | | | 0.44 | 0.7 | Good | Fair |
| Example 328 | | | | 0.87 | 1.4 | Excellent | Good |
| Example 329 | | | | 1.31 | 2.1 | Excellent | Good |
| Example 330 | | | | 1.57 | 2.6 | Excellent | Good |
| Example 331 | | | | 1.74 | 2.9 | Good | Excellent |
| Example 332 | | | | 2.18 | 3.6 | Good | Excellent |
| Example 333 | | | | 4.36 | 7.1 | Fair | Excellent |
| Example 334 | | | | 8.71 | 14.3 | Fair | Excellent |
| Example 335 | | | | 13.07 | 21.4 | Fair | Excellent |
| Example 336 | | | | 17.43 | 28.6 | Fair | Excellent |

TABLE 8-1

| | Production conditions of catalyst structure | | | | | |
|---|---|---|---|---|---|---|
| | Precursor material (A) | | Addition to precursor material (A) | Hydrothermal treatment condition using precursormaterial (C) | | |
| | | | | Conversion ratio of | | |
| No. | Type | Pore diameter (nm) | Presence or absence of additive | amount of added metal-containing solution (atomic ratio) Si/M | Type of structure directing agent | pH | Time period (h) |
| Example 337 | MCM-41 | 1.0 | Present | 1000 | TPABr | 12 | 72 |
| Example 338 | | | | 500 | | | |
| Example 339 | | | | 200 | | | |
| Example 340 | | | | 100 | | | |
| Example 341 | | 1.5 | | | | | |
| Example 342 | | 1.8 | | | | | |
| Example 343 | | 2.0 | | | | | |
| Example 344 | | 2.5 | | | | | |
| Example 345 | | 5.0 | | | | | |
| Example 346 | SBA-1 | 10.0 | | | | | |
| Example 347 | | 15.0 | | | | | |
| Example 348 | | 20.0 | | | | | |
| Example 349 | MCM-41 | 1.0 | Absent | 1000 | | | |
| Example 350 | | | | 500 | | | |
| Example 351 | | | | 200 | | | |
| Example 352 | | | | 100 | | | |
| Example 353 | | 1.5 | | | | | |
| Example 354 | | 1.8 | | | | | |
| Example 355 | | 2.0 | | | | | |
| Example 356 | | 2.5 | | | | | |
| Example 357 | | 5.0 | | | | | |

TABLE 8-1-continued

| | | | | | | | |
|---|---|---|---|---|---|---|---|
| Example 358 | SBA-1 | 10.0 | | | | | |
| Example 359 | | 15.0 | | | | | |
| Example 360 | | 20.0 | | | | | |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 337 | MFI | 0.56 | Pt | 0.08 | 0.1 | Fair | Fair |
| Example 338 | | | | 0.24 | 0.4 | Fair | Fair |
| Example 339 | | | | 0.40 | 0.7 | Good | Fair |
| Example 340 | | | | 0.80 | 1.4 | Excellent | Good |
| Example 341 | | | | 1.20 | 2.1 | Excellent | Good |
| Example 342 | | | | 1.44 | 2.6 | Excellent | Excellent |
| Example 343 | | | | 1.60 | 2.9 | Excellent | Excellent |
| Example 344 | | | | 2.00 | 3.6 | Excellent | Excellent |
| Example 345 | | | | 4.00 | 7.1 | Good | Excellent |
| Example 346 | | | | 8.00 | 14.3 | Good | Excellent |
| Example 347 | | | | 12.00 | 21.4 | Fair | Excellent |
| Example 348 | | | | 16.00 | 28.6 | Fair | Excellent |
| Example 349 | | | | 0.08 | 0.1 | Fair | Fair |
| Example 350 | | | | 0.24 | 0.4 | Fair | Fair |
| Example 351 | | | | 0.40 | 0.7 | Good | Fair |
| Example 352 | | | | 0.80 | 1.4 | Excellent | Good |
| Example 353 | | | | 1.20 | 2.1 | Excellent | Good |
| Example 354 | | | | 1.44 | 2.6 | Good | Excellent |
| Example 355 | | | | 1.60 | 2.9 | Good | Excellent |
| Example 356 | | | | 2.00 | 3.6 | Good | Excellent |
| Example 357 | | | | 4.00 | 7.1 | Fair | Excellent |
| Example 358 | | | | 8.00 | 14.3 | Fair | Excellent |
| Example 359 | | | | 12.00 | 21.4 | Fair | Excellent |
| Example 360 | | | | 16.00 | 28.6 | Fair | Excellent |

TABLE 8-2

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 361 | MCM-41 | 1.0 | Present | 1000 | TMABr | 12 | 120 |
| Example 362 | | | | 500 | | | |
| Example 363 | | | | 200 | | | |
| Example 364 | | | | 100 | | | |
| Example 365 | | 1.5 | | | | | |
| Example 366 | | 1.8 | | | | | |
| Example 367 | | 2.0 | | | | | |
| Example 368 | | 2.5 | | | | | |
| Example 369 | | 5.1 | | | | | |
| Example 370 | SBA-1 | 10.2 | | | | | |
| Example 371 | | 15.3 | | | | | |
| Example 372 | | 20.4 | | | | | |
| Example 373 | MCM-41 | 1.0 | Absent | 1000 | | | |
| Example 374 | | | | 500 | | | |
| Example 375 | | | | 200 | | | |
| Example 376 | | | | 100 | | | |
| Example 377 | | 1.5 | | | | | |
| Example 378 | | 1.8 | | | | | |
| Example 379 | | 2.0 | | | | | |
| Example 380 | | 2.5 | | | | | |
| Example 381 | | 5.1 | | | | | |
| Example 382 | SBA-1 | 10.2 | | | | | |
| Example 383 | | 15.3 | | | | | |

TABLE 8-2-continued

| | |
|---|---|
| Example 384 | 20.4 |
| Comparative Example 1 | — |
| Comparative Example 2 | — |

| | Catalyst structure | | | | | |
|---|---|---|---|---|---|---|
| | Carrier Zeolite type compound | | Catalytic material Metal fine particle | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 361 | FER | 0.57 | Pt | 0.08 | 0.1 | Fair | Fair |
| Example 362 | | | | 0.24 | 0.4 | Fair | Fair |
| Example 363 | | | | 0.41 | 0.7 | Good | Fair |
| Example 364 | | | | 0.81 | 1.4 | Excellent | Good |
| Example 365 | | | | 1.22 | 2.1 | Excellent | Good |
| Example 366 | | | | 1.47 | 2.6 | Excellent | Good |
| Example 367 | | | | 1.63 | 2.9 | Excellent | Excellent |
| Example 368 | | | | 2.04 | 3.6 | Excellent | Excellent |
| Example 369 | | | | 4.07 | 7.1 | Good | Excellent |
| Example 370 | | | | 8.14 | 14.3 | Good | Excellent |
| Example 371 | | | | 12.21 | 21.4 | Fair | Excellent |
| Example 372 | | | | 16.29 | 28.6 | Fair | Excellent |
| Example 373 | | | | 0.08 | 0.1 | Fair | Fair |
| Example 374 | | | | 0.24 | 0.4 | Fair | Fair |
| Example 375 | | | | 0.41 | 0.7 | Good | Fair |
| Example 376 | | | | 0.81 | 1.4 | Excellent | Good |
| Example 377 | | | | 1.22 | 2.1 | Excellent | Good |
| Example 378 | | | | 1.47 | 2.6 | Excellent | Good |
| Example 379 | | | | 1.63 | 2.9 | Good | Excellent |
| Example 380 | | | | 2.04 | 3.6 | Good | Excellent |
| Example 381 | | | | 4.07 | 7.1 | Fair | Excellent |
| Example 382 | | | | 8.14 | 14.3 | Fair | Excellent |
| Example 383 | | | | 12.21 | 21.4 | Fair | Excellent |
| Example 384 | | | | 16.29 | 28.6 | Fair | Excellent |
| Comparative Example 1 | MFI type silicalite | 0.56 | Co | ≤50 | ≤67.6 | Fair | Poor |
| Comparative Example 2 | MFI type silicalite | 0.56 | — | — | — | Poor | Poor |

As is clear from Tables 1-1 to 8-2, it was found that the catalyst structures (Examples 1 to 384) for which cross sectional observation was carried out and confirmed that the catalytic material is held in the inside of the carrier exhibit excellent catalytic activity in the decomposition reaction of butylbenzene and is also excellent in the durability as the catalyst as compared to the catalyst structure (Comparative Example 1) wherein the catalytic material only attaches to the outer surface of the carrier, or the carrier itself (Comparative Example 2) that does not have the catalytic material at all.

Further, a relationship between the amount (mass %) of metal included in the inside of the carrier of the catalyst structure measured in the above described evaluation [C], and the yield (mol %) of the compounds having molecular weights less than that of butylbenzene contained in the produced liquid was evaluated. The evaluation method was the same method as the above described evaluation method performed in the "(1-1) catalytic activity" in "performance evaluation" of "D-1".

As a result, it was found that in each of the Examples, when the addition amount of the metal-containing solution to be added to the precursor material (A) is 50 to 200 in terms of the atomic ratio Si/M (M=Fe) (content of metal fine particles with respect to catalyst structure was 0.5 to 2.5 mass %), the yield of the compounds having the molecular weights less than that of the butylbenzene contained in the produced liquid becomes 32 mol % or more, and the catalytic activity in the decomposition reaction of the butylbenzene is in an acceptable level or higher.

On the other hand, the catalyst structure of Comparative Example 1 having the catalytic material attached only to the outer surface of the carrier is improved in the catalytic activity in the decomposition reaction of the butylbenzene as compared to the carrier itself in Comparative Example 2 having no catalytic material in itself, but the durability of the catalyst was inferior as compared to those of the catalyst structures in Examples 1 to 384.

In addition, the carrier itself having no catalytic material in itself in Comparative Example 2 did not show almost any catalytic activity in the decomposition reaction of the butylbenzene, and both of the catalytic activity and the durability were inferior as compared to those of the catalyst structures of Examples 1 to 384.

Thereafter, the catalytic activity in dry reforming was evaluated. A normal pressure flow type reaction apparatus was filled with 50 mg of each of the catalyst structures (Examples 97 to 192) having the Ni fine particle as the catalytic material and Comparative Example 3, $CO_2$ (7 ml/minute) and $CH_4$ (7 ml/minute) were supplied to the reaction apparatus, and dry reforming was performed while the resultant substance was heated at 100 to 900° C. A single micro reactor (Rx-3050SR, made by Frontier Laboratories, Ltd.) was used as the normal pressure flow type reaction apparatus. The product was analyzed using gas chromatography-mass spectrometry (GC/MS). TRACE 1310 GC (made by Thermo Fisher Scientific Co., Ltd., detector: thermal conductivity detector) was used as an analysis apparatus for the produced gas.

As for the catalytic activity in the dry reforming, the Example was determined to be excellent in the catalytic activity when the production of the carbon monoxide started at 600° C. or lower, and expressed as "Excellent", the Example was determined to have good catalytic activity when the production started at higher than 600° C. and lower than 700° C., and expressed as "Good", the Example was determined not to have good catalytic activity but to have the catalytic activity in a passing level (acceptable) when the production started at 700° C. or higher and lower than 800° C., and expressed by "Fair", and, the Example was determined to be inferior in the catalytic activity (unacceptable) when the production started at 800° C. or higher and lower than 900° C., or when the reaction did not proceed, and expressed by "Poor". The results are shown in Tables 9-1 to 10-2.

TABLE 9-1

| | Production conditions of catalyst structure | | | | | | |
|---|---|---|---|---|---|---|---|
| | Precursor material (A) | | Addition to precursor material (A) | Hydrothermal treatment condition using precursor material (C) | | | Catalyst structure |
| | | | Conversion ratio of | | | | |
| No. | Type | Pore diameter (nm) | Presence or absence of additive | amount of added metal-containing solution (atomic ratio) Si/M | Type of structure directing agent | pH | Time period (h) | Carrier Zeolite type compound Framework Structure |
| Example 97 | MCM-41 | 1.3 | Present | 1000 | TEABr | 12 | 120 | FAU |
| Example 98 | | | | 500 | | | | |
| Example 99 | | | | 200 | | | | |
| Example 100 | | | | 100 | | | | |
| Example 101 | | 2.0 | | | | | | |
| Example 102 | | 2.4 | | | | | | |
| Example 103 | | 2.6 | | | | | | |
| Example 104 | | 3.3 | | | | | | |
| Example 105 | | 6.6 | | | | | | |
| Example 106 | SBA-1 | 13.2 | | | | | | |
| Example 107 | | 19.8 | | | | | | |
| Example 108 | | 26.4 | | | | | | |
| Example 109 | MCM-41 | 1.3 | Absent | 1000 | | | | |
| Example 110 | | | | 500 | | | | |
| Example 111 | | | | 200 | | | | |
| Example 112 | | | | 100 | | | | |
| Example 113 | | 2.0 | | | | | | |
| Example 114 | | 2.4 | | | | | | |
| Example 115 | | 2.6 | | | | | | |
| Example 116 | | 3.3 | | | | | | |
| Example 117 | | 6.6 | | | | | | |
| Example 118 | SBA-1 | 13.2 | | | | | | |
| Example 119 | | 19.8 | | | | | | |
| Example 120 | | 26.4 | | | | | | |

| | Catalyst structure | | | | Performance evaluation | | |
|---|---|---|---|---|---|---|---|
| | Carrier Zeolite type compound | Catalytic material Metal fine particle | | | | | |
| No. | Average inner diameter of channel $D_F$ (nm) | Type | Average particle diameter $D_C$ (nm) | $D_C/D_F$ | Catalytic activity | Durability | Catalytic activity in dry reforming |
| Example 97 | 0.74 | Ni | 0.11 | 0.1 | Fair | Fair | Fair |
| Example 98 | | | 0.32 | 0.4 | Fair | Fair | Fair |
| Example 99 | | | 0.53 | 0.7 | Good | Fair | Good |
| Example 100 | | | 1.06 | 1.4 | Excellent | Good | Excellent |
| Example 101 | | | 1.59 | 2.1 | Excellent | Good | Excellent |
| Example 102 | | | 1.90 | 2.6 | Excellent | Excellent | Excellent |
| Example 103 | | | 2.11 | 2.9 | Excellent | Excellent | Excellent |
| Example 104 | | | 2.64 | 3.6 | Excellent | Excellent | Excellent |
| Example 105 | | | 5.29 | 7.1 | Good | Excellent | Excellent |
| Example 106 | | | 10.57 | 14.3 | Good | Excellent | Excellent |
| Example 107 | | | 15.86 | 21.4 | Fair | Excellent | Good |
| Example 108 | | | 21.14 | 28.6 | Fair | Excellent | Good |
| Example 109 | | | 0.11 | 0.1 | Fair | Fair | Fair |
| Example 110 | | | 0.32 | 0.4 | Fair | Fair | Fair |
| Example 111 | | | 0.53 | 0.7 | Good | Fair | Good |
| Example 112 | | | 1.06 | 1.4 | Excellent | Good | Excellent |

TABLE 9-1-continued

| | | | | | |
|---|---|---|---|---|---|
| Example 113 | 1.59 | 2.1 | Excellent | Good | Excellent |
| Example 114 | 1.90 | 2.6 | Good | Excellent | Excellent |
| Example 115 | 2.11 | 2.9 | Good | Excellent | Excellent |
| Example 116 | 2.64 | 3.6 | Good | Excellent | Excellent |
| Example 117 | 5.29 | 7.1 | Fair | Excellent | Excellent |
| Example 118 | 10.57 | 14.3 | Fair | Excellent | Excellent |
| Example 119 | 15.86 | 21.4 | Fair | Excellent | Good |
| Example 120 | 21.14 | 28.6 | Fair | Excellent | Good |

TABLE 9-2

Production conditions of catalyst structure

| | Precursor material (A) | | Addition to precursor material (A) | Hydrothermal treatment condition using precursor material (C) | | | Catalyst structure |
|---|---|---|---|---|---|---|---|
| No. | Type | Pore diameter (nm) | Presence or absence of additive | Conversion ratio of amount of added metal-containing solution (atomic ratio) Si/M | Type of structure directing agent | pH | Time period (h) | Carrier Zeolite type compound Framework Structure |

| No. | Type | Pore diameter (nm) | Presence or absence of additive | Si/M | SDA | pH | Time (h) | Framework |
|---|---|---|---|---|---|---|---|---|
| Example 121 | MCM-41 | 1.1 | Present | 1000 | TEABr | 11 | 72 | MTW |
| Example 122 | | | | 500 | | | | |
| Example 123 | | | | 200 | | | | |
| Example 124 | | | | 100 | | | | |
| Example 125 | | 1.6 | | | | | | |
| Example 126 | | 2.0 | | | | | | |
| Example 127 | | 2.2 | | | | | | |
| Example 128 | | 2.7 | | | | | | |
| Example 129 | | 5.4 | | | | | | |
| Example 130 | SBA-1 | 10.9 | | | | | | |
| Example 131 | | 16.3 | | | | | | |
| Example 132 | | 21.8 | | | | | | |
| Example 133 | MCM-41 | 1.1 | Absent | 1000 | | | | |
| Example 134 | | | | 500 | | | | |
| Example 135 | | | | 200 | | | | |
| Example 136 | | | | 100 | | | | |
| Example 137 | | 1.6 | | | | | | |
| Example 138 | | 2.0 | | | | | | |
| Example 139 | | 2.2 | | | | | | |
| Example 140 | | 2.7 | | | | | | |
| Example 141 | | 5.4 | | | | | | |
| Example 142 | SBA-1 | 10.9 | | | | | | |
| Example 143 | | 16.3 | | | | | | |
| Example 144 | | 21.8 | | | | | | |

| | Catalyst structure | | | | | Performance evaluation | | |
|---|---|---|---|---|---|---|---|---|
| | Carrier Zeolite type compound | Catalytic material Metal fine particle | | | | | | |
| No. | Average inner diameter of channel $D_F$ (nm) | Type | Average particle diameter $D_C$ (nm) | $D_C/D_F$ | Catalytic activity | Durability | Catalytic activity in dry reforming |
| Example 121 | 0.61 | Ni | 0.09 | 0.1 | Fair | Fair | Fair |
| Example 122 | | | 0.26 | 0.4 | Fair | Fair | Fair |
| Example 123 | | | 0.44 | 0.7 | Good | Fair | Good |
| Example 124 | | | 0.87 | 1.4 | Excellent | Good | Excellent |
| Example 125 | | | 1.31 | 2.1 | Excellent | Good | Excellent |
| Example 126 | | | 1.57 | 2.6 | Excellent | Good | Excellent |
| Example 127 | | | 1.74 | 2.9 | Excellent | Excellent | Excellent |
| Example 128 | | | 2.18 | 3.6 | Excellent | Excellent | Excellent |
| Example 129 | | | 4.36 | 7.1 | Good | Excellent | Excellent |
| Example 130 | | | 8.71 | 14.3 | Good | Excellent | Excellent |
| Example 131 | | | 13.07 | 21.4 | Fair | Excellent | Good |
| Example 132 | | | 17.43 | 28.6 | Fair | Excellent | Good |
| Example 133 | | | 0.09 | 0.1 | Fair | Fair | Fair |
| Example 134 | | | 0.26 | 0.4 | Fair | Fair | Fair |
| Example 135 | | | 0.44 | 0.7 | Good | Fair | Good |
| Example 136 | | | 0.87 | 1.4 | Excellent | Good | Excellent |
| Example 137 | | | 1.31 | 2.1 | Excellent | Good | Excellent |
| Example 138 | | | 1.57 | 2.6 | Excellent | Good | Excellent |

TABLE 9-2-continued

| | | | | | | |
|---|---|---|---|---|---|---|
| Example 139 | | 1.74 | 2.9 | Good | Excellent | Excellent |
| Example 140 | | 2.18 | 3.6 | Good | Excellent | Excellent |
| Example 141 | | 4.36 | 7.1 | Fair | Excellent | Excellent |
| Example 142 | | 8.71 | 14.3 | Fair | Excellent | Excellent |
| Example 143 | | 13.07 | 21.4 | Fair | Excellent | Good |
| Example 144 | | 17.43 | 28.6 | Fair | Excellent | Good |

TABLE 10-1

Production conditions of catalyst structure

| | Precursor material (A) | | Addition to precursor material (A) | | Hydrothermal treatment condition using precursor material (C) | | | Catalyst structure |
|---|---|---|---|---|---|---|---|---|
| No. | Type | Pore diameter (nm) | Presence or absence of additive | Conversion ratio of amount of added metal-containing solution (atomic ratio) Si/M | Type of structure directing agent | pH | Time period (h) | Carrier Zeolite type compound Framework Structure |
| Example 145 | MCM-41 | 1.0 | Present | 1000 | TPABr | 12 | 72 | MFI |
| Example 146 | | 1.0 | | 500 | | | | |
| Example 147 | | 1.0 | | 200 | | | | |
| Example 148 | | 1.0 | | 100 | | | | |
| Example 149 | | 1.5 | | | | | | |
| Example 150 | | 1.8 | | | | | | |
| Example 151 | | 2.0 | | | | | | |
| Example 152 | | 2.5 | | | | | | |
| Example 153 | | 5.0 | | | | | | |
| Example 154 | SBA-1 | 10.0 | | | | | | |
| Example 155 | | 15.0 | | | | | | |
| Example 156 | | 20.0 | | | | | | |
| Example 157 | MCM-41 | 1.0 | Absent | 1000 | | | | |
| Example 158 | | 1.0 | | 500 | | | | |
| Example 159 | | 1.0 | | 200 | | | | |
| Example 160 | | 1.0 | | 100 | | | | |
| Example 161 | | 1.5 | | | | | | |
| Example 162 | | 1.8 | | | | | | |
| Example 163 | | 2.0 | | | | | | |
| Example 164 | | 2.5 | | | | | | |
| Example 165 | | 5.0 | | | | | | |
| Example 166 | SBA-1 | 10.0 | | | | | | |
| Example 167 | | 15.0 | | | | | | |
| Example 168 | | 20.0 | | | | | | |

| | Catalyst structure | | | | Performance evaluation | | |
|---|---|---|---|---|---|---|---|
| | Carrier Zeolite type compound | Catalytic material Metal fine particle | | | | | |
| No. | Average inner diameter of channel $D_F$ (nm) | Type | Average particle diameter $D_C$ (nm) | $D_C/D_F$ | Catalytic activity | Durability | Catalytic activity in dry reforming |
| Example 145 | 0.56 | Ni | 0.08 | 0.1 | Fair | Fair | Fair |
| Example 146 | | | 0.24 | 0.4 | Fair | Fair | Fair |
| Example 147 | | | 0.40 | 0.7 | Good | Fair | Good |
| Example 148 | | | 0.80 | 1.4 | Excellent | Good | Excellent |
| Example 149 | | | 1.20 | 2.1 | Excellent | Good | Excellent |
| Example 150 | | | 1.44 | 2.6 | Excellent | Excellent | Excellent |
| Example 151 | | | 1.60 | 2.9 | Excellent | Excellent | Excellent |
| Example 152 | | | 2.00 | 3.6 | Excellent | Excellent | Excellent |
| Example 153 | | | 4.00 | 7.1 | Good | Excellent | Excellent |
| Example 154 | | | 8.00 | 14.3 | Good | Excellent | Excellent |
| Example 155 | | | 12.00 | 21.4 | Fair | Excellent | Good |
| Example 156 | | | 16.00 | 28.6 | Fair | Excellent | Good |
| Example 157 | | | 0.08 | 0.1 | Fair | Fair | Fair |
| Example 158 | | | 0.24 | 0.4 | Fair | Fair | Fair |
| Example 159 | | | 0.40 | 0.7 | Good | Fair | Good |
| Example 160 | | | 0.80 | 1.4 | Excellent | Good | Excellent |
| Example 161 | | | 1.20 | 2.1 | Excellent | Good | Excellent |
| Example 162 | | | 1.44 | 2.6 | Good | Excellent | Excellent |
| Example 163 | | | 1.60 | 2.9 | Good | Excellent | Excellent |
| Example 164 | | | 2.00 | 3.6 | Good | Excellent | Excellent |

TABLE 10-1-continued

| | | | | | |
|---|---|---|---|---|---|
| Example 165 | 4.00 | 7.1 | Fair | Excellent | Excellent |
| Example 166 | 8.00 | 14.3 | Fair | Excellent | Excellent |
| Example 167 | 12.00 | 21.4 | Fair | Excellent | Good |
| Example 168 | 16.00 | 28.6 | Fair | Excellent | Good |

TABLE 10-2

| | Production conditions of catalyst structure | | | | | | |
|---|---|---|---|---|---|---|---|
| | Precursor material (A) | | | Addition to precursor material (A) Conversion ratio of amount of added metal-containing solution (atomic ratio) Si/M | Hydrothermal treatment condition using precursor material (C) | | Catalyst structure |
| No. | Type | Pore diameter (nm) | Presence or absence of additive | | Type of structure directing agent | pH | Time period (h) | Carrier Zeolite type compound Framework Structure |
| Example 169 | MCM-41 | 1.0 | Present | 1000 | TMABr | 12 | 120 | FER |
| Example 170 | | 1.0 | | 500 | | | | |
| Example 171 | | 1.0 | | 200 | | | | |
| Example 172 | | 1.0 | | 100 | | | | |
| Example 173 | | 1.5 | | | | | | |
| Example 174 | | 1.8 | | | | | | |
| Example 175 | | 2.0 | | | | | | |
| Example 176 | | 2.5 | | | | | | |
| Example 177 | | 5.1 | | | | | | |
| Example 178 | SBA-1 | 10.2 | | | | | | |
| Example 179 | | 15.3 | | | | | | |
| Example 180 | | 20.4 | | | | | | |
| Example 181 | MCM-41 | 1.0 | Absent | 1000 | | | | |
| Example 182 | | 1.0 | | 500 | | | | |
| Example 183 | | 1.0 | | 200 | | | | |
| Example 184 | | 1.0 | | 100 | | | | |
| Example 185 | | 1.5 | | | | | | |
| Example 186 | | 1.8 | | | | | | |
| Example 187 | | 2.0 | | | | | | |
| Example 188 | | 2.5 | | | | | | |
| Example 189 | | 5.1 | | | | | | |
| Example 190 | SBA-1 | 10.2 | | | | | | |
| Example 191 | | 15.3 | | | | | | |
| Example 192 | | 20.4 | | | | | | |
| Comparative Example 3 | | | | — | | | | $A_D O_3$ |

| | Catalyst structure | | | | | | |
|---|---|---|---|---|---|---|---|
| | Carrier Zeolite type compound | Catalytic material Metal fine particle | | | | | |
| | Average inner diameter of channel $D_F$ (nm) | | Average particle diameter $D_C$ (nm) | | Performance evaluation | | |
| No. | | Type | | $D_C/D_F$ | Catalytic activity | Durability | Catalytic activity in dry reforming |
| Example 169 | 0.57 | Ni | 0.08 | 0.1 | Fair | Fair | Fair |
| Example 170 | | | 0.24 | 0.4 | Fair | Fair | Fair |
| Example 171 | | | 0.41 | 0.7 | Good | Fair | Good |
| Example 172 | | | 0.81 | 1.4 | Excellent | Good | Excellent |
| Example 173 | | | 1.22 | 2.1 | Excellent | Good | Excellent |
| Example 174 | | | 1.47 | 2.6 | Excellent | Good | Excellent |
| Example 175 | | | 1.63 | 2.9 | Excellent | Excellent | Excellent |
| Example 176 | | | 2.04 | 3.6 | Excellent | Excellent | Excellent |
| Example 177 | | | 4.07 | 7.1 | Good | Excellent | Excellent |
| Example 178 | | | 8.14 | 14.3 | Good | Excellent | Excellent |
| Example 179 | | | 12.21 | 21.4 | Fair | Excellent | Good |
| Example 180 | | | 16.29 | 28.6 | Fair | Excellent | Good |
| Example 181 | | | 0.08 | 0.1 | Fair | Fair | Fair |
| Example 182 | | | 0.24 | 0.4 | Fair | Fair | Fair |
| Example 183 | | | 0.41 | 0.7 | Good | Fair | Good |
| Example 184 | | | 0.81 | 1.4 | Excellent | Good | Excellent |
| Example 185 | | | 1.22 | 2.1 | Excellent | Good | Excellent |
| Example 186 | | | 1.47 | 2.6 | Excellent | Good | Excellent |
| Example 187 | | | 1.63 | 2.9 | Good | Excellent | Excellent |
| Example 188 | | | 2.04 | 3.6 | Good | Excellent | Excellent |

TABLE 10-2-continued

| | | | | | | |
|---|---|---|---|---|---|---|
| Example 189 | | | 4.07 | 7.1 | Fair | Excellent Excellent |
| Example 190 | | | 8.14 | 14.3 | Fair | Excellent Excellent |
| Example 191 | | | 12.21 | 21.4 | Fair | Excellent Good |
| Example 192 | | | 16.29 | 28.6 | Fair | Excellent Good |
| Comparative Example 3 | — | Ni | — | — | — | — Poor |

As is clear from Tables 9-1 to 10-2, it was found that when the catalytic material is the Ni fine particle, the catalytic activity in the dry reforming is high. In addition, it is disclosed that in the dry reforming, metals in Groups 8, 9 and 10 excluding Os (Rh, Ru, Ni, Pt, Pd, Ir, Co and Fe) have high activity, and the main order of the activity is Rh, Ru>Ir>Ni, Pt, Pd (Advanced Technology of Methane Chemical Conversion (CMC Publishing Co., Ltd., in 2008). Therefore, it is assumed that at least Rh, Ru, Ir, Pt and Pd showing the activity equal to or higher than that of Ni, and particularly, Rh, Ru and Ir are also excellent in the catalytic activity in the dry reforming.

From the above description, it is possible to produce a synthesis gas containing carbon monoxide and hydrogen, by using the catalyst structure according to the present example for a reaction between a methane-containing gas and carbon dioxide. In addition, also in a case where the catalyst structure is used for producing the synthesis gas containing carbon monoxide and hydrogen, it is confirmed that the catalytic activity and the durability are adequate similarly to those in the above described case.

Examples 385 to 768

Catalyst structures having carriers and metal fine particles of the catalytic material shown in Tables 11-1 to 18-2 were obtained in similar ways to those in Examples 1 to 384, except that the metal salts to be dissolved in the metal-containing solution were replaced with the following substances, in production of the precursor materials (B) and (C).
  Ru: ruthenium chloride (III) hydrate (made by Nacalai Tesque, Inc.)
  Ni: nickel nitrate (II) hexahydrate (made by Wako Pure Chemical Industries, Ltd.)
  Ir: iridium chloride (III) hydrate (made by Wako Pure Chemical Industries, Ltd.)
  Rh: rhodium nitrate (III) solution (made by Wako Pure Chemical Industries, Ltd.)
  [Evaluation]
  For the catalyst structures of Examples 385 to 768, various characteristics were evaluated under the following conditions.
  [A-2] Cross Section Observation
  For the catalyst structures of Examples 385 to 768, observation samples were prepared with a pulverization method, and the respective cross sections were observed using a transmission electron microscope (TEM) (TITAN G2, made by FEI).

As a result, it was confirmed that in the catalyst structures of the above described Examples, the catalytic material exists in the inside of the carrier composed of silicalite or zeolite, and was held by the carrier.

In addition, concerning the catalyst structure where the metal is a Ni fine particle, in the above described Examples, the cross section was cut out by FIB (focused ion beam) processing, and elements on a cross section was analyzed using SEM (SU8020, made by Hitachi High-Technologies Corporation), and EDX (X-Max, made by Horiba, Ltd.). As a result, Ni element was detected from the inside of the carrier.

From the results of the above described cross section observations by TEM and SEM/EDX, it was confirmed that the Ni fine particle exists in the inside of the carrier.

[B-2] Average Inner Diameter of Channel of Carrier and Average Particle Diameter of Catalytic Material In the TEM image photographed in the cross section observation performed in the above described evaluation [A-2], 500 channels in the carrier were arbitrarily selected, and the respective major and minor axes were measured. From average values thereof, respective inner diameters were calculated (N=500), and further, an average value of the inner diameters was determined and taken as an average inner diameter $D_F$ of the channels in the carrier. In addition, also for the catalytic material, similarly, 500 catalytic materials were arbitrarily selected in the above described TEM image, the respective particle diameters were measured (N=500), and an average value was taken as an average particle diameter $D_C$ of the catalytic materials. The results are shown in Tables 11-1 to 18-2.

In addition, in order to check the average particle diameter and dispersed state of the catalytic material, an analysis was performed using SAXS (small angle X-ray scattering). Measurement by SAXS was performed using beam line BL19B2 of Spring-8. The obtained SAXS data was subjected to fitting according to a spherical model by the Guinier approximation method, and the particle diameter was calculated. The particle diameter was measured for a catalyst structure where the metal is the Ni fine particle. In addition, as a comparison object, iron fine particles (made by Wako) of a commercial product were observed and measured with SEM.

As a result, in the commercial product, iron fine particles having various sizes exist at random in a range of particle diameters of approximately 50 nm to 400 nm, but on the other hand, in the catalyst structure of each of the Examples having an average particle diameter of 1.2 nm to 2.0 nm determined from the TEM images, a scattering peak was detected for the particle diameters of 10 nm or less also in the SAXS measurement result. From the measurement results of SAXS and the measurement results of the cross sections by SEM/EDX, it was found that the catalytic materials having particle diameters of 10 nm or less exist in a uniform and very highly dispersed state in the inside of the carrier.

[C-2] Relationship Between Addition Amount of Metal-Containing Solution and Amount of Metal Included in Inside of Carrier Catalyst structures including the metal fine particles in the insides of the carriers were prepared with the addition amount of atomic ratios being Si/M=50, 100, 200 and 1000 (M=Ru, Ni, Ir and Rh) and then amounts (mass %) of the metals included in the insides of the carriers of the catalyst structures prepared in the above described addition amounts were measured. In the present measurement, the catalyst structures having atomic ratios Si/M=100, 200 and 1000 were prepared by adjusting the addition amount of the metal-containing solution in a similar method to that of the catalyst structures having atomic ratios Si/M=100, 200 and 1000 in Examples 385 to 768, respectively, and the catalyst structure having an atomic ratio Si/M=50 was prepared in a similar method to that of the catalyst structures having atomic ratios Si/M=100, 200 and 1000, except that the addition amount of the metal-containing solution was made to be different.

The amount of metal was quantified by ICP (High Frequency Inductively Coupled Plasma) alone or by a combination of ICP and XRF (fluorescent X-ray analysis). The XRF (Energy Dispersive X-ray Fluorescence Analyzer "SEA 1200 VX", made by S.S.I. Nano Technology Inc.) was performed in a vacuum atmosphere on such a condition that an accelerating voltage was 15 kV (using Cr filter) or an accelerating voltage was 50 kV (using Pb filter).

The XRF is a method of calculating the abundance of metal by fluorescence intensity, and it is not possible to calculate a quantitative value (in terms of mass %) by the XRF alone. Then, the amount of metal in the catalyst structure whereto metal is added at a ratio of Si/M=100 was quantified by ICP analysis, and the amount of metal in the catalyst structure whereto metal is added at a ratio of Si/M=50 and less than 100 was determined on the basis of the XRF measurement result and the ICP measurement result.

As a result, it was confirmed that the amount of the metal included in the catalyst structure has increased along an increase of the addition amount of the metal-containing solution, at least within such a range that the atomic ratio Si/M is 50 to 1000.

[D-2] Performance Evaluation

Concerning the catalyst structures of Examples 385 to 768 and the silicalite of Comparative Examples 1 and 2, the catalytic ability of the catalytic material was evaluated under the following conditions. The results are shown in Tables 11-1 to 18-2.

(1-2) Catalytic Activity

The catalytic activity was evaluated under the following conditions.

Firstly, 0.2 g of the catalyst structure was filled in a normal pressure flow type reaction apparatus, using steam as a carrier gas (5 ml/min), kerosene according to JIS No. 1 was used as a reforming feedstock, and a steam reforming reaction was performed at 580° C. for 2 hours.

After the reaction has finished, the collected produced gas was subjected to a component analysis by gas chromatography-mass spectrometry (GC/MS). TRACE 1310 GC (made by Thermo Fisher Scientific Co., Ltd., detector: thermal conductivity detector) was used as an analysis apparatus for the produced gas.

On the basis of the results of the above described component analysis, the conversion ratio (%) to C1 (CO, $CO_2$ and $CH_4$) was calculated. The C1 conversion ratio was determined by the calculation according to the following expression (1).

$$C1 \text{ conversion ratio } (\%) = (A/B) \times 100 \quad (1)$$

In the above described expression (1), A represents the total value of the molar flow rate of CO, the molar flow rate of $CO_2$ and the molar flow rate of $CH_4$, at an outlet of the reaction vessel and B represents a molar flow rate of carbon in the kerosene at an inlet side of the reaction vessel.

In the present example, the Example was determined to be excellent in the catalytic activity when the C1 conversion ratio was 40% or more, and expressed as "Excellent", the Example was determined to have good catalytic activity when the C1 conversion ratio was 30% or more and less than 40%, and expressed as "Good", the Example was determined not to have good catalytic activity but to have catalytic activity in a passing level (acceptable) when the C1 conversion ratio was 20% or more and less than 30%, and expressed by "Fair", and the Example was determined to be inferior (unacceptable) in the catalytic activity when the C1 conversion ratio was less than 20%, and expressed as "Poor".

(2-2) Durability (Life)

Durability was evaluated under the following conditions.

Firstly, the catalyst structure used in the above described evaluation (1-2) was collected, and was heated at 650° C. for 12 hours, and a catalyst structure after heating was prepared. Thereafter, using the obtained catalyst structure after heating, the steam reforming reaction of kerosene according to JIS No. 1 determined to be a reforming feedstock was performed according to a method similar to that in the above described evaluation (1-2), and a component analysis of a produced gas was performed with a method similar to that in the above described evaluation (1-2).

The C1 conversion ratio (%) was determined according to a method similar to that in the above described evaluation (1-2), on the basis of the obtained analysis results. Furthermore, it was compared how much the C1 conversion ratio caused by the catalyst structure after heating was kept as compared to the C1 conversion ratio caused by the catalyst structure before heating (C1 conversion ratio determined in above described evaluation (1-2)). Specifically, a percentage (%) of the C1 conversion ratio caused by the above described catalyst structure after heating (C1 conversion ratio determined by present evaluation (2-2)) with respect to the C1 conversion ratio caused by the catalyst structure before heating (C1 conversion ratio determined in above described evaluation (1-2)) was calculated.

In the present example, the Example was determined to be excellent in durability (heat resistance) when the C1 conversion ratio by the catalyst structure after heating (C1 conversion ratio determined in present evaluation (2-2)) was kept at 80% or more as compared to the C1 conversion ratio by the catalyst structure before heating (C1 conversion ratio determined in above described evaluation (1-2)), and expressed as "Excellent", the Example was determined to be good in durability (heat resistance) when the C1 conversion ratio was kept at 60% or more and less than 80%, and expressed as "Good", the Example was determined not to have good durability (heat resistance) but to have durability in a passing level (acceptable) when the C1 conversion ratio was kept at 40% or more and less than 60%, and expressed as "Fair", and the Example was determined to be inferior (unacceptable) in durability (heat resistance) when the C1 conversion ratio decreased to less than 40%, and expressed as "Poor".

For Comparative Examples 1 and 2, performance evaluations similar to the above described evaluations (1-2) and (2-2) were also performed. The results are shown in Tables 18-1 and 18-2.

TABLE 11-2

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 385 | MCM-41 | 1.3 | Present | 1000 | TEABr | 12 | 120 |
| Example 386 | | | | 500 | | | |
| Example 387 | | | | 200 | | | |
| Example 388 | | | | 100 | | | |
| Example 389 | | 2.0 | | | | | |
| Example 390 | | 2.4 | | | | | |
| Example 391 | | 2.6 | | | | | |
| Example 392 | | 3.3 | | | | | |
| Example 393 | | 6.6 | | | | | |
| Example 394 | SBA-1 | 13.2 | | | | | |
| Example 395 | | 19.8 | | | | | |
| Example 396 | | 26.4 | | | | | |
| Example 397 | MCM-41 | 1.3 | Absent | 1000 | | | |
| Example 398 | | | | 500 | | | |
| Example 399 | | | | 200 | | | |
| Example 400 | | | | 100 | | | |
| Example 401 | | 2.0 | | | | | |
| Example 402 | | 2.4 | | | | | |
| Example 403 | | 2.6 | | | | | |
| Example 404 | | 3.3 | | | | | |
| Example 405 | | 6.6 | | | | | |
| Example 406 | SBA-1 | 13.2 | | | | | |
| Example 407 | | 19.8 | | | | | |
| Example 408 | | 26.4 | | | | | |

| | Catalyst structure | | | | | Performance evaluation | |
|---|---|---|---|---|---|---|---|
| | Carrier Zeolite type compound | | Catalytic material Metal fine particle | | | | |
| No. | Framework Structure | Average inner diameter of channel $D_F$ (nm) | Type | Average particle diameter $D_C$ (nm) | $D_C/D_F$ | Catalytic activity | Durability |
| Example 385 | FAU | 0.74 | Ru | 0.11 | 0.1 | Fair | Fair |
| Example 386 | | | | 0.32 | 0.4 | Fair | Fair |
| Example 387 | | | | 0.53 | 0.7 | Good | Fair |
| Example 388 | | | | 1.06 | 1.4 | Excellent | Good |
| Example 389 | | | | 1.59 | 2.1 | Excellent | Good |
| Example 390 | | | | 1.90 | 2.6 | Excellent | Excellent |
| Example 391 | | | | 2.11 | 2.9 | Excellent | Excellent |
| Example 392 | | | | 2.64 | 3.6 | Excellent | Excellent |
| Example 393 | | | | 5.29 | 7.1 | Good | Excellent |
| Example 394 | | | | 10.57 | 14.3 | Good | Excellent |
| Example 395 | | | | 15.86 | 21.4 | Fair | Excellent |
| Example 396 | | | | 21.14 | 28.6 | Fair | Excellent |
| Example 397 | | | | 0.11 | 0.1 | Fair | Fair |
| Example 398 | | | | 0.32 | 0.4 | Fair | Fair |
| Example 399 | | | | 0.53 | 0.7 | Good | Fair |
| Example 400 | | | | 1.06 | 1.4 | Excellent | Good |
| Example 401 | | | | 1.59 | 2.1 | Excellent | Good |
| Example 402 | | | | 1.90 | 2.6 | Good | Excellent |
| Example 403 | | | | 2.11 | 2.9 | Good | Excellent |
| Example 404 | | | | 2.64 | 3.6 | Good | Excellent |
| Example 405 | | | | 5.29 | 7.1 | Fair | Excellent |
| Example 406 | | | | 10.57 | 14.3 | Fair | Excellent |
| Example 407 | | | | 15.86 | 21.4 | Fair | Excellent |
| Example 408 | | | | 21.14 | 28.6 | Fair | Excellent |

TABLE 11-2

| | Precursor material (A) | | Addition to precursor material (A) Conversion ratio of amount of added metal-containing solution (atomic ratio) Si/M | Hydrothermal treatment condition using precursor material (C) | | |
|---|---|---|---|---|---|---|
| No. | Type | Pore diameter (nm) | Presence or absence of additive | | Type of structure directing agent | pH | Time period (h) |
| Example 409 | MCM-41 | 1.1 | Present | 1000 | TEABr | 11 | 72 |
| Example 410 | | | | 500 | | | |
| Example 411 | | | | 200 | | | |
| Example 412 | | | | 100 | | | |
| Example 413 | | 1.6 | | | | | |
| Example 414 | | 2.0 | | | | | |
| Example 415 | | 2.2 | | | | | |
| Example 416 | | 2.7 | | | | | |
| Example 417 | | 5.4 | | | | | |
| Example 418 | SBA-1 | 10.9 | | | | | |
| Example 419 | | 16.3 | | | | | |
| Example 420 | | 21.8 | | | | | |
| Example 421 | MCM-41 | 1.1 | Absent | 1000 | | | |
| Example 422 | | | | 500 | | | |
| Example 423 | | | | 200 | | | |
| Example 424 | | | | 100 | | | |
| Example 425 | | 1.6 | | | | | |
| Example 426 | | 2.0 | | | | | |
| Example 427 | | 2.2 | | | | | |
| Example 428 | | 2.7 | | | | | |
| Example 429 | | 5.4 | | | | | |
| Example 430 | SBA-1 | 10.9 | | | | | |
| Example 431 | | 16.3 | | | | | |
| Example 432 | | 21.8 | | | | | |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 409 | MTW | 0.61 | Ru | 0.09 | 0.1 | Fair | Fair |
| Example 410 | | | | 0.26 | 0.4 | Fair | Fair |
| Example 411 | | | | 0.44 | 0.7 | Good | Fair |
| Example 412 | | | | 0.87 | 1.4 | Excellent | Good |
| Example 413 | | | | 1.31 | 2.1 | Excellent | Good |
| Example 414 | | | | 1.57 | 2.6 | Excellent | Good |
| Example 415 | | | | 1.74 | 2.9 | Excellent | Excellent |
| Example 416 | | | | 2.18 | 3.6 | Excellent | Excellent |
| Example 417 | | | | 4.36 | 7.1 | Good | Excellent |
| Example 418 | | | | 8.71 | 14.3 | Good | Excellent |
| Example 419 | | | | 13.07 | 21.4 | Fair | Excellent |
| Example 420 | | | | 17.43 | 28.6 | Fair | Excellent |
| Example 421 | | | | 0.09 | 0.1 | Fair | Fair |
| Example 422 | | | | 0.26 | 0.4 | Fair | Fair |
| Example 423 | | | | 0.44 | 0.7 | Good | Fair |
| Example 424 | | | | 0.87 | 1.4 | Excellent | Good |
| Example 425 | | | | 1.31 | 2.1 | Excellent | Good |
| Example 426 | | | | 1.57 | 2.6 | Excellent | Good |
| Example 427 | | | | 1.74 | 2.9 | Good | Excellent |
| Example 428 | | | | 2.18 | 3.6 | Good | Excellent |
| Example 429 | | | | 4.36 | 7.1 | Fair | Excellent |
| Example 430 | | | | 8.71 | 14.3 | Fair | Excellent |
| Example 431 | | | | 13.07 | 21.4 | Fair | Excellent |
| Example 432 | | | | 17.43 | 28.6 | Fair | Excellent |

TABLE 21-1

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 433 | MCM-41 | 1.0 | Present | 1000 | TPABr | 12 | 72 |
| Example 434 | | | | 500 | | | |
| Example 435 | | | | 200 | | | |
| Example 436 | | | | 100 | | | |
| Example 437 | | 1.5 | | | | | |
| Example 438 | | 1.8 | | | | | |
| Example 439 | | 2.0 | | | | | |
| Example 440 | | 2.5 | | | | | |
| Example 441 | | 5.0 | | | | | |
| Example 442 | SBA-1 | 10.0 | | | | | |
| Example 443 | | 15.0 | | | | | |
| Example 444 | | 20.0 | | | | | |
| Example 445 | MCM-41 | 1.0 | Absent | 1000 | | | |
| Example 446 | | | | 500 | | | |
| Example 447 | | | | 200 | | | |
| Example 448 | | | | 100 | | | |
| Example 449 | | 1.5 | | | | | |
| Example 450 | | 1.8 | | | | | |
| Example 451 | | 2.0 | | | | | |
| Example 452 | | 2.5 | | | | | |
| Example 453 | | 5.0 | | | | | |
| Example 454 | SBA-1 | 10.0 | | | | | |
| Example 455 | | 15.0 | | | | | |
| Example 456 | | 20.0 | | | | | |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 433 | MFI | 0.56 | Ru | 0.08 | 0.1 | Fair | Fair |
| Example 434 | | | | 0.24 | 0.4 | Fair | Fair |
| Example 435 | | | | 0.40 | 0.7 | Good | Fair |
| Example 436 | | | | 0.80 | 1.4 | Excellent | Good |
| Example 437 | | | | 1.20 | 2.1 | Excellent | Good |
| Example 438 | | | | 1.44 | 2.6 | Excellent | Excellent |
| Example 439 | | | | 1.60 | 2.9 | Excellent | Excellent |
| Example 440 | | | | 2.00 | 3.6 | Excellent | Excellent |
| Example 441 | | | | 4.00 | 7.1 | Good | Excellent |
| Example 442 | | | | 8.00 | 14.3 | Good | Excellent |
| Example 443 | | | | 12.00 | 21.4 | Fair | Excellent |
| Example 444 | | | | 16.00 | 28.6 | Fair | Excellent |
| Example 445 | | | | 0.08 | 0.1 | Fair | Fair |
| Example 446 | | | | 0.24 | 0.4 | Fair | Fair |
| Example 447 | | | | 0.40 | 0.7 | Good | Fair |
| Example 448 | | | | 0.80 | 1.4 | Excellent | Good |
| Example 449 | | | | 1.20 | 2.1 | Excellent | Good |
| Example 450 | | | | 1.44 | 2.6 | Good | Excellent |
| Example 451 | | | | 1.60 | 2.9 | Good | Excellent |
| Example 452 | | | | 2.00 | 3.6 | Good | Excellent |
| Example 453 | | | | 4.00 | 7.1 | Fair | Excellent |
| Example 454 | | | | 8.00 | 14.3 | Fair | Excellent |
| Example 455 | | | | 12.00 | 21.4 | Fair | Excellent |
| Example 456 | | | | 16.00 | 28.6 | Fair | Excellent |

TABLE 12-2

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 457 | MCM-41 | 1.0 | Present | 1000 | TMABr | 12 | 120 |
| Example 458 | | | | 500 | | | |
| Example 459 | | | | 200 | | | |
| Example 460 | | | | 100 | | | |
| Example 461 | | 1.5 | | | | | |
| Example 462 | | 1.8 | | | | | |
| Example 463 | | 2.0 | | | | | |
| Example 464 | | 2.5 | | | | | |
| Example 465 | | 5.1 | | | | | |
| Example 466 | SBA-1 | 10.2 | | | | | |
| Example 467 | | 15.3 | | | | | |
| Example 468 | | 20.4 | | | | | |
| Example 469 | MCM-41 | 1.0 | Absent | 1000 | | | |
| Example 470 | | | | 500 | | | |
| Example 471 | | | | 200 | | | |
| Example 472 | | | | 100 | | | |
| Example 473 | | 1.5 | | | | | |
| Example 474 | | 1.8 | | | | | |
| Example 475 | | 2.0 | | | | | |
| Example 476 | | 2.5 | | | | | |
| Example 477 | | 5.1 | | | | | |
| Example 478 | SBA-1 | 10.2 | | | | | |
| Example 479 | | 15.3 | | | | | |
| Example 480 | | 20.4 | | | | | |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 457 | FER | 0.57 | Ru | 0.08 | 0.1 | Fair | Fair |
| Example 458 | | | | 0.24 | 0.4 | Fair | Fair |
| Example 459 | | | | 0.41 | 0.7 | Good | Fair |
| Example 460 | | | | 0.81 | 1.4 | Excellent | Good |
| Example 461 | | | | 1.22 | 2.1 | Excellent | Good |
| Example 462 | | | | 1.47 | 2.6 | Excellent | Good |
| Example 463 | | | | 1.63 | 2.9 | Excellent | Excellent |
| Example 464 | | | | 2.04 | 3.6 | Excellent | Excellent |
| Example 465 | | | | 4.07 | 7.1 | Good | Excellent |
| Example 466 | | | | 8.14 | 14.3 | Good | Excellent |
| Example 467 | | | | 12.21 | 21.4 | Fair | Excellent |
| Example 468 | | | | 16.29 | 28.6 | Fair | Excellent |
| Example 469 | | | | 0.08 | 0.1 | Fair | Fair |
| Example 470 | | | | 0.24 | 0.4 | Fair | Fair |
| Example 471 | | | | 0.41 | 0.7 | Good | Fair |
| Example 472 | | | | 0.81 | 1.4 | Excellent | Good |
| Example 473 | | | | 1.22 | 2.1 | Excellent | Good |
| Example 474 | | | | 1.47 | 2.6 | Excellent | Good |
| Example 475 | | | | 1.63 | 2.9 | Good | Excellent |
| Example 476 | | | | 2.04 | 3.6 | Good | Excellent |
| Example 477 | | | | 4.07 | 7.1 | Fair | Excellent |
| Example 478 | | | | 8.14 | 14.3 | Fair | Excellent |
| Example 479 | | | | 12.21 | 21.4 | Fair | Excellent |
| Example 480 | | | | 16.29 | 28.6 | Fair | Excellent |

TABLE 13-1

| No. | Precursor material (A) Type | Pore diameter (nm) | Presence or absence of additive | Conversion ratio of amount of added metal-containing solution (atomic ratio) Si/M | Type of structure directing agent | pH | Time period (h) |
|---|---|---|---|---|---|---|---|
| Example 481 | MCM-41 | 1.3 | Present | 1000 | TEABr | 12 | 120 |
| Example 482 | | | | 500 | | | |
| Example 483 | | | | 200 | | | |
| Example 484 | | | | 100 | | | |
| Example 485 | | 2.0 | | | | | |
| Example 486 | | 2.4 | | | | | |
| Example 487 | | 2.6 | | | | | |
| Example 488 | | 3.3 | | | | | |
| Example 489 | | 6.6 | | | | | |
| Example 490 | SBA-1 | 13.2 | | | | | |
| Example 491 | | 19.8 | | | | | |
| Example 492 | | 26.4 | | | | | |
| Example 493 | MCM-41 | 1.3 | Absent | 1000 | | | |
| Example 494 | | | | 500 | | | |
| Example 495 | | | | 200 | | | |
| Example 496 | | | | 100 | | | |
| Example 497 | | 2.0 | | | | | |
| Example 498 | | 2.4 | | | | | |
| Example 499 | | 2.6 | | | | | |
| Example 500 | | 3.3 | | | | | |
| Example 501 | | 6.6 | | | | | |
| Example 502 | SBA-1 | 13.2 | | | | | |
| Example 503 | | 19.8 | | | | | |
| Example 504 | | 26.4 | | | | | |

| No. | Carrier Zeolite type compound Framework Structure | Average inner diameter of channel $D_F$ (nm) | Catalytic material Metal fine particle Type | Average particle diameter $D_C$ (nm) | $D_C/D_F$ | Performance evaluation Catalytic activity | Durability |
|---|---|---|---|---|---|---|---|
| Example 481 | FAU | 0.74 | Ni | 0.11 | 0.1 | Fair | Fair |
| Example 482 | | | | 0.32 | 0.4 | Fair | Fair |
| Example 483 | | | | 0.53 | 0.7 | Good | Fair |
| Example 484 | | | | 1.06 | 1.4 | Excellent | Good |
| Example 485 | | | | 1.59 | 2.1 | Excellent | Good |
| Example 486 | | | | 1.90 | 2.6 | Excellent | Excellent |
| Example 487 | | | | 2.11 | 2.9 | Excellent | Excellent |
| Example 488 | | | | 2.64 | 3.6 | Excellent | Excellent |
| Example 489 | | | | 5.29 | 7.1 | Good | Excellent |
| Example 490 | | | | 10.57 | 14.3 | Good | Excellent |
| Example 491 | | | | 15.86 | 21.4 | Fair | Excellent |
| Example 492 | | | | 21.14 | 28.6 | Fair | Excellent |
| Example 493 | | | | 0.11 | 0.1 | Fair | Fair |
| Example 494 | | | | 0.32 | 0.4 | Fair | Fair |
| Example 495 | | | | 0.53 | 0.7 | Good | Fair |
| Example 496 | | | | 1.06 | 1.4 | Excellent | Good |
| Example 497 | | | | 1.59 | 2.1 | Excellent | Good |
| Example 498 | | | | 1.90 | 2.6 | Good | Excellent |
| Example 499 | | | | 2.11 | 2.9 | Good | Excellent |
| Example 500 | | | | 2.64 | 3.6 | Good | Excellent |
| Example 501 | | | | 5.29 | 7.1 | Fair | Excellent |
| Example 502 | | | | 10.57 | 14.3 | Fair | Excellent |
| Example 503 | | | | 15.86 | 21.4 | Fair | Excellent |
| Example 504 | | | | 21.14 | 28.6 | Fair | Excellent |

TABLE 13-2

| | | | | Production conditions of catalyst structure | | | |
|---|---|---|---|---|---|---|---|
| | | | | Addition to precursor material (A) | Hydrothermal treatment condition using precursor material (C) | | |
| | Precursor material (A) | | | Conversion ratio of amount of added | Type of | | |
| No. | Type | Pore diameter (nm) | Presence or absence of additive | metal-containing solution (atomic ratio) Si/M | structure directing agent | pH | Time period (h) |
| Example 505 | MCM-41 | 1.1 | Present | 1000 | TEABr | 11 | 72 |
| Example 506 | | | | 500 | | | |
| Example 507 | | | | 200 | | | |
| Example 508 | | | | 100 | | | |
| Example 509 | | 1.6 | | | | | |
| Example 510 | | 2.0 | | | | | |
| Example 511 | | 2.2 | | | | | |
| Example 512 | | 2.7 | | | | | |
| Example 513 | | 5.4 | | | | | |
| Example 514 | SBA-1 | 10.9 | | | | | |
| Example 515 | | 16.3 | | | | | |
| Example 516 | | 21.8 | | | | | |
| Example 517 | MCM-41 | 1.1 | Absent | 1000 | | | |
| Example 518 | | | | 500 | | | |
| Example 519 | | | | 200 | | | |
| Example 520 | | | | 100 | | | |
| Example 521 | | 1.6 | | | | | |
| Example 522 | | 2.0 | | | | | |
| Example 523 | | 2.2 | | | | | |
| Example 524 | | 2.7 | | | | | |
| Example 525 | | 5.4 | | | | | |
| Example 526 | SBA-1 | 10.9 | | | | | |
| Example 527 | | 16.3 | | | | | |
| Example 528 | | 21.8 | | | | | |

| | Catalyst structure | | | | | | |
|---|---|---|---|---|---|---|---|
| | Carrier Zeolite type compound | | Catalytic material Metal fine particle | | | | |
| | | Average inner diameter | | Average particle | | Performance evaluation | |
| No. | Framework Structure | of channel $D_F$ (nm) | Type | diameter $D_C$ (nm) | $D_C/D_F$ | Catalytic activity | Durability |
| Example 505 | MTW | 0.61 | Ni | 0.09 | 0.1 | Fair | Fair |
| Example 506 | | | | 0.26 | 0.4 | Fair | Fair |
| Example 507 | | | | 0.44 | 0.7 | Good | Fair |
| Example 508 | | | | 0.87 | 1.4 | Excellent | Good |
| Example 509 | | | | 1.31 | 2.1 | Excellent | Good |
| Example 510 | | | | 1.57 | 2.6 | Excellent | Good |
| Example 511 | | | | 1.74 | 2.9 | Excellent | Excellent |
| Example 512 | | | | 2.18 | 3.6 | Excellent | Excellent |
| Example 513 | | | | 4.36 | 7.1 | Good | Excellent |
| Example 514 | | | | 8.71 | 14.3 | Good | Excellent |
| Example 515 | | | | 13.07 | 21.4 | Fair | Excellent |
| Example 516 | | | | 17.43 | 28.6 | Fair | Excellent |
| Example 517 | | | | 0.09 | 0.1 | Fair | Fair |
| Example 518 | | | | 0.26 | 0.4 | Fair | Fair |
| Example 519 | | | | 0.44 | 0.7 | Good | Fair |
| Example 520 | | | | 0.87 | 1.4 | Excellent | Good |
| Example 521 | | | | 1.31 | 2.1 | Excellent | Good |
| Example 522 | | | | 1.57 | 2.6 | Excellent | Good |
| Example 523 | | | | 1.74 | 2.9 | Good | Excellent |
| Example 524 | | | | 2.18 | 3.6 | Good | Excellent |
| Example 525 | | | | 4.36 | 7.1 | Fair | Excellent |
| Example 526 | | | | 8.71 | 14.3 | Fair | Excellent |
| Example 527 | | | | 13.07 | 21.4 | Fair | Excellent |
| Example 528 | | | | 17.43 | 28.6 | Fair | Excellent |

TABLE 14-1

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| | | | | Conversion ratio of amount of added | Type of | | |
| No. | Type | Pore diameter (nm) | Presence or absence of additive | metal-containing solution (atomic ratio) Si/M | structure directing agent | pH | Time period (h) |
| Example 529 | MCM-41 | 1.0 | Present | 1000 | TPABr | 12 | 72 |
| Example 530 | | | | 500 | | | |
| Example 531 | | | | 200 | | | |
| Example 532 | | | | 100 | | | |
| Example 533 | | 1.5 | | | | | |
| Example 534 | | 1.8 | | | | | |
| Example 535 | | 2.0 | | | | | |
| Example 536 | | 2.5 | | | | | |
| Example 537 | | 5.0 | | | | | |
| Example 538 | SBA-1 | 10.0 | | | | | |
| Example 539 | | 15.0 | | | | | |
| Example 540 | | 20.0 | | | | | |
| Example 541 | MCM-41 | 1.0 | Absent | 1000 | | | |
| Example 542 | | | | 500 | | | |
| Example 543 | | | | 200 | | | |
| Example 544 | | | | 100 | | | |
| Example 545 | | 1.5 | | | | | |
| Example 546 | | 1.8 | | | | | |
| Example 547 | | 2.0 | | | | | |
| Example 548 | | 2.5 | | | | | |
| Example 549 | | 5.0 | | | | | |
| Example 550 | SBA-1 | 10.0 | | | | | |
| Example 551 | | 15.0 | | | | | |
| Example 552 | | 20.0 | | | | | |

| | Catalyst structure | | | | | Performance evaluation | |
|---|---|---|---|---|---|---|---|
| | Carrier Zeolite type compound | | Catalytic material Metal fine particle | | | | |
| No. | Framework Structure | Average inner diameter of channel $D_F$ (nm) | Type | Average particle diameter $D_C$ (nm) | $D_C/D_F$ | Catalytic activity | Durability |
| Example 529 | MFI | 0.56 | Ni | 0.08 | 0.1 | Fair | Fair |
| Example 530 | | | | 0.24 | 0.4 | Fair | Fair |
| Example 531 | | | | 0.40 | 0.7 | Good | Fair |
| Example 532 | | | | 0.80 | 1.4 | Excellent | Good |
| Example 533 | | | | 1.20 | 2.1 | Excellent | Good |
| Example 534 | | | | 1.44 | 2.6 | Excellent | Excellent |
| Example 535 | | | | 1.60 | 2.9 | Excellent | Excellent |
| Example 536 | | | | 2.00 | 3.6 | Excellent | Excellent |
| Example 537 | | | | 4.00 | 7.1 | Good | Excellent |
| Example 538 | | | | 8.00 | 14.3 | Good | Excellent |
| Example 539 | | | | 12.00 | 21.4 | Fair | Excellent |
| Example 540 | | | | 16.00 | 28.6 | Fair | Excellent |
| Example 541 | | | | 0.08 | 0.1 | Fair | Fair |
| Example 542 | | | | 0.24 | 0.4 | Fair | Fair |
| Example 543 | | | | 0.40 | 0.7 | Good | Fair |
| Example 544 | | | | 0.80 | 1.4 | Excellent | Good |
| Example 545 | | | | 1.20 | 2.1 | Excellent | Good |
| Example 546 | | | | 1.44 | 2.6 | Good | Excellent |
| Example 547 | | | | 1.60 | 2.9 | Good | Excellent |
| Example 548 | | | | 2.00 | 3.6 | Good | Excellent |
| Example 549 | | | | 4.00 | 7.1 | Fair | Excellent |
| Example 550 | | | | 8.00 | 14.3 | Fair | Excellent |
| Example 551 | | | | 12.00 | 21.4 | Fair | Excellent |
| Example 552 | | | | 16.00 | 28.6 | Fair | Excellent |

TABLE 14-2

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 553 | MCM-41 | 1.0 | Present | 1000 | TMABr | 12 | 120 |
| Example 554 | | | | 500 | | | |
| Example 555 | | | | 200 | | | |
| Example 556 | | | | 100 | | | |
| Example 557 | | 1.5 | | | | | |
| Example 558 | | 1.8 | | | | | |
| Example 559 | | 2.0 | | | | | |
| Example 560 | | 2.5 | | | | | |
| Example 561 | | 5.1 | | | | | |
| Example 562 | SBA-1 | 10.2 | | | | | |
| Example 563 | | 15.3 | | | | | |
| Example 564 | | 20.4 | | | | | |
| Example 565 | MCM-41 | 1.0 | Absent | 1000 | | | |
| Example 566 | | | | 500 | | | |
| Example 567 | | | | 200 | | | |
| Example 568 | | | | 100 | | | |
| Example 569 | | 1.5 | | | | | |
| Example 570 | | 1.8 | | | | | |
| Example 571 | | 2.0 | | | | | |
| Example 572 | | 2.5 | | | | | |
| Example 573 | | 5.1 | | | | | |
| Example 574 | SBA-1 | 10.2 | | | | | |
| Example 575 | | 15.3 | | | | | |
| Example 576 | | 20.4 | | | | | |

| | Catalyst structure | | | | | Performance evaluation | |
|---|---|---|---|---|---|---|---|
| | Carrier Zeolite type compound | | Catalytic material Metal fine particle | | | | |
| No. | Framework Structure | Average inner diameter of channel $D_F$ (nm) | Type | Average particle diameter $D_C$ (nm) | $D_C/D_F$ | Catalytic activity | Durability |
| Example 553 | FER | 0.57 | Ni | 0.08 | 0.1 | Fair | Fair |
| Example 554 | | | | 0.24 | 0.4 | Fair | Fair |
| Example 555 | | | | 0.41 | 0.7 | Good | Fair |
| Example 556 | | | | 0.81 | 1.4 | Excellent | Good |
| Example 557 | | | | 1.22 | 2.1 | Excellent | Good |
| Example 558 | | | | 1.47 | 2.6 | Excellent | Good |
| Example 559 | | | | 1.63 | 2.9 | Excellent | Excellent |
| Example 560 | | | | 2.04 | 3.6 | Excellent | Excellent |
| Example 561 | | | | 4.07 | 7.1 | Good | Excellent |
| Example 562 | | | | 8.14 | 14.3 | Good | Excellent |
| Example 563 | | | | 12.21 | 21.4 | Fair | Excellent |
| Example 564 | | | | 16.29 | 28.6 | Fair | Excellent |
| Example 565 | | | | 0.08 | 0.1 | Fair | Fair |
| Example 566 | | | | 0.24 | 0.4 | Fair | Fair |
| Example 567 | | | | 0.41 | 0.7 | Good | Fair |
| Example 568 | | | | 0.81 | 1.4 | Excellent | Good |
| Example 569 | | | | 1.22 | 2.1 | Excellent | Good |
| Example 570 | | | | 1.47 | 2.6 | Excellent | Good |
| Example 571 | | | | 1.63 | 2.9 | Good | Excellent |
| Example 572 | | | | 2.04 | 3.6 | Good | Excellent |
| Example 573 | | | | 4.07 | 7.1 | Fair | Excellent |
| Example 574 | | | | 8.14 | 14.3 | Fair | Excellent |
| Example 575 | | | | 12.21 | 21.4 | Fair | Excellent |
| Example 576 | | | | 16.29 | 28.6 | Fair | Excellent |

TABLE 15-1

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 577 | MCM-41 | 1.3 | Present | 1000 | TEABr | 12 | 120 |
| Example 578 | | | | 500 | | | |
| Example 579 | | | | 200 | | | |
| Example 580 | | | | 100 | | | |
| Example 581 | | 2.0 | | | | | |
| Example 582 | | 2.4 | | | | | |
| Example 583 | | 2.6 | | | | | |
| Example 584 | | 3.3 | | | | | |
| Example 585 | | 6.6 | | | | | |
| Example 586 | SBA-1 | 13.2 | | | | | |
| Example 587 | | 19.8 | | | | | |
| Example 588 | | 26.4 | | | | | |
| Example 589 | MCM-41 | 1.3 | Absent | 1000 | | | |
| Example 590 | | | | 500 | | | |
| Example 591 | | | | 200 | | | |
| Example 592 | | | | 100 | | | |
| Example 593 | | 2.0 | | | | | |
| Example 594 | | 2.4 | | | | | |
| Example 595 | | 2.6 | | | | | |
| Example 596 | | 3.3 | | | | | |
| Example 597 | | 6.6 | | | | | |
| Example 598 | SBA-1 | 13.2 | | | | | |
| Example 599 | | 19.8 | | | | | |
| Example 600 | | 26.4 | | | | | |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 577 | FAU | 0.74 | Ir | 0.11 | 0.1 | Fair | Fair |
| Example 578 | | | | 0.32 | 0.4 | Fair | Fair |
| Example 579 | | | | 0.53 | 0.7 | Good | Fair |
| Example 580 | | | | 1.06 | 1.4 | Excellent | Good |
| Example 581 | | | | 1.59 | 2.1 | Excellent | Good |
| Example 582 | | | | 1.90 | 2.6 | Excellent | Excellent |
| Example 583 | | | | 2.11 | 2.9 | Excellent | Excellent |
| Example 584 | | | | 2.64 | 3.6 | Excellent | Excellent |
| Example 585 | | | | 5.29 | 7.1 | Good | Excellent |
| Example 586 | | | | 10.57 | 14.3 | Good | Excellent |
| Example 587 | | | | 15.86 | 21.4 | Fair | Excellent |
| Example 588 | | | | 21.14 | 28.6 | Fair | Excellent |
| Example 589 | | | | 0.11 | 0.1 | Fair | Fair |
| Example 590 | | | | 0.32 | 0.4 | Fair | Fair |
| Example 591 | | | | 0.53 | 0.7 | Good | Fair |
| Example 592 | | | | 1.06 | 1.4 | Excellent | Good |
| Example 593 | | | | 1.59 | 2.1 | Excellent | Good |
| Example 594 | | | | 1.90 | 2.6 | Good | Excellent |
| Example 595 | | | | 2.11 | 2.9 | Good | Excellent |
| Example 596 | | | | 2.64 | 3.6 | Good | Excellent |
| Example 597 | | | | 5.29 | 7.1 | Fair | Excellent |
| Example 598 | | | | 10.57 | 14.3 | Fair | Excellent |
| Example 599 | | | | 15.86 | 21.4 | Fair | Excellent |
| Example 600 | | | | 21.14 | 28.6 | Fair | Excellent |

TABLE 15-2

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 601 | MCM-41 | 1.1 | Present | 1000 | TEABr | 11 | 72 |
| Example 602 | | | | 500 | | | |
| Example 603 | | | | 200 | | | |
| Example 604 | | | | 100 | | | |
| Example 605 | | 1.6 | | | | | |
| Example 606 | | 2.0 | | | | | |
| Example 607 | | 2.2 | | | | | |
| Example 608 | | 2.7 | | | | | |
| Example 609 | | 5.4 | | | | | |
| Example 610 | SBA-1 | 10.9 | | | | | |
| Example 611 | | 16.3 | | | | | |
| Example 612 | | 21.8 | | | | | |
| Example 613 | MCM-41 | 1.1 | Absent | 1000 | | | |
| Example 614 | | | | 500 | | | |
| Example 615 | | | | 200 | | | |
| Example 616 | | | | 100 | | | |
| Example 617 | | 1.6 | | | | | |
| Example 618 | | 2.0 | | | | | |
| Example 619 | | 2.2 | | | | | |
| Example 620 | | 2.7 | | | | | |
| Example 621 | | 5.4 | | | | | |
| Example 622 | SBA-1 | 10.9 | | | | | |
| Example 623 | | 16.3 | | | | | |
| Example 624 | | 21.8 | | | | | |

| | Catalyst structure | | | | | Performance evaluation | |
|---|---|---|---|---|---|---|---|
| | Carrier Zeolite type compound | | Catalytic material Metal fine particle | | | | |
| No. | Framework Structure | Average inner diameter of channel $D_F$ (nm) | Type | Average particle diameter $D_C$ (nm) | $D_C/D_F$ | Catalytic activity | Durability |
| Example 601 | MTW | 0.61 | Ir | 0.09 | 0.1 | Fair | Fair |
| Example 602 | | | | 0.26 | 0.4 | Fair | Fair |
| Example 603 | | | | 0.44 | 0.7 | Good | Fair |
| Example 604 | | | | 0.87 | 1.4 | Excellent | Good |
| Example 605 | | | | 1.31 | 2.1 | Excellent | Good |
| Example 606 | | | | 1.57 | 2.6 | Excellent | Good |
| Example 607 | | | | 1.74 | 2.9 | Excellent | Excellent |
| Example 608 | | | | 2.18 | 3.6 | Excellent | Excellent |
| Example 609 | | | | 4.36 | 7.1 | Good | Excellent |
| Example 610 | | | | 8.71 | 14.3 | Good | Excellent |
| Example 611 | | | | 13.07 | 21.4 | Fair | Excellent |
| Example 612 | | | | 17.43 | 28.6 | Fair | Excellent |
| Example 613 | | | | 0.09 | 0.1 | Fair | Fair |
| Example 614 | | | | 0.26 | 0.4 | Fair | Fair |
| Example 615 | | | | 0.44 | 0.7 | Good | Fair |
| Example 616 | | | | 0.87 | 1.4 | Excellent | Good |
| Example 617 | | | | 1.31 | 2.1 | Excellent | Good |
| Example 618 | | | | 1.57 | 2.6 | Excellent | Good |
| Example 619 | | | | 1.74 | 2.9 | Good | Excellent |
| Example 620 | | | | 2.18 | 3.6 | Good | Excellent |
| Example 621 | | | | 4.36 | 7.1 | Fair | Excellent |
| Example 622 | | | | 8.71 | 14.3 | Fair | Excellent |
| Example 623 | | | | 13.07 | 21.4 | Fair | Excellent |
| Example 624 | | | | 17.43 | 28.6 | Fair | Excellent |

TABLE 16-1

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 625 | MCM-41 | 1.0 | Present | 1000 | TPABr | 12 | 72 |
| Example 626 | | | | 500 | | | |
| Example 627 | | | | 200 | | | |
| Example 628 | | | | 100 | | | |
| Example 629 | | 1.5 | | | | | |
| Example 630 | | 1.8 | | | | | |
| Example 631 | | 2.0 | | | | | |
| Example 632 | | 2.5 | | | | | |
| Example 633 | | 5.0 | | | | | |
| Example 634 | SBA-1 | 10.0 | | | | | |
| Example 635 | | 15.0 | | | | | |
| Example 636 | | 20.0 | | | | | |
| Example 637 | MCM-41 | 1.0 | Absent | 1000 | | | |
| Example 638 | | | | 500 | | | |
| Example 639 | | | | 200 | | | |
| Example 640 | | | | 100 | | | |
| Example 641 | | 1.5 | | | | | |
| Example 642 | | 1.8 | | | | | |
| Example 643 | | 2.0 | | | | | |
| Example 644 | | 2.5 | | | | | |
| Example 645 | | 5.0 | | | | | |
| Example 646 | SBA-1 | 10.0 | | | | | |
| Example 647 | | 15.0 | | | | | |
| Example 648 | | 20.0 | | | | | |

| | Catalyst structure | | | | | Performance evaluation | |
|---|---|---|---|---|---|---|---|
| | Carrier Zeolite type compound | | Catalytic material Metal fine particle | | | | |
| No. | Framework Structure | Average inner diameter of channel $D_F$ (nm) | Type | Average particle diameter $D_C$ (nm) | $D_C/D_F$ | Catalytic activity | Durability |
| Example 625 | MFI | 0.56 | Ir | 0.08 | 0.1 | Fair | Fair |
| Example 626 | | | | 0.24 | 0.4 | Fair | Fair |
| Example 627 | | | | 0.40 | 0.7 | Good | Fair |
| Example 628 | | | | 0.80 | 1.4 | Excellent | Good |
| Example 629 | | | | 1.20 | 2.1 | Excellent | Good |
| Example 630 | | | | 1.44 | 2.6 | Excellent | Excellent |
| Example 631 | | | | 1.60 | 2.9 | Excellent | Excellent |
| Example 632 | | | | 2.00 | 3.6 | Excellent | Excellent |
| Example 633 | | | | 4.00 | 7.1 | Good | Excellent |
| Example 634 | | | | 8.00 | 14.3 | Good | Excellent |
| Example 635 | | | | 12.00 | 21.4 | Fair | Excellent |
| Example 636 | | | | 16.00 | 28.6 | Fair | Excellent |
| Example 637 | | | | 0.08 | 0.1 | Fair | Fair |
| Example 638 | | | | 0.24 | 0.4 | Fair | Fair |
| Example 639 | | | | 0.40 | 0.7 | Good | Fair |
| Example 640 | | | | 0.80 | 1.4 | Excellent | Good |
| Example 641 | | | | 1.20 | 2.1 | Excellent | Good |
| Example 642 | | | | 1.44 | 2.6 | Good | Excellent |
| Example 643 | | | | 1.60 | 2.9 | Good | Excellent |
| Example 644 | | | | 2.00 | 3.6 | Good | Excellent |
| Example 645 | | | | 4.00 | 7.1 | Fair | Excellent |
| Example 646 | | | | 8.00 | 14.3 | Fair | Excellent |
| Example 647 | | | | 12.00 | 21.4 | Fair | Excellent |
| Example 648 | | | | 16.00 | 28.6 | Fair | Excellent |

TABLE 16-2

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 649 | MCM-41 | 1.0 | Present | 1000 | TMABr | 12 | 120 |
| Example 650 | | | | 500 | | | |
| Example 651 | | | | 200 | | | |
| Example 652 | | | | 100 | | | |
| Example 653 | | 1.5 | | | | | |
| Example 654 | | 1.8 | | | | | |
| Example 655 | | 2.0 | | | | | |
| Example 656 | | 2.5 | | | | | |
| Example 657 | | 5.1 | | | | | |
| Example 658 | SBA-1 | 10.2 | | | | | |
| Example 659 | | 15.3 | | | | | |
| Example 660 | | 20.4 | | | | | |
| Example 661 | MCM-41 | 1.0 | Absent | 1000 | | | |
| Example 662 | | | | 500 | | | |
| Example 663 | | | | 200 | | | |
| Example 664 | | | | 100 | | | |
| Example 665 | | 1.5 | | | | | |
| Example 666 | | 1.8 | | | | | |
| Example 667 | | 2.0 | | | | | |
| Example 668 | | 2.5 | | | | | |
| Example 669 | | 5.1 | | | | | |
| Example 670 | SBA-1 | 10.2 | | | | | |
| Example 671 | | 15.3 | | | | | |
| Example 672 | | 20.4 | | | | | |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 649 | FER | 0.57 | Ir | 0.08 | 0.1 | Fair | Fair |
| Example 650 | | | | 0.24 | 0.4 | Fair | Fair |
| Example 651 | | | | 0.41 | 0.7 | Good | Fair |
| Example 652 | | | | 0.81 | 1.4 | Excellent | Good |
| Example 653 | | | | 1.22 | 2.1 | Excellent | Good |
| Example 654 | | | | 1.47 | 2.6 | Excellent | Good |
| Example 655 | | | | 1.63 | 2.9 | Excellent | Excellent |
| Example 656 | | | | 2.04 | 3.6 | Excellent | Excellent |
| Example 657 | | | | 4.07 | 7.1 | Good | Excellent |
| Example 658 | | | | 8.14 | 14.3 | Good | Excellent |
| Example 659 | | | | 12.21 | 21.4 | Fair | Excellent |
| Example 660 | | | | 16.29 | 28.6 | Fair | Excellent |
| Example 661 | | | | 0.08 | 0.1 | Fair | Fair |
| Example 662 | | | | 0.24 | 0.4 | Fair | Fair |
| Example 663 | | | | 0.41 | 0.7 | Good | Fair |
| Example 664 | | | | 0.81 | 1.4 | Excellent | Good |
| Example 665 | | | | 1.22 | 2.1 | Excellent | Good |
| Example 666 | | | | 1.47 | 2.6 | Excellent | Good |
| Example 667 | | | | 1.63 | 2.9 | Good | Excellent |
| Example 668 | | | | 2.04 | 3.6 | Good | Excellent |
| Example 669 | | | | 4.07 | 7.1 | Fair | Excellent |
| Example 670 | | | | 8.14 | 14.3 | Fair | Excellent |
| Example 671 | | | | 12.21 | 21.4 | Fair | Excellent |
| Example 672 | | | | 16.29 | 28.6 | Fair | Excellent |

TABLE 17-1

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 673 | MCM-41 | 1.3 | Present | 1000 | TEABr | 12 | 120 |
| Example 674 | | | | 500 | | | |
| Example 675 | | | | 200 | | | |
| Example 676 | | | | 100 | | | |
| Example 677 | | 2.0 | | | | | |
| Example 678 | | 2.4 | | | | | |
| Example 679 | | 2.6 | | | | | |
| Example 680 | | 3.3 | | | | | |
| Example 681 | | 6.6 | | | | | |
| Example 682 | SBA-1 | 13.2 | | | | | |
| Example 683 | | 19.8 | | | | | |
| Example 684 | | 26.4 | | | | | |
| Example 685 | MCM-41 | 1.3 | Absent | 1000 | | | |
| Example 686 | | | | 500 | | | |
| Example 687 | | | | 200 | | | |
| Example 688 | | | | 100 | | | |
| Example 689 | | 2.0 | | | | | |
| Example 690 | | 2.4 | | | | | |
| Example 691 | | 2.6 | | | | | |
| Example 692 | | 3.3 | | | | | |
| Example 693 | | 6.6 | | | | | |
| Example 694 | SBA-1 | 13.2 | | | | | |
| Example 695 | | 19.8 | | | | | |
| Example 696 | | 26.4 | | | | | |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 673 | FAU | 0.74 | Rh | 0.11 | 0.1 | Fair | Fair |
| Example 674 | | | | 0.32 | 0.4 | Fair | Fair |
| Example 675 | | | | 0.53 | 0.7 | Good | Fair |
| Example 676 | | | | 1.06 | 1.4 | Excellent | Good |
| Example 677 | | | | 1.59 | 2.1 | Excellent | Good |
| Example 678 | | | | 1.90 | 2.6 | Excellent | Excellent |
| Example 679 | | | | 2.11 | 2.9 | Excellent | Excellent |
| Example 680 | | | | 2.64 | 3.6 | Excellent | Excellent |
| Example 681 | | | | 5.29 | 7.1 | Good | Excellent |
| Example 682 | | | | 10.57 | 14.3 | Good | Excellent |
| Example 683 | | | | 15.86 | 21.4 | Fair | Excellent |
| Example 684 | | | | 21.14 | 28.6 | Fair | Excellent |
| Example 685 | | | | 0.11 | 0.1 | Fair | Fair |
| Example 686 | | | | 0.32 | 0.4 | Fair | Fair |
| Example 687 | | | | 0.53 | 0.7 | Good | Fair |
| Example 688 | | | | 1.06 | 1.4 | Excellent | Good |
| Example 689 | | | | 1.59 | 2.1 | Excellent | Good |
| Example 690 | | | | 1.90 | 2.6 | Good | Excellent |
| Example 691 | | | | 2.11 | 2.9 | Good | Excellent |
| Example 692 | | | | 2.64 | 3.6 | Good | Excellent |
| Example 693 | | | | 5.29 | 7.1 | Fair | Excellent |
| Example 694 | | | | 10.57 | 14.3 | Fair | Excellent |
| Example 695 | | | | 15.86 | 21.4 | Fair | Excellent |
| Example 696 | | | | 21.14 | 28.6 | Fair | Excellent |

TABLE 17-2

| | Production conditions of catalyst structure | | | | | | |
|---|---|---|---|---|---|---|---|
| | Precursor material (A) | | Addition to precursor material (A) | Conversion ratio of amount of added metal-containing solution (atomic ratio) Si/M | Hydrothermal treatment condition using precursor material (C) | | |
| No. | Type | Pore diameter (nm) | Presence or absence of additive | | Type of structure directing agent | pH | Time period (h) |
| Example 697 | MCM-41 | 1.1 | Present | 1000 | TEABr | 11 | 72 |
| Example 698 | | | | 500 | | | |
| Example 699 | | | | 200 | | | |
| Example 700 | | | | 100 | | | |
| Example 701 | | 1.6 | | | | | |
| Example 702 | | 2.0 | | | | | |
| Example 703 | | 2.2 | | | | | |
| Example 704 | | 2.7 | | | | | |
| Example 705 | | 5.4 | | | | | |
| Example 706 | SBA-1 | 10.9 | | | | | |
| Example 707 | | 16.3 | | | | | |
| Example 708 | | 21.8 | | | | | |
| Example 709 | MCM-41 | 1.1 | Absent | 1000 | | | |
| Example 710 | | | | 500 | | | |
| Example 711 | | | | 200 | | | |
| Example 712 | | | | 100 | | | |
| Example 713 | | 1.6 | | | | | |
| Example 714 | | 2.0 | | | | | |
| Example 715 | | 2.2 | | | | | |
| Example 716 | | 2.7 | | | | | |
| Example 717 | | 5.4 | | | | | |
| Example 718 | SBA-1 | 10.9 | | | | | |
| Example 719 | | 16.3 | | | | | |
| Example 720 | | 21.8 | | | | | |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 697 | MTW | 0.61 | Rh | 0.09 | 0.1 | Fair | Fair |
| Example 698 | | | | 0.26 | 0.4 | Fair | Fair |
| Example 699 | | | | 0.44 | 0.7 | Good | Fair |
| Example 700 | | | | 0.87 | 1.4 | Excellent | Good |
| Example 701 | | | | 1.31 | 2.1 | Excellent | Good |
| Example 702 | | | | 1.57 | 2.6 | Excellent | Good |
| Example 703 | | | | 1.74 | 2.9 | Excellent | Excellent |
| Example 704 | | | | 2.18 | 3.6 | Excellent | Excellent |
| Example 705 | | | | 4.36 | 7.1 | Good | Excellent |
| Example 706 | | | | 8.71 | 14.3 | Good | Excellent |
| Example 707 | | | | 13.07 | 21.4 | Fair | Excellent |
| Example 708 | | | | 17.43 | 28.6 | Fair | Excellent |
| Example 709 | | | | 0.09 | 0.1 | Fair | Fair |
| Example 710 | | | | 0.26 | 0.4 | Fair | Fair |
| Example 711 | | | | 0.44 | 0.7 | Good | Fair |
| Example 712 | | | | 0.87 | 1.4 | Excellent | Good |
| Example 713 | | | | 1.31 | 2.1 | Excellent | Good |
| Example 714 | | | | 1.57 | 2.6 | Excellent | Good |
| Example 715 | | | | 1.74 | 2.9 | Good | Excellent |
| Example 716 | | | | 2.18 | 3.6 | Good | Excellent |
| Example 717 | | | | 4.36 | 7.1 | Fair | Excellent |
| Example 718 | | | | 8.71 | 14.3 | Fair | Excellent |
| Example 719 | | | | 13.07 | 21.4 | Fair | Excellent |
| Example 720 | | | | 17.43 | 28.6 | Fair | Excellent |

TABLE 18-1

| | Production conditions of catalyst structure | | | | | | |
|---|---|---|---|---|---|---|---|
| | Precursor material (A) | | Addition to precursor material (A) | | Hydrothermal treatment condition using precursor material (C) | | |
| No. | Type | Pore diameter (nm) | Presence or absence of additive | Conversion ratio of amount of added metal-containing solution (atomic ratio) Si/M | Type of structure directing agent | pH | Time period (h) |
| Example 721 | MCM-41 | 1.0 | Present | 1000 | TPABr | 12 | 72 |
| Example 722 | | | | 500 | | | |
| Example 723 | | | | 200 | | | |
| Example 724 | | | | 100 | | | |
| Example 725 | | 1.5 | | | | | |
| Example 726 | | 1.8 | | | | | |
| Example 727 | | 2.0 | | | | | |
| Example 728 | | 2.5 | | | | | |
| Example 729 | | 5.0 | | | | | |
| Example 730 | SBA-1 | 10.0 | | | | | |
| Example 731 | | 15.0 | | | | | |
| Example 732 | | 20.0 | | | | | |
| Example 733 | MCM-41 | 1.0 | Absent | 1000 | | | |
| Example 734 | | | | 500 | | | |
| Example 735 | | | | 200 | | | |
| Example 736 | | | | 100 | | | |
| Example 737 | | 1.5 | | | | | |
| Example 738 | | 1.8 | | | | | |
| Example 739 | | 2.0 | | | | | |
| Example 740 | | 2.5 | | | | | |
| Example 741 | | 5.0 | | | | | |
| Example 742 | SBA-1 | 10.0 | | | | | |
| Example 743 | | 15.0 | | | | | |
| Example 744 | | 20.0 | | | | | |

| | Catalyst structure | | | | | | |
|---|---|---|---|---|---|---|---|
| | Carrier Zeolite type compound | | Catalytic material Metal fine particle | | | Performance evaluation | |
| No. | Framework Structure | Average inner diameter of channel $D_F$ (nm) | Type | Average particle diameter $D_C$ (nm) | $D_C/D_F$ | Catalytic activity | Durability |
| Example 721 | MFI | 0.56 | Rh | 0.08 | 0.1 | Fair | Fair |
| Example 722 | | | | 0.24 | 0.4 | Fair | Fair |
| Example 723 | | | | 0.40 | 0.7 | Good | Fair |
| Example 724 | | | | 0.80 | 1.4 | Excellent | Good |
| Example 725 | | | | 1.20 | 2.1 | Excellent | Good |
| Example 726 | | | | 1.44 | 2.6 | Excellent | Excellent |
| Example 727 | | | | 1.60 | 2.9 | Excellent | Excellent |
| Example 728 | | | | 2.00 | 3.6 | Excellent | Excellent |
| Example 729 | | | | 4.00 | 7.1 | Good | Excellent |
| Example 730 | | | | 8.00 | 14.3 | Good | Excellent |
| Example 731 | | | | 12.00 | 21.4 | Fair | Excellent |
| Example 732 | | | | 16.00 | 28.6 | Fair | Excellent |
| Example 733 | | | | 0.08 | 0.1 | Fair | Fair |
| Example 734 | | | | 0.24 | 0.4 | Fair | Fair |
| Example 735 | | | | 0.40 | 0.7 | Good | Fair |
| Example 736 | | | | 0.80 | 1.4 | Excellent | Good |
| Example 737 | | | | 1.20 | 2.1 | Excellent | Good |
| Example 738 | | | | 1.44 | 2.6 | Good | Excellent |
| Example 739 | | | | 1.60 | 2.9 | Good | Excellent |
| Example 740 | | | | 2.00 | 3.6 | Good | Excellent |
| Example 741 | | | | 4.00 | 7.1 | Fair | Excellent |
| Example 742 | | | | 8.00 | 14.3 | Fair | Excellent |
| Example 743 | | | | 12.00 | 21.4 | Fair | Excellent |
| Example 744 | | | | 16.00 | 28.6 | Fair | Excellent |

TABLE 18-2

| | Precursor material (A) | | Addition to precursor material (A) | | Hydrothermal treatment condition using precursor material (C) | | |
|---|---|---|---|---|---|---|---|
| No. | Type | Pore diameter (nm) | Presence or absence of additive | Conversion ratio of amount of added metal-containing solution (atomic ratio) Si/M | Type of structure directing agent | pH | Time period (h) |
| Example 745 | MCM-41 | 1.0 | Present | 1000 | TMABr | 12 | 120 |
| Example 746 | | | | 500 | | | |
| Example 747 | | | | 200 | | | |
| Example 748 | | | | 100 | | | |
| Example 749 | | 1.5 | | | | | |
| Example 750 | | 1.8 | | | | | |
| Example 751 | | 2.0 | | | | | |
| Example 752 | | 2.5 | | | | | |
| Example 753 | | 5.1 | | | | | |
| Example 754 | SBA-1 | 10.2 | | | | | |
| Example 755 | | 15.3 | | | | | |
| Example 756 | | 20.4 | | | | | |
| Example 757 | MCM-41 | 1.0 | Absent | 1000 | | | |
| Example 758 | | | | 500 | | | |
| Example 759 | | | | 200 | | | |
| Example 760 | | | | 100 | | | |
| Example 761 | | 1.5 | | | | | |
| Example 762 | | 1.8 | | | | | |
| Example 763 | | 2.0 | | | | | |
| Example 764 | | 2.5 | | | | | |
| Example 765 | | 5.1 | | | | | |
| Example 766 | SBA-1 | 10.2 | | | | | |
| Example 767 | | 15.3 | | | | | |
| Example 768 | | 20.4 | | | | | |
| Comparative Example 1 | | | | — | | | |
| Comparative Example 2 | | | | — | | | |

| | Catalyst structure | | | | | Performance evaluation | |
|---|---|---|---|---|---|---|---|
| | Carrier Zeolite type compound | | Catalytic material Metal fine particle | | | | |
| No. | Framework Structure | Average inner diameter of channel $D_F$ (nm) | Type | Average particle diameter $D_C$ (nm) | $D_C/D_F$ | Catalytic activity | Durability |
| Example 745 | FER | 0.57 | Rh | 0.08 | 0.1 | Fair | Fair |
| Example 746 | | | | 0.24 | 0.4 | Fair | Fair |
| Example 747 | | | | 0.41 | 0.7 | Good | Fair |
| Example 748 | | | | 0.81 | 1.4 | Excellent | Good |
| Example 749 | | | | 1.22 | 2.1 | Excellent | Good |
| Example 750 | | | | 1.47 | 2.6 | Excellent | Good |
| Example 751 | | | | 1.63 | 2.9 | Excellent | Excellent |
| Example 752 | | | | 2.04 | 3.6 | Excellent | Excellent |
| Example 753 | | | | 4.07 | 7.1 | Good | Excellent |
| Example 754 | | | | 8.14 | 14.3 | Good | Excellent |
| Example 755 | | | | 12.21 | 21.4 | Fair | Excellent |
| Example 756 | | | | 16.29 | 28.6 | Fair | Excellent |
| Example 757 | | | | 0.08 | 0.1 | Fair | Fair |
| Example 758 | | | | 0.24 | 0.4 | Fair | Fair |
| Example 759 | | | | 0.41 | 0.7 | Good | Fair |
| Example 760 | | | | 0.81 | 1.4 | Excellent | Good |
| Example 761 | | | | 1.22 | 2.1 | Excellent | Good |
| Example 762 | | | | 1.47 | 2.6 | Excellent | Good |
| Example 763 | | | | 1.63 | 2.9 | Good | Excellent |
| Example 764 | | | | 2.04 | 3.6 | Good | Excellent |
| Example 765 | | | | 4.07 | 7.1 | Fair | Excellent |
| Example 766 | | | | 8.14 | 14.3 | Fair | Excellent |
| Example 767 | | | | 12.21 | 21.4 | Fair | Excellent |

TABLE 18-2-continued

| | | | | | | | |
|---|---|---|---|---|---|---|---|
| Example 768 | | | | 16.29 | 28.6 | Fair | Excellent |
| Comparative Example 1 | MFI type silicalite | 0.56 | Co | ≤50 | ≤67.6 | Fair | Poor |
| Comparative Example 2 | MFI type silicalite | 0.56 | — | — | — | Poor | Poor |

As is clear from Tables 11-1 to 18-2, it was found that the catalyst structures (Examples 385 to 768) for which observation of the cross section was carried out and confirmed that the catalytic material is held in the inside of the carrier exhibits excellent catalytic activity in the steam reforming reaction of the kerosene according to JIS No. 1 determined to be a reforming feedstock and is excellent also in the durability as the catalyst, as compared to the catalyst structure (Comparative Example 1) wherein the catalytic material only attaches to the outer surface of the carrier, or the carrier itself (Comparative Example 2) that does not have the catalytic material at all.

On the other hand, the catalyst structure of Comparative Example 1 having the catalytic material attached only to the outer surface of the carrier is improved in the catalytic activity in the steam reforming reaction of kerosene according to JIS No. 1 determined to be a reforming feedstock, as compared to the carrier itself in Comparative Example 2 having no catalytic material in itself, but the durability of the catalyst was inferior as compared to those of the catalyst structures in Examples 385 to 768.

In addition, the carrier itself having no catalytic material in itself in Comparative Example 2 did not show almost any catalytic activity in the steam reforming reaction of the kerosene according to JIS No. 1 determined to be a reforming feedstock, and both of the catalytic activity and the durability were inferior as compared to those of the catalyst structures of Examples 385 to 768.

Thereafter, in addition to the above described evaluation of the case where hydrogen was produced using a petroleum-based hydrocarbon, the catalytic activity of a case where a natural gas was subjected to steam reforming was evaluated. To a normal pressure flow reaction apparatus, 50 mg of the catalyst structures (Example 481 to 576) having the Ni fine particle as the catalytic material were filled, and reduction treatment was performed by a hydrogen gas at 500° C. for 1 hour before the reaction starts.

Thereafter, methane gas (6 ml/min) and pure water (5 µl/min) were supplied and $N_2$ working as a carrier gas was supplied to the apparatus with 10 ml/min, respectively, and the steam reforming reaction was performed while the apparatus heated the substances at 100 to 900° C. A single micro reactor (Rx-3050SR, made by Frontier Laboratory Co., Ltd.) was used as the normal pressure flow type reaction apparatus. The product was analyzed using gas chromatography-mass spectrometry (GC/MS). TRACE 1310 GC (made by Thermo Fisher Scientific Co., Ltd., detector: thermal conductivity detector) was used as an analysis apparatus for the produced gas.

As for the catalytic activity in the steam reforming of the methane gas, the Example was determined to be excellent in the catalytic activity when the production of the carbon monoxide started at 600° C. or lower, and expressed as "Excellent", the Example was determined to have good catalytic activity when the production started at higher than 600° C. and lower than 700° C., and expressed as "Good", the Example was determined not to have good catalytic activity but to have the catalytic activity in a passing level (acceptable) when the production started at 700° C. or higher and lower than 800° C., and expressed as "Fair", and the Example was determined to be inferior in the catalytic activity (unacceptable) when the production started at 800° C. or higher and lower than 900° C., or when the reaction did not proceed, and expressed as "Poor". The results are shown in Tables 19-1 to 20-2.

TABLE 19-1

| | Precursor material (A) | | Addition to precursor material (A) | | Hydrothermal treatment condition using precursor material (C) | | | Catalyst structure |
|---|---|---|---|---|---|---|---|---|
| No. | Type | Pore diameter (nm) | Presence or absence of additive | Conversion ratio of amount of added metal-containing solution (atomic ratio) Si/M | Type of structure directing agent | pH | Time period (h) | Carrier Zeolite type compound Framework Structure |
| Example 481 | MCM-41 | 1.3 | Present | 1000 | TEABr | 12 | 120 | FAU |
| Example 482 | | | | 500 | | | | |
| Example 483 | | | | 200 | | | | |
| Example 484 | | | | 100 | | | | |
| Example 485 | | 2.0 | | | | | | |
| Example 486 | | 2.4 | | | | | | |
| Example 487 | | 2.6 | | | | | | |
| Example 488 | | 3.3 | | | | | | |
| Example 489 | | 6.6 | | | | | | |
| Example 490 | SBA-1 | 13.2 | | | | | | |
| Example 491 | | 19.8 | | | | | | |
| Example 492 | | 26.4 | | | | | | |
| Example 493 | MCM-41 | 1.3 | Absent | 1000 | | | | |
| Example 494 | | | | 500 | | | | |
| Example 495 | | | | 200 | | | | |
| Example 496 | | | | 100 | | | | |

TABLE 19-1-continued

| | | |
|---|---|---|
| Example 497 | | 2.0 |
| Example 498 | | 2.4 |
| Example 499 | | 2.6 |
| Example 500 | | 3.3 |
| Example 501 | | 6.6 |
| Example 502 | SBA-1 | 13.2 |
| Example 503 | | 19.8 |
| Example 504 | | 26.4 |

| | Catalyst structure | | | | Performance evaluation | | |
|---|---|---|---|---|---|---|---|
| | Carrier Zeolite type compound | Catalytic material Metal fine particle | | | | | |
| No. | Average inner diameter of channel $D_F$ (nm) | Type | Average particle diameter $D_C$ (nm) | $D_C/D_F$ | Catalytic activity | Durability | Catalytic activity in steam reforming of methane gas |
| Example 481 | 0.74 | Ni | 0.11 | 0.1 | Fair | Fair | Fair |
| Example 482 | | | 0.32 | 0.4 | Fair | Fair | Fair |
| Example 483 | | | 0.53 | 0.7 | Good | Fair | Good |
| Example 484 | | | 1.06 | 1.4 | Excellent | Good | Excellent |
| Example 485 | | | 1.59 | 2.1 | Excellent | Good | Excellent |
| Example 486 | | | 1.90 | 2.6 | Excellent | Excellent | Excellent |
| Example 487 | | | 2.11 | 2.9 | Excellent | Excellent | Excellent |
| Example 488 | | | 2.64 | 3.6 | Excellent | Excellent | Excellent |
| Example 489 | | | 5.29 | 7.1 | Good | Excellent | Excellent |
| Example 490 | | | 10.57 | 14.3 | Good | Excellent | Excellent |
| Example 491 | | | 15.86 | 21.4 | Fair | Excellent | Good |
| Example 492 | | | 21.14 | 28.6 | Fair | Excellent | Good |
| Example 493 | | | 0.11 | 0.1 | Fair | Fair | Fair |
| Example 494 | | | 0.32 | 0.4 | Fair | Fair | Fair |
| Example 495 | | | 0.53 | 0.7 | Good | Fair | Good |
| Example 496 | | | 1.06 | 1.4 | Excellent | Good | Excellent |
| Example 497 | | | 1.59 | 2.1 | Excellent | Good | Excellent |
| Example 498 | | | 1.90 | 2.6 | Good | Excellent | Excellent |
| Example 499 | | | 2.11 | 2.9 | Good | Excellent | Excellent |
| Example 500 | | | 2.64 | 3.6 | Good | Excellent | Excellent |
| Example 501 | | | 5.29 | 7.1 | Fair | Excellent | Excellent |
| Example 502 | | | 10.57 | 14.3 | Fair | Excellent | Excellent |
| Example 503 | | | 15.86 | 21.4 | Fair | Excellent | Good |
| Example 504 | | | 21.14 | 28.6 | Fair | Excellent | Good |

TABLE 19-2

| | Production conditions of catalyst structure | | | | | | | |
|---|---|---|---|---|---|---|---|---|
| | Precursor material (A) | | Addition to precursor material (A) | | Hydrothermal treatment condition using precursor material (C) | | | Catalyst structure |
| | | | | Conversion ratio of amount of added metal-containing solution (atomic ratio) Si/M | Type of structure directing agent | | Time period (h) | Carrier Zeolite type compound |
| No. | Type | Pore diameter (nm) | Presence or absence of additive | | | pH | | Framework Structure |
| Example 505 | MCM-41 | 1.1 | Present | 1000 | TEABr | 11 | 72 | MTW |
| Example 506 | | | | 500 | | | | |
| Example 507 | | | | 200 | | | | |
| Example 508 | | | | 100 | | | | |
| Example 509 | | 1.6 | | | | | | |
| Example 510 | | 2.0 | | | | | | |
| Example 511 | | 2.2 | | | | | | |
| Example 512 | | 2.7 | | | | | | |
| Example 513 | | 5.4 | | | | | | |
| Example 514 | SBA-1 | 10.9 | | | | | | |
| Example 515 | | 16.3 | | | | | | |
| Example 516 | | 21.8 | | | | | | |
| Example 517 | MCM-41 | 1.1 | Absent | 1000 | | | | |
| Example 518 | | | | 500 | | | | |
| Example 519 | | | | 200 | | | | |
| Example 520 | | | | 100 | | | | |
| Example 521 | | 1.6 | | | | | | |
| Example 522 | | 2.0 | | | | | | |

TABLE 19-2-continued

| | | |
|---|---|---|
| Example 523 | | 2.2 |
| Example 524 | | 2.7 |
| Example 525 | | 5.4 |
| Example 526 | SBA-1 | 10.9 |
| Example 527 | | 16.3 |
| Example 528 | | 21.8 |

| | Catalyst structure | | | | | | |
|---|---|---|---|---|---|---|---|
| | Carrier Zeolite type compound | Catalytic material Metal fine particle | | | | | |
| | Average inner diameter of channel $D_F$ | | Average particle diameter $D_C$ | | | Performance evaluation | |
| No. | (nm) | Type | (nm) | $D_C/D_F$ | Catalytic activity | Durability | Catalytic activity in steam reforming of methane gas |
| Example 505 | 0.61 | Ni | 0.09 | 0.1 | Fair | Fair | Fair |
| Example 506 | | | 0.26 | 0.4 | Fair | Fair | Fair |
| Example 507 | | | 0.44 | 0.7 | Good | Fair | Good |
| Example 508 | | | 0.87 | 1.4 | Excellent | Good | Excellent |
| Example 509 | | | 1.31 | 2.1 | Excellent | Good | Excellent |
| Example 510 | | | 1.57 | 2.6 | Excellent | Good | Excellent |
| Example 511 | | | 1.74 | 2.9 | Excellent | Excellent | Excellent |
| Example 512 | | | 2.18 | 3.6 | Excellent | Excellent | Excellent |
| Example 513 | | | 4.36 | 7.1 | Good | Excellent | Excellent |
| Example 514 | | | 8.71 | 14.3 | Good | Excellent | Excellent |
| Example 515 | | | 13.07 | 21.4 | Fair | Excellent | Good |
| Example 516 | | | 17.43 | 28.6 | Fair | Excellent | Good |
| Example 517 | | | 0.09 | 0.1 | Fair | Fair | Fair |
| Example 518 | | | 0.26 | 0.4 | Fair | Fair | Fair |
| Example 519 | | | 0.44 | 0.7 | Good | Fair | Good |
| Example 520 | | | 0.87 | 1.4 | Excellent | Good | Excellent |
| Example 521 | | | 1.31 | 2.1 | Excellent | Good | Excellent |
| Example 522 | | | 1.57 | 2.6 | Excellent | Good | Excellent |
| Example 523 | | | 1.74 | 2.9 | Good | Excellent | Excellent |
| Example 524 | | | 2.18 | 3.6 | Good | Excellent | Excellent |
| Example 525 | | | 4.36 | 7.1 | Fair | Excellent | Excellent |
| Example 526 | | | 8.71 | 14.3 | Fair | Excellent | Excellent |
| Example 527 | | | 13.07 | 21.4 | Fair | Excellent | Good |
| Example 528 | | | 17.43 | 28.6 | Fair | Excellent | Good |

TABLE 20-1

| | Production conditions of catalyst structure | | | | | | | |
|---|---|---|---|---|---|---|---|---|
| | Precursor material (A) | | Addition to precursor material (A) | Hydrothermal treatment condition using precursor material (C) | | | | Catalyst structure |
| No. | Type | Pore diameter (nm) | Presence or absence of additive | Conversion ratio of amount of added metal-containing solution (atomic ratio) Si/M | Type of structure directing agent | pH | Time period (h) | Carrier Zeolite type compound Framework Structure |
| Example 529 | MCM-41 | 1.0 | Present | 1000 | TPABr | 12 | 72 | MFI |
| Example 530 | | 1.0 | | 500 | | | | |
| Example 531 | | 1.0 | | 200 | | | | |
| Example 532 | | 1.0 | | 100 | | | | |
| Example 533 | | 1.5 | | | | | | |
| Example 534 | | 1.8 | | | | | | |
| Example 535 | | 2.0 | | | | | | |
| Example 536 | | 2.5 | | | | | | |
| Example 537 | | 5.0 | | | | | | |
| Example 538 | SBA-1 | 10.0 | | | | | | |
| Example 539 | | 15.0 | | | | | | |
| Example 540 | | 20.0 | | | | | | |
| Example 541 | MCM-41 | 1.0 | Absent | 1000 | | | | |
| Example 542 | | 1.0 | | 500 | | | | |
| Example 543 | | 1.0 | | 200 | | | | |
| Example 544 | | 1.0 | | 100 | | | | |
| Example 545 | | 1.5 | | | | | | |
| Example 546 | | 1.8 | | | | | | |
| Example 547 | | 2.0 | | | | | | |
| Example 548 | | 2.5 | | | | | | |

TABLE 20-1-continued

| | | |
|---|---|---|
| Example 549 | | 5.0 |
| Example 550 | SBA-1 | 10.0 |
| Example 551 | | 15.0 |
| Example 552 | | 20.0 |

| | | Catalyst structure | | | | | |
|---|---|---|---|---|---|---|---|
| | | Carrier Zeolite type compound | Catalytic material Metal fine particle | | | | |
| | | Average inner diameter of channel $D_F$ (nm) | | Average particle diameter $D_C$ (nm) | | Performance evaluation | |
| | No. | | Type | | $D_C/D_F$ | Catalytic activity | Durability | Catalytic activity in steam reforming of methane gas |

| No. | $D_F$ (nm) | Type | $D_C$ (nm) | $D_C/D_F$ | Catalytic activity | Durability | Catalytic activity in steam reforming of methane gas |
|---|---|---|---|---|---|---|---|
| Example 529 | 0.56 | Ni | 0.08 | 0.1 | Fair | Fair | Fair |
| Example 530 | | | 0.24 | 0.4 | Fair | Fair | Fair |
| Example 531 | | | 0.40 | 0.7 | Good | Fair | Good |
| Example 532 | | | 0.80 | 1.4 | Excellent | Good | Excellent |
| Example 533 | | | 1.20 | 2.1 | Excellent | Good | Excellent |
| Example 534 | | | 1.44 | 2.6 | Excellent | Excellent | Excellent |
| Example 535 | | | 1.60 | 2.9 | Excellent | Excellent | Excellent |
| Example 536 | | | 2.00 | 3.6 | Excellent | Excellent | Excellent |
| Example 537 | | | 4.00 | 7.1 | Good | Excellent | Excellent |
| Example 538 | | | 8.00 | 14.3 | Good | Excellent | Excellent |
| Example 539 | | | 12.00 | 21.4 | Fair | Excellent | Good |
| Example 540 | | | 16.00 | 28.6 | Fair | Excellent | Good |
| Example 541 | | | 0.08 | 0.1 | Fair | Fair | Fair |
| Example 542 | | | 0.24 | 0.4 | Fair | Fair | Fair |
| Example 543 | | | 0.40 | 0.7 | Good | Fair | Good |
| Example 544 | | | 0.80 | 1.4 | Excellent | Good | Excellent |
| Example 545 | | | 1.20 | 2.1 | Excellent | Good | Excellent |
| Example 546 | | | 1.44 | 2.6 | Good | Excellent | Excellent |
| Example 547 | | | 1.60 | 2.9 | Good | Excellent | Excellent |
| Example 548 | | | 2.00 | 3.6 | Good | Excellent | Excellent |
| Example 549 | | | 4.00 | 7.1 | Fair | Excellent | Excellent |
| Example 550 | | | 8.00 | 14.3 | Fair | Excellent | Excellent |
| Example 551 | | | 12.00 | 21.4 | Fair | Excellent | Good |
| Example 552 | | | 16.00 | 28.6 | Fair | Excellent | Good |

TABLE 20-2

Production conditions of catalyst structure

| | Precursor material (A) | | Addition to precursor material (A) | Hydrothermal treatment condition using precursor material (C) | | | Catalyst structure |
|---|---|---|---|---|---|---|---|
| No. | Type | Pore diameter (nm) | Presence or absence of additive | Conversion ratio of amount of added metal-containing solution (atomic ratio) Si/M | Type of structure directing agent | pH | Time period (h) | Carrier Zeolite type compound Framework Structure |

| No. | Type | Pore diameter (nm) | Presence or absence of additive | Si/M | Structure directing agent | pH | Time (h) | Framework |
|---|---|---|---|---|---|---|---|---|
| Example 553 | MCM-41 | 1.0 | Present | 1000 | TMABr | 12 | 120 | FER |
| Example 554 | | 1.0 | | 500 | | | | |
| Example 555 | | 1.0 | | 200 | | | | |
| Example 556 | | 1.0 | | 100 | | | | |
| Example 557 | | 1.5 | | | | | | |
| Example 558 | | 1.8 | | | | | | |
| Example 559 | | 2.0 | | | | | | |
| Example 560 | | 2.5 | | | | | | |
| Example 561 | | 5.1 | | | | | | |
| Example 562 | SBA-1 | 10.2 | | | | | | |
| Example 563 | | 15.3 | | | | | | |
| Example 564 | | 20.4 | | | | | | |
| Example 565 | | 1.0 | | 1000 | | | | |
| Example 566 | | 1.0 | | 500 | | | | |
| Example 567 | | 1.0 | | 200 | | | | |
| Example 568 | MCM-41 | 1.0 | Absent | 100 | | | | |
| Example 569 | | 1.5 | | | | | | |
| Example 570 | | 1.8 | | | | | | |
| Example 571 | | 2.0 | | | | | | |
| Example 572 | | 2.5 | | | | | | |
| Example 573 | | 5.1 | | | | | | |
| Example 574 | SBA-1 | 10.2 | | | | | | |

TABLE 20-2-continued

| Example 575 | 15.3 |
| Example 576 | 20.4 |

| | Catalyst structure | | | | Performance evaluation | | |
| | Carrier Zeolite type compound | Catalytic material Metal fine particle | | | | | |
| | Average inner diameter of channel $D_F$ (nm) | | Average particle diameter $D_C$ (nm) | | | | Catalytic activity in steam reforming of methane gas |
| No. | | Type | | $D_C/D_F$ | Catalytic activity | Durability | |
| --- | --- | --- | --- | --- | --- | --- | --- |
| Example 553 | 0.57 | Ni | 0.08 | 0.1 | Fair | Fair | Fair |
| Example 554 | | | 0.24 | 0.4 | Fair | Fair | Fair |
| Example 555 | | | 0.41 | 0.7 | Good | Fair | Good |
| Example 556 | | | 0.81 | 1.4 | Excellent | Good | Excellent |
| Example 557 | | | 1.22 | 2.1 | Excellent | Good | Excellent |
| Example 558 | | | 1.47 | 2.6 | Excellent | Good | Excellent |
| Example 559 | | | 1.63 | 2.9 | Excellent | Excellent | Excellent |
| Example 560 | | | 2.04 | 3.6 | Excellent | Excellent | Excellent |
| Example 561 | | | 4.07 | 7.1 | Good | Excellent | Excellent |
| Example 562 | | | 8.14 | 14.3 | Good | Excellent | Excellent |
| Example 563 | | | 12.21 | 21.4 | Fair | Excellent | Good |
| Example 564 | | | 16.29 | 28.6 | Fair | Excellent | Good |
| Example 565 | | | 0.08 | 0.1 | Fair | Fair | Fair |
| Example 566 | | | 0.24 | 0.4 | Fair | Fair | Fair |
| Example 567 | | | 0.41 | 0.7 | Good | Fair | Good |
| Example 568 | | | 0.81 | 1.4 | Excellent | Good | Excellent |
| Example 569 | | | 1.22 | 2.1 | Excellent | Good | Excellent |
| Example 570 | | | 1.47 | 2.6 | Excellent | Good | Excellent |
| Example 571 | | | 1.63 | 2.9 | Good | Excellent | Excellent |
| Example 572 | | | 2.04 | 3.6 | Good | Excellent | Excellent |
| Example 573 | | | 4.07 | 7.1 | Fair | Excellent | Excellent |
| Example 574 | | | 8.14 | 14.3 | Fair | Excellent | Excellent |
| Example 575 | | | 12.21 | 21.4 | Fair | Excellent | Good |
| Example 576 | | | 16.29 | 28.6 | Fair | Excellent | Good |

As is clear from Tables 19-1 to 20-2, it was found that when the catalytic material is the Ni fine particles, the catalytic activity in the steam reforming of the methane gas is high. In addition, it is disclosed that in the steam reforming, metals in Groups 8, 9 and 10 excluding Os (Rh, Ru, Ni, Pt, Pd, Ir, Co and Fe) have high activity, and the main order of the activity is Rh, Ru>Ir>Ni, Pt, Pd. Therefore, it is assumed that at least Rh, Ru, Ir, Pt and Pd showing the activity equal to or higher than that of Ni, and particularly, Rh, Ru and Ir are also excellent in the catalytic activity in the steam reforming.

From the above description, it is possible to efficiently produce a reformed gas containing hydrogen by using the catalyst structure according to the present example, for a steam reforming reaction using a reforming feedstock such as a natural gas containing a hydrocarbon like methane, and for a partial oxidation reaction and the steam reforming reaction using a reforming feedstock containing a hydrocarbon such as methanol. Specifically, the catalyst structure according to the present example can exhibit adequate catalytic activity and durability similarly to the above description, in the steam reforming reaction (and in combined reaction with partial oxidation reaction) using the reforming feedstock containing various hydrocarbon.

Other Embodiments (1) A production method for producing carbon monoxide and hydrogen from carbon dioxide and methane by using a catalyst structure, wherein the catalyst structure comprises a carrier of a porous structure composed of a zeolite type compound, and at least one catalytic material existing in the carrier, wherein the carrier has channels communicating with each other, and the catalytic material is a metal fine particle and exists at least in the channel of the carrier.

(2) The production method according to the above embodiment (1), wherein the production method has a step of supplying carbon dioxide and methane to the catalyst structure.

(3) The production method according to the above embodiment (1) or (2), wherein the production method includes using the catalyst structure in a synthesis gas producing apparatus, and subjecting carbon dioxide and methane to synthesis treatment in the synthesis gas producing apparatus.

(4) A production method for producing a reformed gas containing hydrogen from hydrocarbon and steam by using a catalyst structure wherein the catalyst structure includes a carrier of a porous structure composed of a zeolite type compound, and at least one catalytic material existing in the carrier, wherein the carrier has channels communicating with each other, and the catalytic material is a metal fine particle and exists at least in the channel of the carrier.

(5) The production method according to the above embodiment (5), wherein the production method has a step of supplying a reforming feedstock containing hydrocarbon and steam to the catalyst structure.

(6) The production method according to the above embodiment (4) or (5), wherein the production method includes using the catalyst structure in a reforming apparatus, and subjecting the reforming feedstock containing hydrocarbon to reforming treatment in the reforming apparatus.

What is claimed is:

1. A catalyst structure comprising:
   a carrier having a porous structure comprising a zeolite compound having a framework; and
   at least one catalytic material comprising a metal fine particle and existing in the carrier,
   wherein the carrier has a plurality of channels communicating with each other,
   the channels include at least one of a one-dimensional pore, a two-dimensional pore and a three-dimensional pore defined by the framework of the zeolite compound, and a plurality of enlarged diameter portions which are different from the one-dimensional pore, the two-dimensional pore and the three-dimensional pore and are not defined by the framework of the zeolite compound, and
   the catalytic materials are included in the enlarged diameter portions such that one of the enlarged diameter portions encloses one of the catalytic materials and separates the one of the catalytic materials from another of the catalytic materials.

2. The catalyst structure according to claim 1, wherein the metal fine particle is a fine particle composed of at least one metal selected from the group consisting of rhodium (Rh), ruthenium (Ru), iridium (Ir), palladium (Pd), platinum (Pt), iron (Fe), cobalt (Co) and nickel (Ni).

3. The catalyst structure according to claim 1, wherein the enlarged diameter portion makes a plurality of pores forming any one of the one-dimensional pore, the two-dimensional pore and the three-dimensional pore communicate with each other.

4. The catalyst structure according to claim 1, wherein an average particle diameter of the metal fine particles is greater than an average inner diameter of the channels and is equal to or smaller than an inner diameter of the enlarged diameter portion.

5. The catalyst structure according to claim 1, wherein a metal element (M) of the metal fine particle is contained in an amount of 0.5 to 2.5 mass % with respect to the catalyst structure.

6. The catalyst structure according to claim 1, wherein an average particle diameter of the metal fine particles is 0.08 nm to 30 nm.

7. The catalyst structure according to claim 6, wherein the average particle diameter of the metal fine particles is 0.4 nm to 11.0 nm.

8. The catalyst structure according to claim 1, wherein a ratio of an average particle diameter of the metal fine particles to an average inner diameter of the channels is 0.05 to 300.

9. The catalyst structure according to claim 8, wherein the ratio of the average particle diameter of the metal fine particles to the average inner diameter of the channels is 0.1 to 30.

10. The catalyst structure according to claim 9, wherein the ratio of the average particle diameter of the metal fine particles to the average inner diameter of the channels is 1.4 to 3.6.

11. The catalyst structure according to claim 1, wherein
    an average inner diameter of the channels is 0.1 nm to 1.5 nm, and
    an inner diameter of the enlarged diameter portion is 0.5 nm to 50 nm.

12. The catalyst structure according to claim 1, further comprising at least one other catalytic material held at an outer surface of the carrier.

13. The catalyst structure according to claim 12, wherein a content of the at least one catalytic material existing in the carrier is greater than a content of the at least one other catalytic material held at the outer surface of the carrier.

14. The catalyst structure according to claim 1, wherein the enlarged diameter portions are pores formed in a synthesis of the zeolite compound.

15. The catalyst structure according to claim 1, wherein the catalyst structure is produced by a method including baking a precursor material (B) including a precursor material (A) for obtaining a carrier of the porous structure comprising the zeolite compound, impregnated with a metal-containing solution, and
    the baking of the precursor material (B) forms the enlarged diameter portions enclosing the catalytic materials.

16. A synthesis gas producing apparatus comprising the catalyst structure according to claim 1.

* * * * *